United States Patent
Du et al.

(10) Patent No.: US 11,683,530 B2
(45) Date of Patent: Jun. 20, 2023

(54) ADAPTIVE NON-LINEAR MAPPING FOR SAMPLE OFFSET

(71) Applicant: TENCENT AMERICA LLC, Palo Alto, CA (US)

(72) Inventors: Yixin Du, Los Altos, CA (US); Xin Zhao, San Jose, CA (US); Shan Liu, San Jose, CA (US)

(73) Assignee: Tencent America LLC, Palo Alto, CA (US)

(*) Notice: Subject to any disclaimer, the term of this patent is extended or adjusted under 35 U.S.C. 154(b) by 0 days.

(21) Appl. No.: 17/568,565

(22) Filed: Jan. 4, 2022

(65) Prior Publication Data

US 2022/0303586 A1  Sep. 22, 2022

Related U.S. Application Data

(60) Provisional application No. 63/163,707, filed on Mar. 19, 2021.

(51) Int. Cl.
*H04N 19/117* (2014.01)
*H04N 19/186* (2014.01)
*H04N 19/82* (2014.01)
*H04N 19/105* (2014.01)
*H04N 19/132* (2014.01)
(Continued)

(52) U.S. Cl.
CPC .......... *H04N 19/82* (2014.11); *H04N 19/105* (2014.11); *H04N 19/107* (2014.11);
(Continued)

(58) Field of Classification Search
CPC .... H04N 19/82; H04N 19/105; H04N 19/107; H04N 19/117; H04N 19/132;
(Continued)

(56) References Cited

U.S. PATENT DOCUMENTS

2017/0127078 A1* 5/2017 Kobayashi ............ H04N 19/82
2019/0045186 A1   2/2019 Zhang et al.
(Continued)

FOREIGN PATENT DOCUMENTS

WO   WO-2015163046 A1 * 10/2015 ........... H04N 19/117

OTHER PUBLICATIONS

Bross, B. et al.; "Versatile Video Coding (Draft 6)"; Document: JVET-O2001-vE; Joint Video Experts Team (JVET) of ITU-T SG 16 WP 3 and ISO/IEC JTC 1/SC 29/WG11, 15th Meeting: Gothenburg, SE, Jul. 3-12, 2019; 460 pages.
(Continued)

*Primary Examiner* — Albert Kir
(74) *Attorney, Agent, or Firm* — Crowell & Moring LLP

(57) ABSTRACT

A method for in-loop sample offset filtering in a video decoder is disclosed. The method includes obtaining at least one statistical property associated with reconstructed samples of at least a first color component in a current reconstructed data block of a video stream, selecting a target sample offset filter among a plurality of sample offset filters based on the at least one statistical property, the target sample offset filter comprising a nonlinear mapping between sample delta measures and sample offset values, and filtering a current sample in a second color component of the current reconstructed data block using the target sample offset filter and reference samples in a third color component of the current reconstructed data block to generate a filtered reconstructed sample of the current sample.

20 Claims, 31 Drawing Sheets

(51) Int. Cl.
*H04N 19/176* (2014.01)
*H04N 19/14* (2014.01)
*H04N 19/503* (2014.01)
*H04N 19/159* (2014.01)
*H04N 19/593* (2014.01)
*H04N 19/107* (2014.01)
*H04N 19/70* (2014.01)

(52) U.S. Cl.
CPC ......... *H04N 19/117* (2014.11); *H04N 19/132* (2014.11); *H04N 19/14* (2014.11); *H04N 19/159* (2014.11); *H04N 19/176* (2014.11); *H04N 19/186* (2014.11); *H04N 19/503* (2014.11); *H04N 19/593* (2014.11); *H04N 19/70* (2014.11)

(58) Field of Classification Search
CPC .... H04N 19/14; H04N 19/159; H04N 19/176; H04N 19/186; H04N 19/503; H04N 19/593; H04N 19/70
USPC .................................................. 375/240.13
See application file for complete search history.

(56) References Cited

U.S. PATENT DOCUMENTS

| | | | |
|---|---|---|---|
| 2019/0052877 A1* | 2/2019 | Zhang | H04N 19/124 |
| 2019/0182482 A1 | 6/2019 | Vanam et al. | |
| 2022/0248007 A1* | 8/2022 | Misra | H04N 19/82 |
| 2022/0272335 A1* | 8/2022 | Liu | H04N 19/117 |
| 2022/0272347 A1* | 8/2022 | Zhu | H04N 19/117 |
| 2022/0272348 A1* | 8/2022 | Zhang | H04N 19/117 |
| 2022/0279176 A1* | 9/2022 | Sarwer | H04N 19/14 |
| 2022/0286674 A1* | 9/2022 | Wang | H04N 19/186 |

OTHER PUBLICATIONS

Bross, B. et al.; "Versatile Video Coding (Draft 7)"; Document: JVET-P2001-vE; Joint Video Experts Team (JVET) of ITU-T SG 16 WP 3 and ISO/IEC JTC 1/SC 29/WG 11, 16th Meeting: Geneva, CH, Oct. 1-11, 2019; 485 pages.

Daede, T.J. et al.; "Daala: A Perceptually-Driven Next Generation Video Codec"; arXiv preprint arXiv: 1603.03129; Mar. 10, 2016; 10 pages.

Midtskogen, S. et al.; "The AV1 Constrained Directional Enhancement Filter (CDEF)"; In2018 IEEE International Conference on Acoustics, Speech and Signal Processing (ICASSP); IEEE; Apr. 15, 2018; 5 pages.

Misra, K. et al.; "Cross-Component Adaptive Loop Filter for Chroma"; Document: JVET-O0636_r1; Joint Video Experts Team (JVET) of ITU-T SG 16 WP 3 and ISO/IEC JTC1/SC 29/WG 11, 15th Meeting: Gothenburg, SE, Jul. 3-12, 2019; 9 pages.

Misra, K. et al.; "CE5-related: On the design of CC-ALF"; Document: JVET-P1008-v2; Joint Video Experts Team (JVET) of ITU-T SG 16 WP 3 and ISO/IEC JTC 1/SC 29/WG 11, 16th Meeting: Geneva, CH, Oct. 1-11, 2019; 6 pages.

Mukherjee, D. et al.; "A Switchable Loop-Restoration with Side-Information Framework for the Emerging AV1 Video Codec"; In2017 IEEE International Conference on Image Processing (ICIP); IEEE; Sep. 17, 2017; pp. 265- 269.

Taquet, J. et al.; "CE5: Results of Tests CE5-3.1 to CE5-3.4 on Non-Linear Adaptive Loop Filter"; Document: JVET-N0242; Joint Video Experts Team (JVET) of ITU-T SG 16 WP 3 and ISO/IEC JTC 1/SC 29/WG 11, 14th Meeting: Geneva, CH, Mar. 19-27, 2019; 10 pages.

Tsai, C.-Y. et al.; "TE10 Subtest2: Coding Unit Synchronous Picture Quadtree-based Adaptive Loop Filter"; Document: JCTVC-C143; Joint Collaborative Team on Video Coding (JCT-VC) of ITU-T SG 16 WP3 and ISO/IEC JTC1/SC 29/WG11, 3rd Meeting: Guangzhou, CN, Oct. 7-15, 2010; 12 pages.

International Search Report dated May 3, 2022 for International Application No. PCT/US2022/014255.

Written Opinion dated May 3, 2022 for International Application No. PCT/US2022/014255.

* cited by examiner

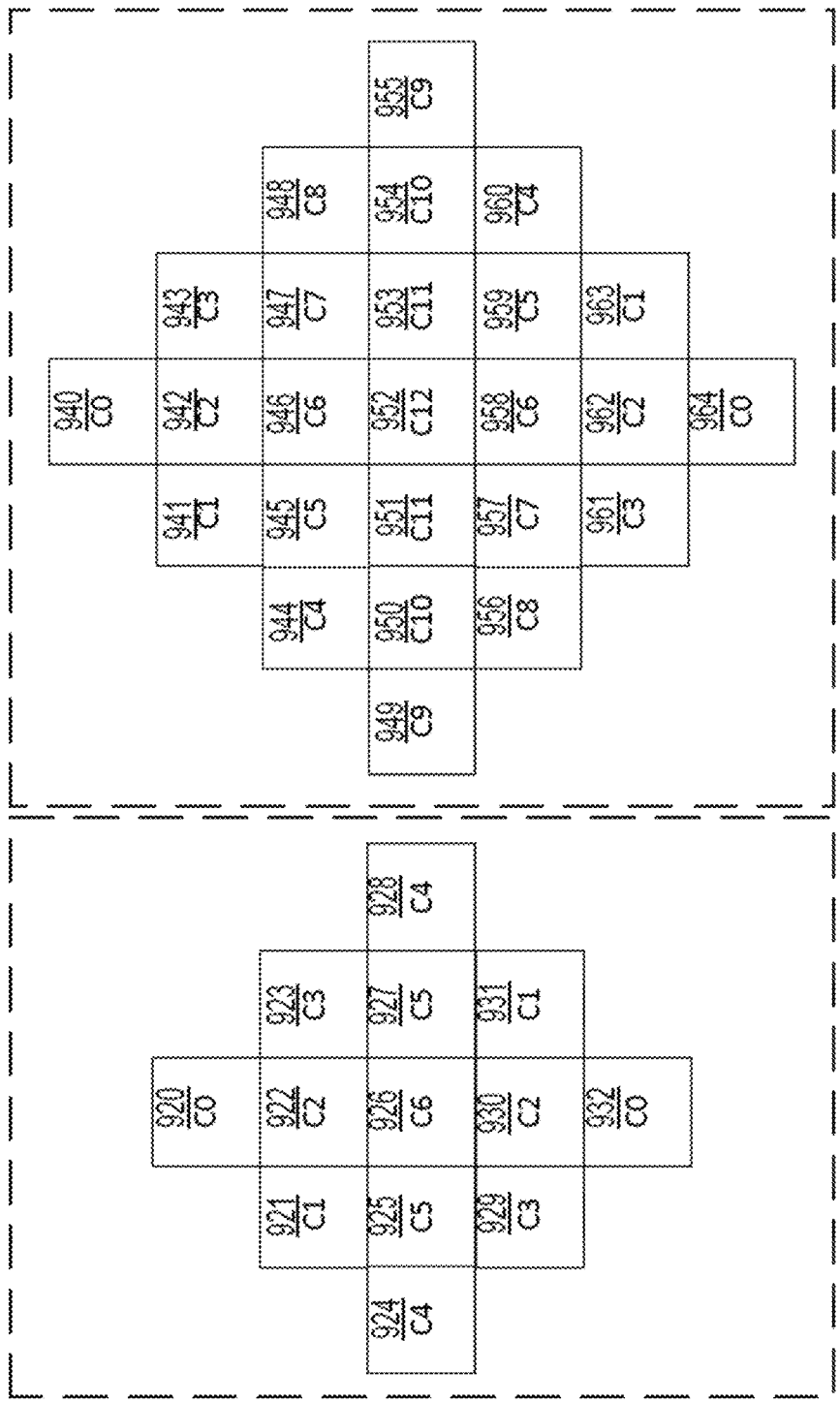

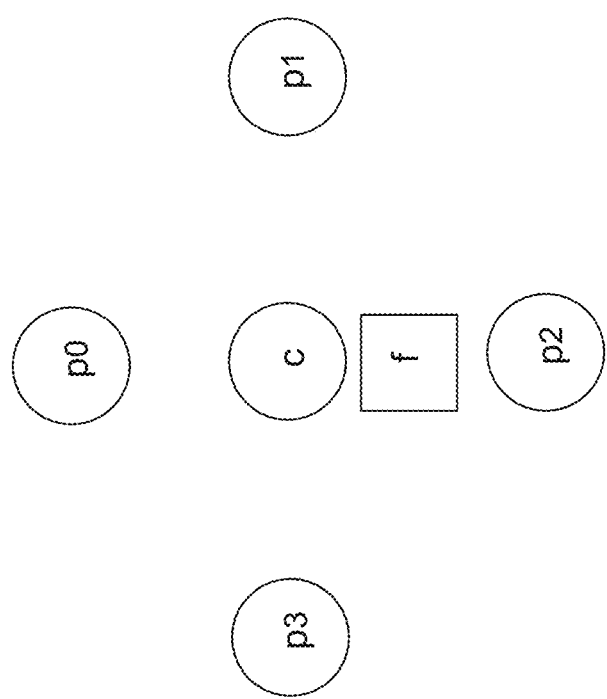

FIG. 21A

| Combination | d0 | d1 | d2 | d3 | Offset |
|---|---|---|---|---|---|
| 0 | -1 | -1 | -1 | -1 | s0 |
| 1 | -1 | -1 | -1 | 0 | s1 |
| 2 | -1 | -1 | -1 | 1 | s2 |
| 3 | -1 | -1 | 0 | -1 | s3 |
| 4 | -1 | -1 | 0 | 0 | s4 |
| 5 | -1 | -1 | 0 | 1 | s5 |
| 6 | -1 | -1 | 1 | -1 | s6 |
| 7 | -1 | -1 | 1 | 0 | s7 |
| 8 | -1 | -1 | 1 | 1 | s8 |
| 9 | -1 | 0 | -1 | -1 | s9 |
| 10 | -1 | 0 | -1 | 0 | s10 |
| 11 | -1 | 0 | -1 | 1 | s11 |
| 12 | -1 | 0 | 0 | -1 | s12 |
| 13 | -1 | 0 | 0 | 0 | s13 |
| 14 | -1 | 0 | 0 | 1 | s14 |
| 15 | -1 | 0 | 1 | -1 | s15 |
| 16 | -1 | 0 | 1 | 0 | s16 |
| 17 | -1 | 0 | 1 | 1 | s17 |
| 18 | -1 | 1 | -1 | -1 | s18 |
| 19 | -1 | 1 | -1 | 0 | s19 |
| 20 | -1 | 1 | -1 | 1 | s20 |
| 21 | -1 | 1 | 0 | -1 | s21 |
| 22 | -1 | 1 | 0 | 0 | s22 |
| 23 | -1 | 1 | 0 | 1 | s23 |
| 24 | -1 | 1 | 1 | -1 | s24 |
| 25 | -1 | 1 | 1 | 0 | s25 |
| 26 | -1 | 1 | 1 | 1 | s26 |

FIG. 21B

Continued from FIG. 21A

| Combination | d0 | d1 | d2 | d3 | Offset |
|---|---|---|---|---|---|
| 27 | 0 | -1 | -1 | -1 | s27 |
| 28 | 0 | -1 | -1 | 0 | s28 |
| 29 | 0 | -1 | -1 | 1 | s29 |
| 30 | 0 | -1 | 0 | -1 | s30 |
| 31 | 0 | -1 | 0 | 0 | s31 |
| 32 | 0 | -1 | 0 | 1 | s32 |
| 33 | 0 | -1 | 1 | -1 | s33 |
| 34 | 0 | -1 | 1 | 0 | s34 |
| 35 | 0 | -1 | 1 | 1 | s35 |
| 36 | 0 | 0 | -1 | -1 | s36 |
| 37 | 0 | 0 | -1 | 0 | s37 |
| 38 | 0 | 0 | -1 | 1 | s38 |
| 39 | 0 | 0 | 0 | -1 | s39 |
| 40 | 0 | 0 | 0 | 0 | s40 |
| 41 | 0 | 0 | 0 | 1 | s41 |
| 42 | 0 | 0 | 1 | -1 | s42 |
| 43 | 0 | 0 | 1 | 0 | s43 |
| 44 | 0 | 0 | 1 | 1 | s44 |
| 45 | 0 | 1 | -1 | -1 | s45 |
| 46 | 0 | 1 | -1 | 0 | s46 |
| 47 | 0 | 1 | -1 | 1 | s47 |
| 48 | 0 | 1 | 0 | -1 | s48 |
| 49 | 0 | 1 | 0 | 0 | s49 |
| 50 | 0 | 1 | 0 | 1 | s50 |
| 51 | 0 | 1 | 1 | -1 | s51 |
| 52 | 0 | 1 | 1 | 0 | s52 |
| 53 | 0 | 1 | 1 | 1 | s53 |

FIG. 21C

*Continued from FIG. 21B*

| Combination | d0 | d1 | d2 | d3 | Offset |
|---|---|---|---|---|---|
| 54 | 1 | -1 | -1 | -1 | s54 |
| 55 | 1 | -1 | -1 | 0 | s55 |
| 56 | 1 | -1 | -1 | 1 | s56 |
| 57 | 1 | -1 | 0 | -1 | s57 |
| 58 | 1 | -1 | 0 | 0 | s58 |
| 59 | 1 | -1 | 0 | 1 | s59 |
| 60 | 1 | -1 | 1 | -1 | s60 |
| 61 | 1 | -1 | 1 | 0 | s61 |
| 62 | 1 | -1 | 1 | 1 | s62 |
| 63 | 1 | 0 | -1 | -1 | s63 |
| 64 | 1 | 0 | -1 | 0 | s64 |
| 65 | 1 | 0 | -1 | 1 | s65 |
| 66 | 1 | 0 | 0 | -1 | s66 |
| 67 | 1 | 0 | 0 | 0 | s67 |
| 68 | 1 | 0 | 0 | 1 | s68 |
| 69 | 1 | 0 | 1 | -1 | s69 |
| 70 | 1 | 0 | 1 | 0 | s70 |
| 71 | 1 | 0 | 1 | 1 | s71 |
| 72 | 1 | 1 | -1 | -1 | s72 |
| 73 | 1 | 1 | -1 | 0 | s73 |
| 74 | 1 | 1 | -1 | 1 | s74 |
| 75 | 1 | 1 | 0 | -1 | s75 |
| 76 | 1 | 1 | 0 | 0 | s76 |
| 77 | 1 | 1 | 0 | 1 | s77 |
| 78 | 1 | 1 | 1 | -1 | s78 |
| 79 | 1 | 1 | 1 | 0 | s79 |
| 80 | 1 | 1 | 1 | 1 | s80 |

ADAPTIVE NON-LINEAR MAPPING FOR SAMPLE OFFSET

INCORPORATION BY REFERENCE

This disclosure is based on and claims the benefit of priority to U.S. Provisional Application No. 63/163,707, entitled "ADAPTIVE NON-LINEAR MAPPING FOR SAMPLE OFFSET", filed on Mar. 19, 2021, which is herein incorporated by reference in its entirety.

TECHNICAL FIELD

This disclosure generally describes a set of advanced video coding technologies, and is specifically related to sample offset filtering with local adaptability.

BACKGROUND

This background description provided herein is for the purpose of generally presenting the context of the disclosure. Work of the presently named inventors, to the extent the work is described in this background section, as well as aspects of the description that may not otherwise qualify as prior art at the time of filing of this application, are neither expressly nor impliedly admitted as prior art against the present disclosure.

Video coding and decoding can be performed using inter-picture prediction with motion compensation. Uncompressed digital video can include a series of pictures, with each picture having a spatial dimension of, for example, 1920×1080 luminance samples and associated full or subsampled chrominance samples. The series of pictures can have a fixed or variable picture rate (alternatively referred to as frame rate) of, for example, 60 pictures per second or 60 frames per second. Uncompressed video has specific bitrate requirements for streaming or data processing. For example, video with a pixel resolution of 1920×1080, a frame rate of 60 frames/second, and a chroma subsampling of 4:2:0 at 8 bit per pixel per color channel requires close to 1.5 Gbit/s bandwidth. An hour of such video requires more than 600 GBytes of storage space.

One purpose of video coding and decoding can be the reduction of redundancy in the uncompressed input video signal, through compression. Compression can help reduce the aforementioned bandwidth and/or storage space requirements, in some cases, by two orders of magnitude or more. Both lossless compression and lossy compression, as well as a combination thereof can be employed. Lossless compression refers to techniques where an exact copy of the original signal can be reconstructed from the compressed original signal via a decoding process. Lossy compression refers to coding/decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application albeit some information loss. In the case of video, lossy compression is widely employed in many applications. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance: higher tolerable distortion generally allows for coding algorithms that yield higher losses and higher compression ratios.

A video encoder and decoder can utilize techniques from several broad categories and steps, including, for example, motion compensation, Fourier transform, quantization, and entropy coding.

Video codec technologies can include techniques known as intra coding. In intra coding, sample values are represented without reference to samples or other data from previously reconstructed reference pictures. In some video codecs, a picture is spatially subdivided into blocks of samples. When all blocks of samples are coded in intra mode, that picture can be referred to as an intra picture. Intra pictures and their derivatives such as independent decoder refresh pictures, can be used to reset the decoder state and can, therefore, be used as the first picture in a coded video bitstream and a video session, or as a still image. The samples of a block after intra prediction can then be subject to a transform into frequency domain, and the transform coefficients so generated can be quantized before entropy coding. Intra prediction represents a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as that known from, for example, MPEG-2 generation coding technologies, does not use intra prediction. However, some newer video compression technologies include techniques that attempt coding/decoding of blocks based on, for example, surrounding sample data and/or metadata that are obtained during the encoding and/or decoding of spatially neighboring, and that precede in decoding order the blocks of data being intra coded or decoded. Such techniques are henceforth called "intra prediction" techniques. Note that in at least some cases, intra prediction uses reference data only from the current picture under reconstruction and not from other reference pictures.

There can be many different forms of intra prediction. When more than one of such techniques are available in a given video coding technology, the technique in use can be referred to as an intra prediction mode. One or more intra prediction modes may be provided in a particular codec. In certain cases, modes can have submodes and/or may be associated with various parameters, and mode/submode information and intra coding parameters for blocks of video can be coded individually or collectively included in mode codewords. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). Generally, for intra prediction, a predictor block can be formed using neighboring sample values that have become available. For example, available values of particular set of neighboring samples along certain direction and/or lines may be copied into the predictor block. A reference to the direction in use can be coded in the bitstream or may itself be predicted.

Referring to FIG. 1A, depicted in the lower right is a subset of nine predictor directions specified in H.265's 33 possible intra predictor directions (corresponding to the 33 angular modes of the 35 intra modes specified in H.265). The point where the arrows converge (101) represents the sample being predicted. The arrows represent the direction from which neighboring samples are used to predict the sample at 101. For example, arrow (102) indicates that sample (101) is predicted from a neighboring sample or samples to the upper right, at a 45 degree angle from the horizontal direction. Similarly, arrow (103) indicates that sample (101) is predicted from a neighboring sample or samples to the lower left of sample (101), in a 22.5 degree angle from the horizontal direction.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are example reference samples that follow a similar numbering scheme. A reference sample is labelled with an R, its Y position (e.g., row index) and X position (column index) relative to block (104). In both H.264 and H.265, prediction samples adjacently neighboring the block under reconstruction are used.

Intra picture prediction of block 104 may begin by copying reference sample values from the neighboring samples according to a signaled prediction direction. For example, assuming that the coded video bitstream includes signaling that, for this block 104, indicates a prediction direction of arrow (102)—that is, samples are predicted from a prediction sample or samples to the upper right, at a 45-degree angle from the horizontal direction. In such a case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has continued to develop. In H.264 (year 2003), for example, nine different direction are available for intra prediction. That increased to 33 in H.265 (year 2013), and JEM/VVC/BMS, at the time of this disclosure, can support up to 65 directions. Experimental studies have been conducted to help identify the most suitable intra prediction directions, and certain techniques in the entropy coding may be used to encode those most suitable directions in a small number of bits, accepting a certain bit penalty for directions. Further, the directions themselves can sometimes be predicted from neighboring directions used in the intra prediction of the neighboring blocks that have been decoded.

FIG. 1B shows a schematic (180) that depicts 65 intra prediction directions according to JEM to illustrate the increasing number of prediction directions in various encoding technologies developed over time.

The manner for mapping of bits representing intra prediction directions to the prediction directions in the coded video bitstream may vary from video coding technology to video coding technology; and can range, for example, from simple direct mappings of prediction direction to intra prediction mode, to codewords, to complex adaptive schemes involving most probable modes, and similar techniques. In all cases, however, there can be certain directions for intro prediction that are statistically less likely to occur in video content than certain other directions. As the goal of video compression is the reduction of redundancy, those less likely directions will, in a well-designed video coding technology, may be represented by a larger number of bits than more likely directions.

Inter picture prediction, or inter prediction may be based on motion compensation. In motion compensation, sample data from a previously reconstructed picture or part thereof (reference picture), after being spatially shifted in a direction indicated by a motion vector (MV henceforth), may be used for a prediction of a newly reconstructed picture or picture part (e.g., a block). In some cases, the reference picture can be the same as the picture currently under reconstruction. MVs may have two dimensions X and Y, or three dimensions, with the third dimension being an indication of the reference picture in use (akin to a time dimension).

In some video compression techniques, a current MV applicable to a certain area of sample data can be predicted from other MVs, for example from those other MVs that are related to other areas of the sample data that are spatially adjacent to the area under reconstruction and precede the current MV in decoding order. Doing so can substantially reduce the overall amount of data required for coding the MVs by relying on removing redundancy in correlated MVs, thereby increasing compression efficiency. MV prediction can work effectively, for example, because when coding an input video signal derived from a camera (known as natural video) there is a statistical likelihood that areas larger than the area to which a single MV is applicable move in a similar direction in the video sequence and, therefore, can in some cases be predicted using a similar motion vector derived from MVs of neighboring area. That results in the actual MV for a given area to be similar or identical to the MV predicted from the surrounding MVs. Such an MV in turn may be represented, after entropy coding, in a smaller number of bits than what would be used if the MV is coded directly rather than predicted from the neighboring MV(s). In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 specifies, described below is a technique henceforth referred to as "spatial merge".

Specifically, referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block uses.

SUMMARY

Aspects of the disclosure provide methods and apparatuses for cross sample offset filtering and local sample offset filtering in video encoding and decoding.

In some example implementations, a method for in-loop filtering of a video stream is disclosed. The method may include comprising obtaining at least one statistical property associated with reconstructed samples of at least a first color component in a current reconstructed data block of the video stream; selecting a target sample offset filter among a plurality of sample offset filters based on the at least one statistical property, the target sample offset filter comprising a nonlinear mapping between sample delta measures and sample offset values; and filtering a current sample in a second color component of the current reconstructed data block using the target sample offset filter and reference samples in a third color component of the current reconstructed data block to generate a filtered reconstructed sample of the current sample.

In the implementations above, the first color component may be a same color component as the third color component. The first color component may be a same color component as the second color component. The second color component may be a different color component as the third color component. The second color component may be a same color component as the third color component. The at least the first color component may include one, two, or three color components.

In any of the implementations above, the at least one statistical property may include edge information of the current reconstructed data block. Further, the edge information of the current reconstructed data block comprises an edge direction derived in a Constrained Directional Enhanced Filtering (CDEF) process, and the plurality of sample offset filters comprise N sample offset filters corresponding to N CDEF edge directions, N being an integer between 1 and 8 inclusive. Further, the plurality of sample offset filters are signaled at a frame level in high level syntax (HLS).

In any of the implementations above, the at least one statistical property comprises a smoothness measure of the current reconstructed data block. Further the smoothness measure of the current reconstructed data block is mapped to one of M predefined smoothness levels characterized by M−1 smoothness level thresholds; the plurality of sample offset filters comprises M sample offset filters corresponding to the M predefined smoothness levels; and the target sample offset filter is selected from the M sample offset filters according the one of the M predefined smoothness levels mapped to the smoothness measure.

In any of the implementations above the at least one statistical property comprises a coding information of the current reconstructed data block. Further, coding information comprises a current prediction mode of the current reconstructed data block; the plurality of sample offset filters correspond to different prediction modes; and the target sample offset filter is selected from the plurality of sample offset filters according to the current prediction mode of the current reconstructed data block. Further, the different prediction modes comprise at least one of intra DC mode, intra Planar mode, intra PAETH mode, intra SMOOTH mode, intra recursive filtering mode, and inter SKIP mode.

In any of the implementations above, each of the plurality of sample offset filters is associated with a set of filter coefficients, a number of filter taps, and positions of the number of filter taps.

In any of the implementations above, filtering the current sample in the second color component of the current reconstructed data block using the target sample offset filter and the reference samples in the third color component of the current reconstructed data block to generate the filtered reconstructed sample of the current sample may include determining a first location of the current sample of the second color component and second locations of a plurality of filter taps associated with the target sample offset filter; identifying reconstructed samples of the third color component at the first location and the second locations as the reference samples; determining a delta measure between the reference samples corresponding to the second locations and the reference sample corresponding to the first location, both in the third color component of the current reconstructed data block; extracting a sample offset value from the target sample offset filter based on the delta measure; and filtering the current sample of the second color component using the sample offset value to generate the filtered reconstructed sample of the current sample.

In any of the implementations above, the plurality of sample offset filters may be predetermined. The plurality of sample offset filters and an index of the selected target sample offset filter among the plurality of sample offset filters may be signaled at a sequence level, a picture level, or coding tree unit level.

In some implementations, a video encoding or decoding device is disclosed. The device may include circuitry configured to implement any of the methods above.

Aspects of the disclosure also provide non-transitory computer-readable mediums storing instructions which when executed by a computer for video decoding and/or encoding cause the computer to perform the methods for video decoding and/or encoding.

BRIEF DESCRIPTION OF THE DRAWINGS

Further features, the nature, and various advantages of the disclosed subject matter will be more apparent from the following detailed description and the accompanying drawings in which:

FIG. 9 shows exemplary adaptive loop filters according to embodiments of the disclosure.

FIGS. 10A-10D show examples of subsampled positions used for calculating gradients of a vertical direction, a horizontal direction, and two diagonal directions, respectively, according to embodiments of the disclosure.

FIGS. 12A-12F show exemplary adaptive loop filters with padding operations at respective virtual boundaries according to embodiments of the disclosure.

FIG. 20 shows an example of a filter support area in a Cross-Component Sample Offset (CCSO) filter according to an embodiment of the disclosure.

FIGS. 21A-21C show an exemplary mapping used in a CCSO filter according to an embodiment of the disclosure.

DETAILED DESCRIPTION OF EMBODIMENTS

Figure 1A:
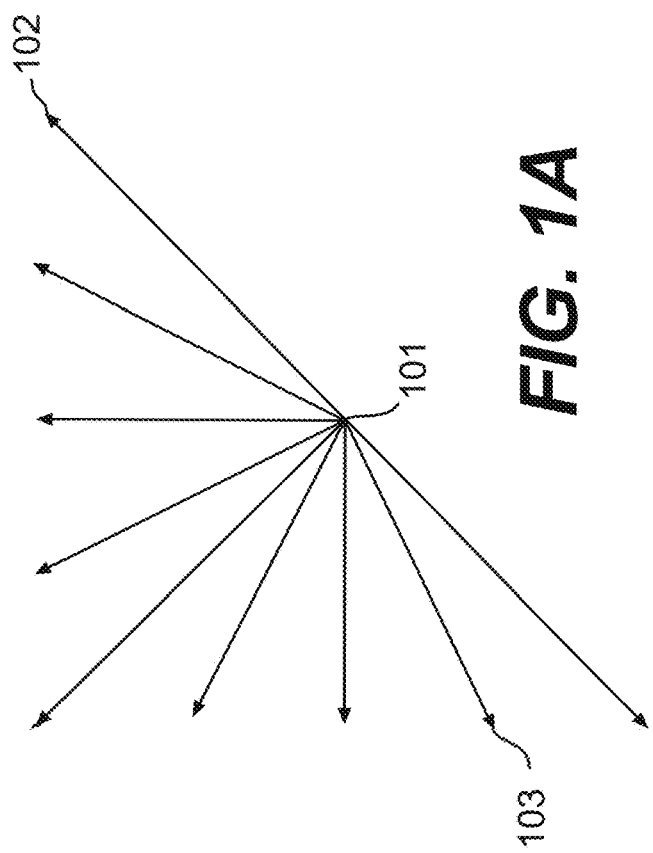
FIG. 1A shows a schematic illustration of an exemplary subset of intra prediction directional modes.
Figure 1B:
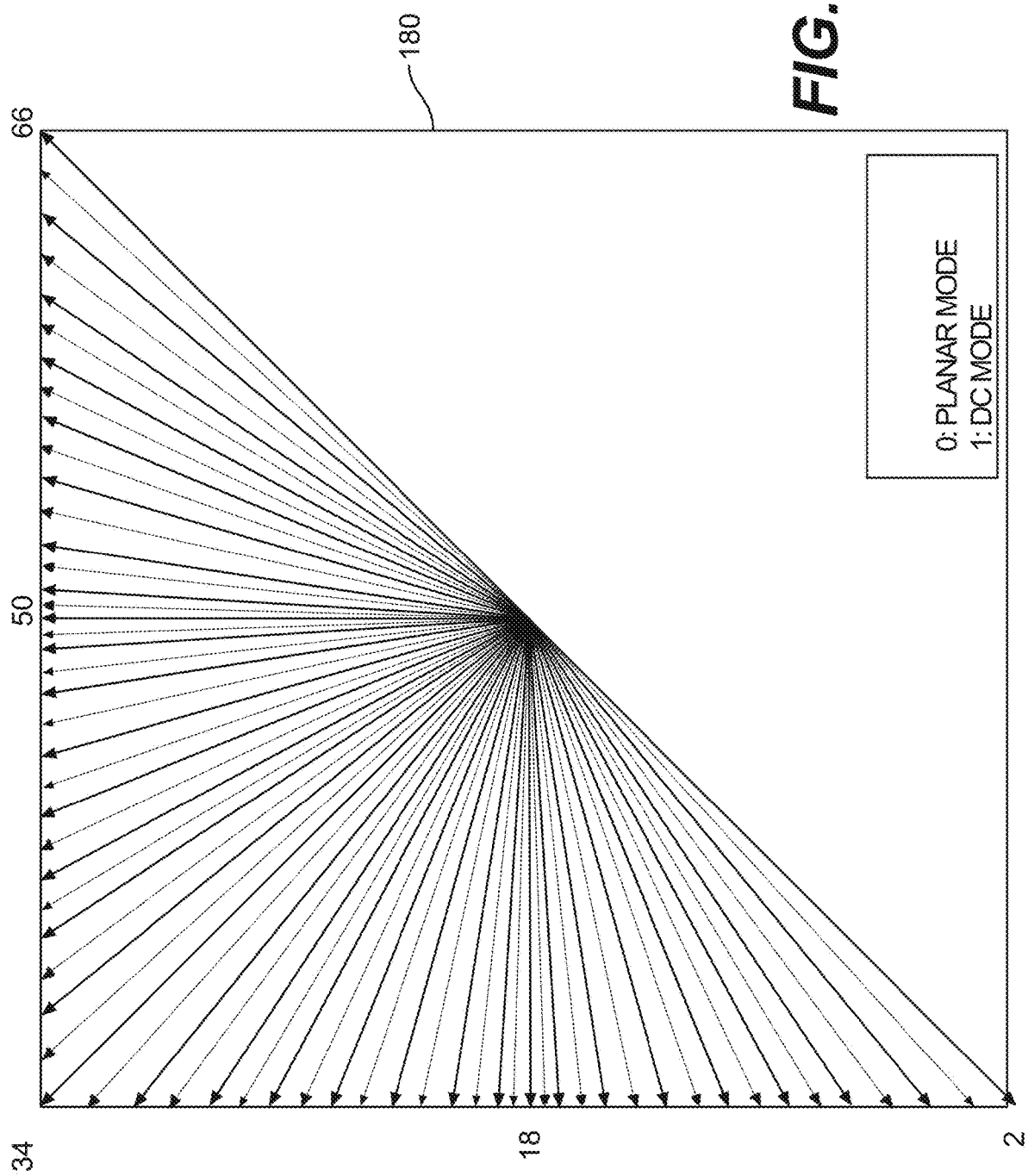
FIG. 1B shows an illustration of exemplary intra prediction directions.
Figure 2:
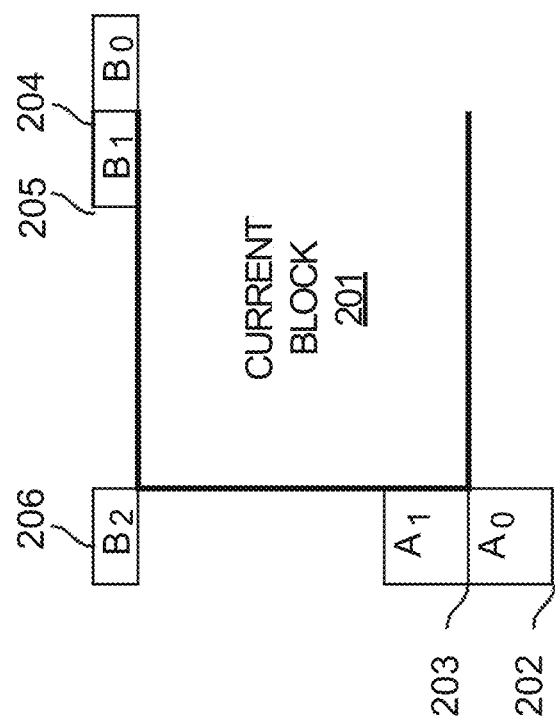
FIG. 2 shows a schematic illustration of a current block and its surrounding spatial merge candidates for motion vector prediction in one example.
Figure 3:
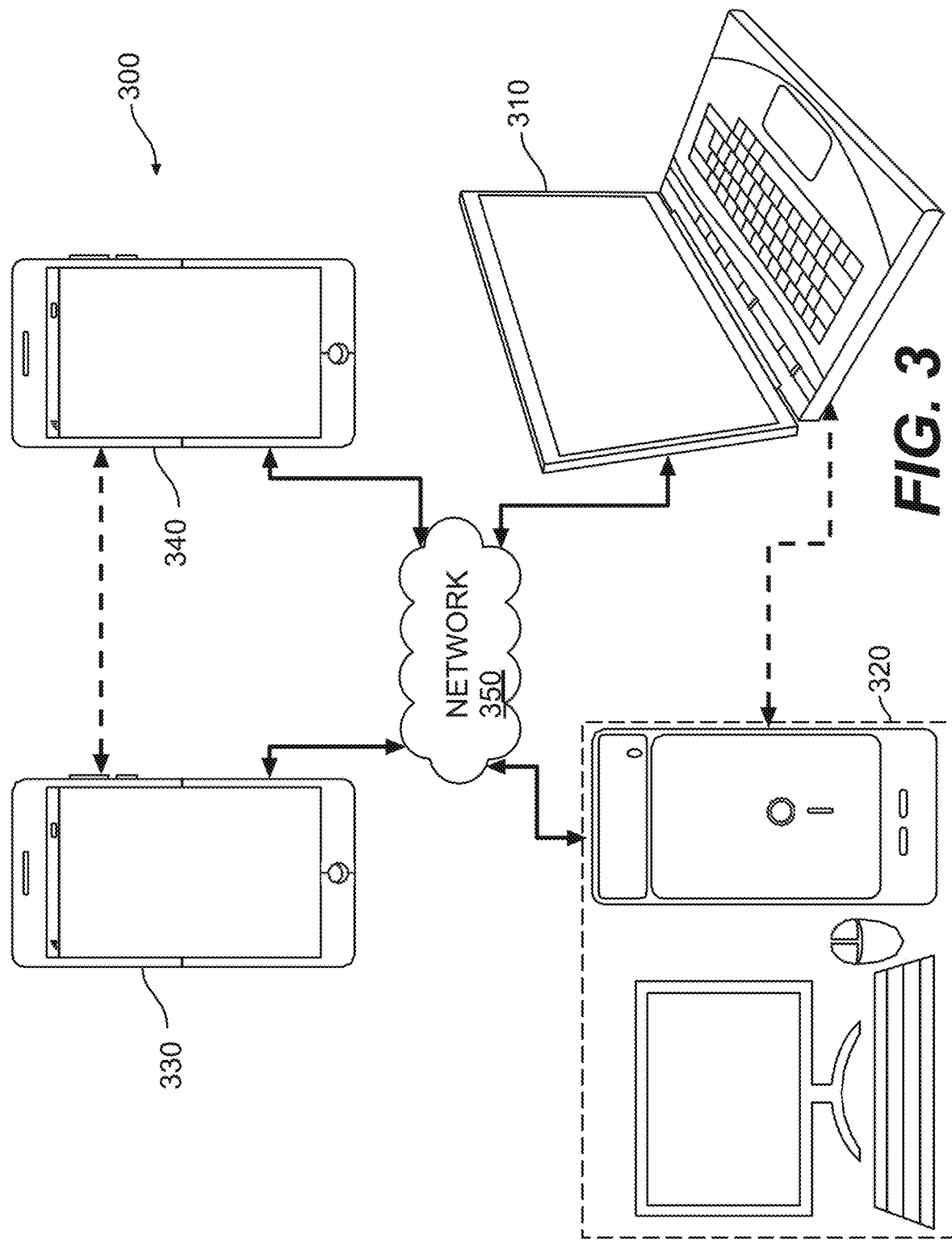
FIG. 3 shows a schematic illustration of a simplified block diagram of a communication system (300) in accordance with an example embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the example of FIG. 3, the first pair of terminal devices (310) and (320) may perform unidirectional transmission of data. For example, the terminal device (310) may code video data (e.g., of a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display the video pictures according to the recovered video data. Unidirectional data transmission may be implemented in media serving applications and the like.

In another example, the communication system (300) includes a second pair of terminal devices (330) and (340) that perform bidirectional transmission of coded video data that may be implemented, for example, during a videoconferencing application. For bidirectional transmission of data, in an example, each terminal device of the terminal devices (330) and (340) may code video data (e.g., of a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display the video pictures at an accessible display device according to the recovered video data.

In the example of FIG. 3, the terminal devices (310), (320), (330) and (340) may be implemented as servers, personal computers and smart phones but the applicability of the underlying principles of the present disclosure may not be so limited. Embodiments of the present disclosure may be implemented in desktop computers, laptop computers, tablet computers, media players, wearable computers, dedicated video conferencing equipment, and/or the like. The network (350) represents any number or types of networks that convey coded video data among the terminal devices (310), (320), (330) and (340), including for example wireline (wired) and/or wireless communication networks. The communication network (350) may exchange data in circuit-switched, packet-switched, and/or other types of channels. Representative networks include telecommunications networks, local area networks, wide area networks and/or the Internet. For the purposes of the present discussion, the architecture and topology of the network (350) may be immaterial to the operation of the present disclosure unless explicitly explained herein.

Figure 4:
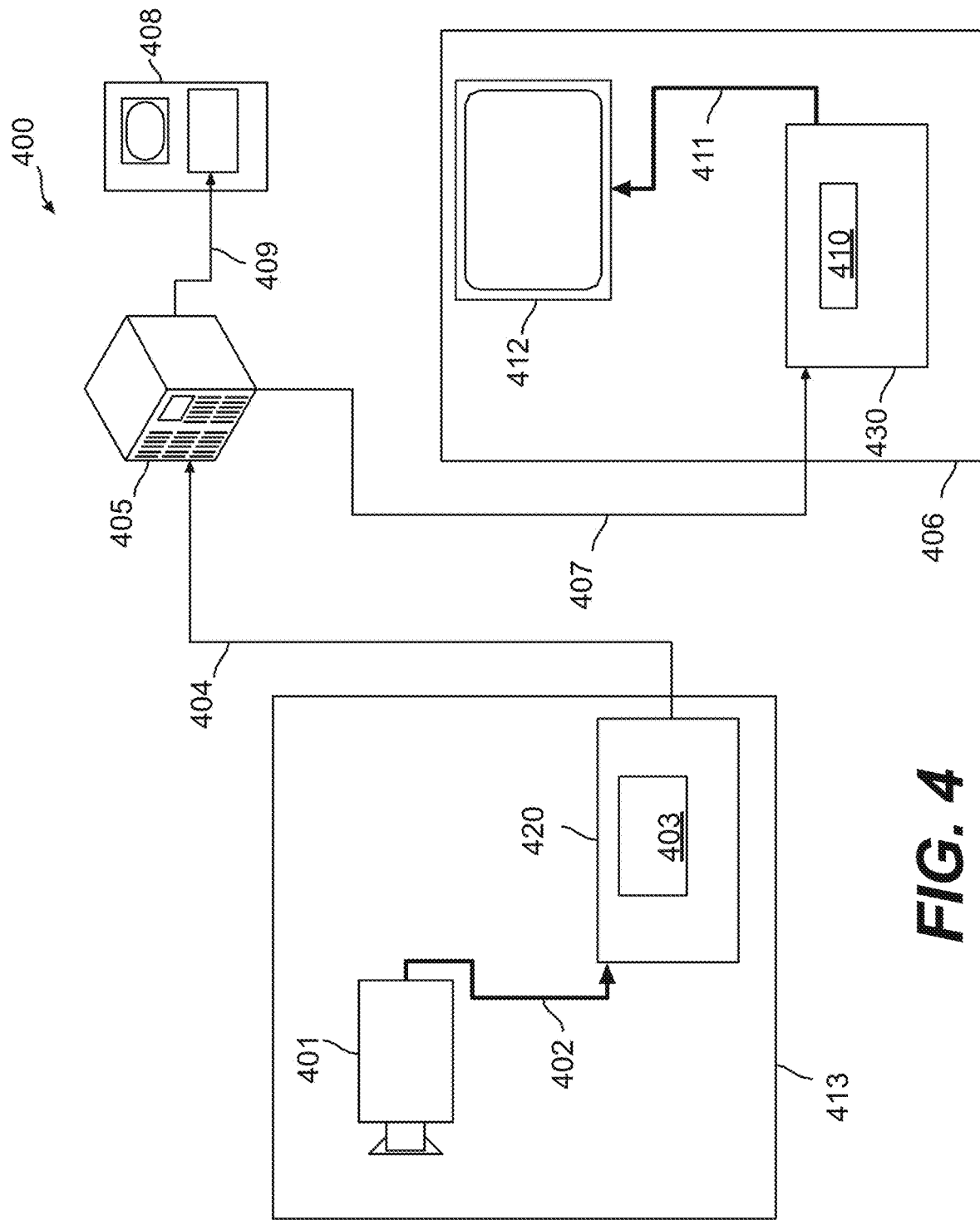
FIG. 4 shows a schematic illustration of a simplified block diagram of a communication system (400) in accordance with an example embodiment.

FIG. 4 illustrates, as an example for an application for the disclosed subject matter, a placement of a video encoder and a video decoder in a video streaming environment. The disclosed subject matter may be equally applicable to other video applications, including, for example, video conferencing, digital TV broadcasting, gaming, virtual reality, storage of compressed video on digital media including CD, DVD, memory stick and the like, and so on.

A video streaming system may include a video capture subsystem (413) that can include a video source (401), e.g., a digital camera, for creating a stream of video pictures or images (402) that are uncompressed. In an example, the stream of video pictures (402) includes samples that are recorded by a digital camera of the video source 401. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize a lower data volume when compared to the stream of uncompressed video pictures (402), can be stored on a streaming server (405) for future use or directly to downstream video devices (not shown). One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that are uncompressed and that can be rendered on a display (412) (e.g., a display screen) or other rendering devices (not depicted). The video decoder 410 may be configured to perform some or all of the various functions described in this disclosure. In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC, and other video coding standards.

It is noted that the electronic devices (420) and (430) can include other components (not shown). For example, the electronic device (420) can include a video decoder (not shown) and the electronic device (430) can include a video encoder (not shown) as well.

Figure 5:
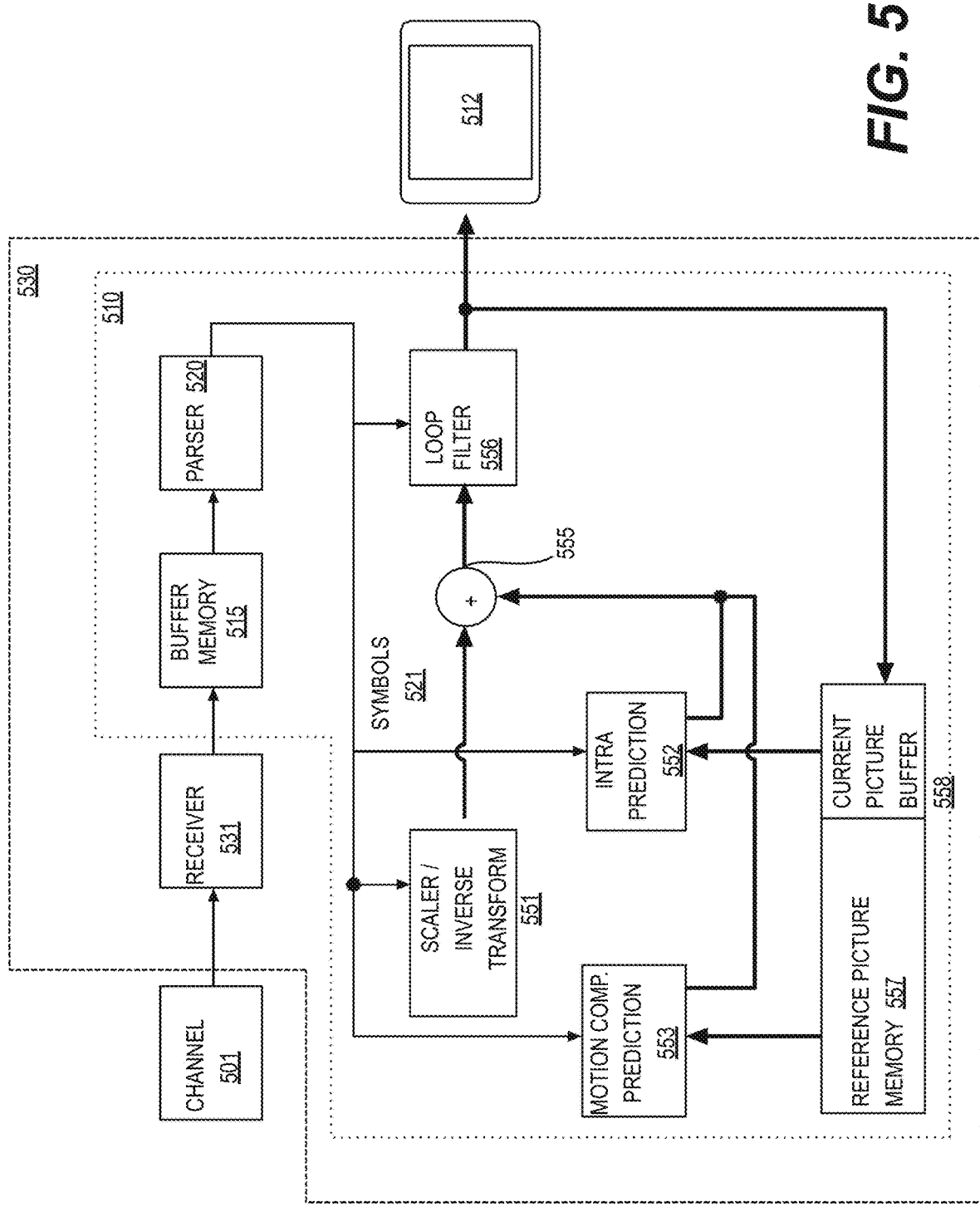
FIG. 5 shows a schematic illustration of a simplified block diagram of a video decoder in accordance with an example embodiment.

FIG. 5 shows a block diagram of a video decoder (510) according to any embodiment of the present disclosure below. The video decoder (510) can be included in an electronic device (530). The electronic device (530) can include a receiver (531) (e.g., receiving circuitry). The video decoder (510) can be used in place of the video decoder (410) in the example of FIG. 4.

The receiver (531) may receive one or more coded video sequences to be decoded by the video decoder (510). In the same or another embodiment, one coded video sequence may be decoded at a time, where the decoding of each coded video sequence is independent from other coded video sequences. Each video sequence may be associated with multiple video frames or images. The coded video sequence may be received from a channel (501), which may be a hardware/software link to a storage device which stores the encoded video data or a streaming source which transmits the encoded video data. The receiver (531) may receive the encoded video data with other data such as coded audio data and/or ancillary data streams, that may be forwarded to their respective processing circuitry (not depicted). The receiver (531) may separate the coded video sequence from the other data. To combat network jitter, a buffer memory (515) may be disposed in between the receiver (531) and an entropy decoder/parser (520) ("parser (520)" henceforth). In certain applications, the buffer memory (515) may be implemented as part of the video decoder (510). In other applications, it can be outside of and separate from the video decoder (510) (not depicted). In still other applications, there can be a buffer memory (not depicted) outside of the video decoder (510) for the purpose of, for example, combating network jitter, and there may be another additional buffer memory (515) inside the video decoder (510), for example to handle playback timing. When the receiver (531) is receiving data from a store/forward device of sufficient bandwidth and controllability, or from an isosynchronous network, the buffer memory (515) may not be needed, or can be small. For use on best-effort packet networks such as the Internet, the buffer memory (515) of sufficient size may be required, and its size can be comparatively large. Such buffer memory may be implemented with an adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as display (512) (e.g., a display screen) that may or may not an integral part of the electronic device (530) but can be coupled to the electronic device (530), as is shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received by the parser (520). The entropy coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the subgroups. The subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients (e.g., Fourier transform coefficients), quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different processing or functional units depending on the type of the coded video picture or parts thereof (such as: inter and intra picture, inter and intra block), and other factors. The units that are involved and how they are involved may be controlled by the subgroup control information that was parsed from the coded video sequence by the parser (520). The flow of such subgroup control information between the parser (520) and the multiple processing or functional units below is not depicted for simplicity.

Beyond the functional blocks already mentioned, the video decoder (510) can be conceptually subdivided into a number of functional units as described below. In a practical implementation operating under commercial constraints, many of these functional units interact closely with each other and can, at least partly, be integrated with one another. However, for the purpose of describing the various functions of the disclosed subject matter with clarity, the conceptual subdivision into the functional units is adopted in the disclosure below.

A first unit may include the scaler/inverse transform unit (551). The scaler/inverse transform unit (551) may receive a quantized transform coefficient as well as control information, including information indicating which type of inverse transform to use, block size, quantization factor/parameters, quantization scaling matrices, and the lie as symbol(s) (521) from the parser (520). The scaler/inverse transform unit (551) can output blocks comprising sample values that can be input into aggregator (555).

In some cases, the output samples of the scaler/inverse transform (551) can pertain to an intra coded block, i.e., a block that does not use predictive information from previously reconstructed pictures, but can use predictive information from previously reconstructed parts of the current picture. Such predictive information can be provided by an intra picture prediction unit (552). In some cases, the intra picture prediction unit (552) may generate a block of the same size and shape of the block under reconstruction using surrounding block information that is already reconstructed and stored in the current picture buffer (558). The current picture buffer (558) buffers, for example, partly reconstructed current picture and/or fully reconstructed current picture. The aggregator (555), in some implementations, may add, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for inter-picture prediction. After motion compensating the fetched samples in accordance with the symbols (521) pertaining to the block, these samples can be added by the aggregator (555) to the output of the scaler/inverse transform unit (551) (output of unit 551 may be referred to as the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y components (shift), and reference picture components (time). Motion compensation may also include interpolation of sample values as fetched from the reference picture memory (557) when sub-sample exact motion vectors are in use, and may also be associated with motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values. Several type of loop filters may be included as part of the loop filter unit 556 in various orders, as will be described in further detail below.

The output of the loop filter unit (556) can be a sample stream that can be output to the rendering device (512) as well as stored in the reference picture memory (557) for use in future inter-picture prediction.

Certain coded pictures, once fully reconstructed, can be used as reference pictures for future inter-picture prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology adopted in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools from all the tools available in the video compression technology or standard as the only tools available for use under that profile. To be standard-compliant, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In some example embodiments, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
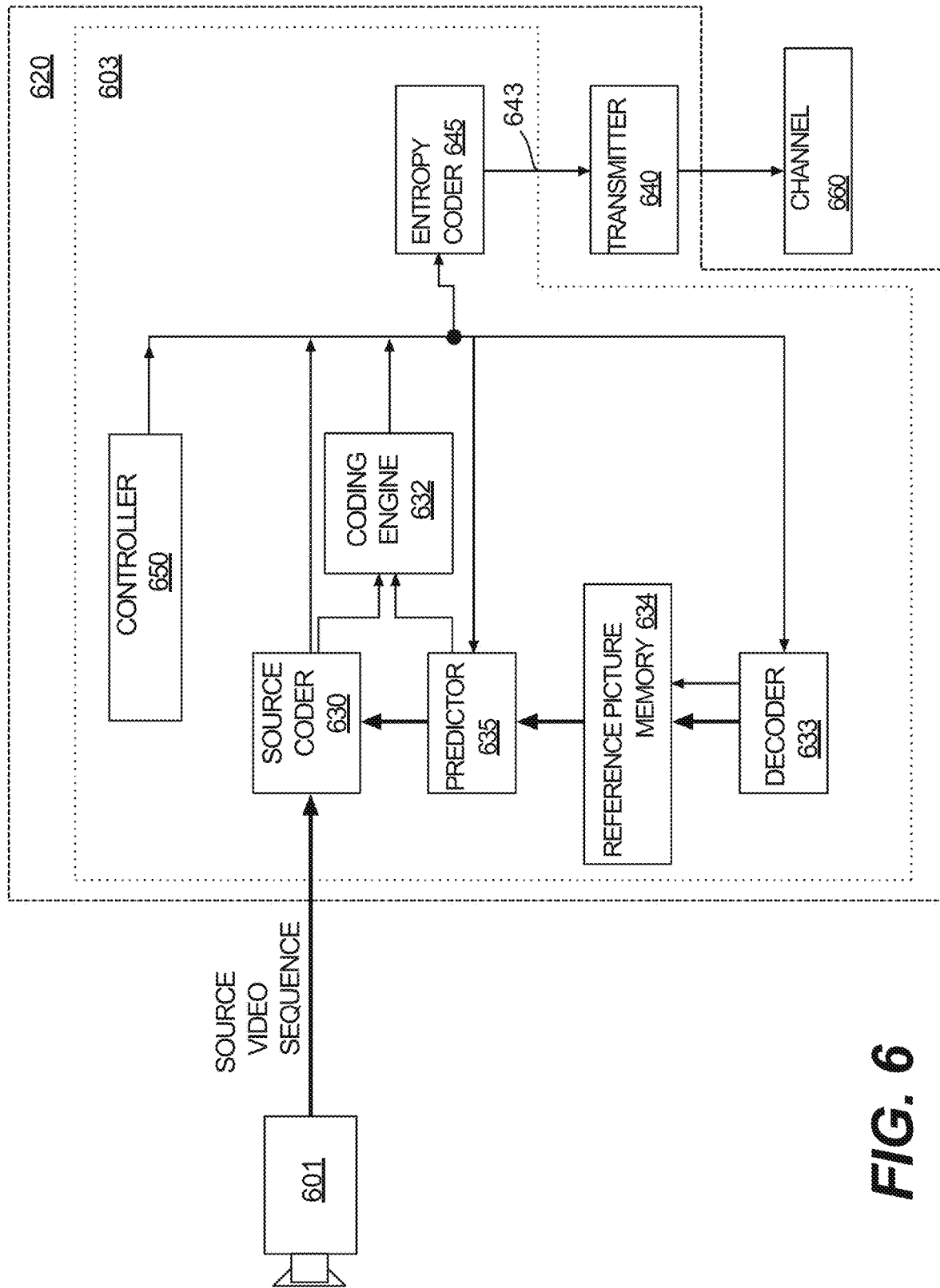
FIG. 6 shows a schematic illustration of a simplified block diagram of a video encoder in accordance with an example embodiment.

FIG. 6 shows a block diagram of a video encoder (603) according to an example embodiment of the present disclosure. The video encoder (603) may be included in an electronic device (620). The electronic device (620) may further include a transmitter (640) (e.g., transmitting circuitry). The video encoder (603) can be used in place of the video encoder (403) in the example of FIG. 4.

The video encoder (603) may receive video samples from a video source (601) (that is not part of the electronic device (620) in the example of FIG. 6) that may capture video image(s) to be coded by the video encoder (603). In another example, the video source (601) may be implemented as a portion of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 YCrCb, RGB, XYZ . . . ), and any suitable sampling structure (for example YCrCb 4:2:0, YCrCb 4:4:4). In a media serving system, the video source (601) may be a storage device capable of storing previously prepared video. In a videoconferencing system, the video source (601) may be a camera that captures local image information as a video sequence. Video data may be provided as a plurality of individual pictures or images that impart motion when viewed in sequence. The pictures themselves may be organized as a spatial array of pixels, wherein each pixel can comprise one or more samples depending on the sampling structure, color space, and the like being in use. A person having ordinary skill in the art can readily understand the relationship between pixels and samples. The description below focuses on samples.

According to some example embodiments, the video encoder (603) may code and compress the pictures of the source video sequence into a coded video sequence (643) in real time or under any other time constraints as required by the application. Enforcing appropriate coding speed constitutes one function of a controller (650). In some embodiments, the controller (650) may be functionally coupled to and control other functional units as described below. The coupling is not depicted for simplicity. Parameters set by the controller (650) can include rate control related parameters (picture skip, quantizer, lambda value of rate-distortion optimization techniques, . . . ), picture size, group of pictures (GOP) layout, maximum motion vector search range, and the like. The controller (650) can be configured to have other suitable functions that pertain to the video encoder (603) optimized for a certain system design.

In some example embodiments, the video encoder (603) may be configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder would create even though the embedded decoder 633 process coded video steam by the source coder 630 without entropy coding (as any compression between symbols and coded video bitstream in entropy coding may be lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used to improve coding quality.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633) in the encoder.

An observation that can be made at this point is that any decoder technology except the parsing/entropy decoding that may only be present in a decoder also may necessarily need to be present, in substantially identical functional form, in a corresponding encoder. For this reason, the disclosed subject matter may at times focus on decoder operation, which allies to the decoding portion of the encoder. The description of encoder technologies can thus be abbreviated as they are the inverse of the comprehensively described decoder technologies. Only in certain areas or aspects a more detail description of the encoder is provided below.

During operation in some example implementations, the source coder (630) may perform motion compensated predictive coding, which codes an input picture predictively with reference to one or more previously coded picture from the video sequence that were designated as "reference pictures." In this manner, the coding engine (632) codes differences (or residue) in the color channels between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end (remote) video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compression of the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person having ordinary skill in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample coding blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures. The source pictures or the intermediate processed pictures may be subdivided into other types of blocks for other purposes. The division of coding blocks and the other types of blocks may or may not follow the same manner, as described in further detail below.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data may accordingly conform to a syntax specified by the video coding technology or standard being used.

In some example embodiments, the transmitter (640) may transmit additional data with the encoded video. The source coder (630) may include such data as part of the coded video sequence. The additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) utilizes spatial correlation in a given picture, and inter-picture prediction utilizes temporal or other correlation between the pictures. For example, a specific picture under encoding/decoding, which is referred to as a current picture, may be partitioned into blocks. A block in the current picture, when similar to a reference block in a previously coded and still buffered reference picture in the video, may be coded by a vector that is referred to as a motion vector. The motion vector points to the reference block in the reference picture, and can have a third dimension identifying the reference picture, in case multiple reference pictures are in use.

In some example embodiments, a bi-prediction technique can be used for inter-picture prediction. According to such bi-prediction technique, two reference pictures, such as a first reference picture and a second reference picture that both proceed the current picture in the video in decoding order (but may be in the past or future, respectively, in display order) are used. A block in the current picture can be coded by a first motion vector that points to a first reference block in the first reference picture, and a second motion vector that points to a second reference block in the second reference picture. The block can be jointly predicted by a combination of the first reference block and the second reference block.

Further, a merge mode technique may be used in the inter-picture prediction to improve coding efficiency.

According to some example embodiments of the disclosure, predictions, such as inter-picture predictions and intra-picture predictions are performed in the unit of blocks. For example, a picture in a sequence of video pictures is partitioned into coding tree units (CTU) for compression, the CTUs in a picture may have the same size, such as 64×64 pixels, 32×32 pixels, or 16×16 pixels. In general, a CTU may include three parallel coding tree blocks (CTBs): one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels. Each of the one or more of the 32×32 block may be further split into 4 CUs of 16×16 pixels. In some example embodiments, each CU may be analyzed during encoding to determine a prediction type for the CU among various prediction types such as an inter prediction type or an intra prediction type. The CU may be split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. The split of a CU into PU (or PBs of different color channels) may be performed in various spatial pattern. A luma or chroma PB, for example, may include a matrix of values (e.g., luma values) for samples, such as 8×8 pixels, 16×16 pixels, 8×16 pixels, 16×8 samples, and the like.

Figure 7:
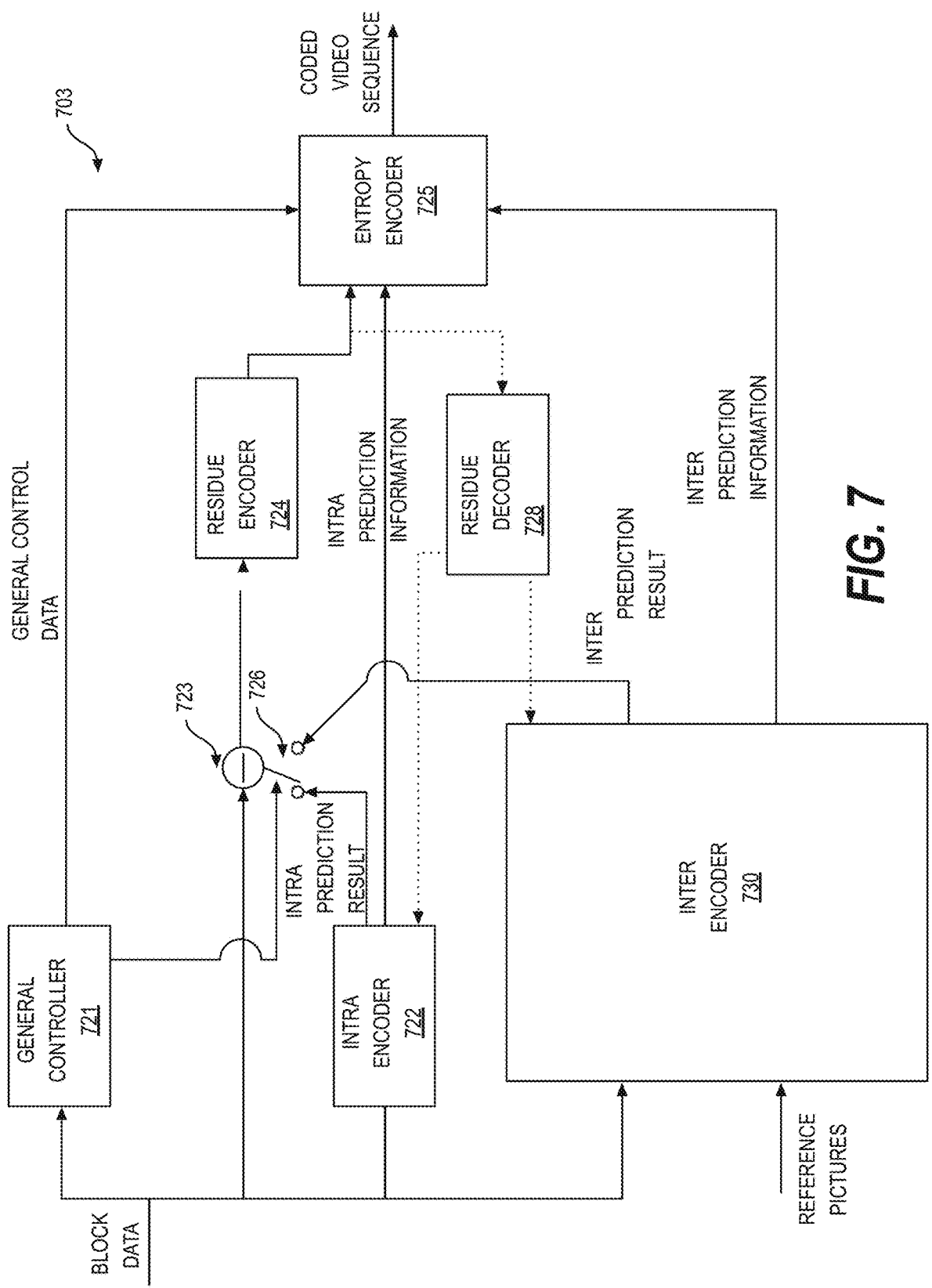
FIG. 7 shows a block diagram of a video encoder in accordance with another example embodiment.

FIG. 7 shows a diagram of a video encoder (703) according to another example embodiment of the disclosure. The video encoder (703) is configured to receive a processing block (e.g., a prediction block) of sample values within a current video picture in a sequence of video pictures, and encode the processing block into a coded picture that is part of a coded video sequence. The example video encoder (703) may be used in place of the video encoder (403) in the FIG. 4 example.

For example, the video encoder (703) receives a matrix of sample values for a processing block, such as a prediction block of 8×8 samples, and the like. The video encoder (703) then determines whether the processing block is best coded using intra mode, inter mode, or bi-prediction mode using, for example, rate-distortion optimization (RDO). When the processing block is determined to be coded in intra mode, the video encoder (703) may use an intra prediction technique to encode the processing block into the coded picture; and when the processing block is determined to be coded in inter mode or bi-prediction mode, the video encoder (703) may use an inter prediction or bi-prediction technique, respectively, to encode the processing block into the coded picture. In some example embodiments, a merge mode may be used as a submode of the inter picture prediction where the motion vector is derived from one or more motion vector predictors without the benefit of a coded motion vector component outside the predictors. In some other example embodiments, a motion vector component applicable to the subject block may be present. Accordingly, the video encoder (703) may include components not explicitly shown in FIG. 7, such as a mode decision module, to determine the perdition mode of the processing blocks.

In the example of FIG. 7, the video encoder (703) includes an inter encoder (730), an intra encoder (722), a residue calculator (723), a switch (726), a residue encoder (724), a general controller (721), and an entropy encoder (725) coupled together as shown in the example arrangement in FIG. 7.

The inter encoder (730) is configured to receive the samples of the current block (e.g., a processing block), compare the block to one or more reference blocks in reference pictures (e.g., blocks in previous pictures and later pictures in display order), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information using the decoding unit 633 embedded in the example encoder 620 of FIG. 6 (shown as residual decoder 728 of FIG. 7, as described in further detail below).

The intra encoder (722) is configured to receive the samples of the current block (e.g., a processing block), compare the block to blocks already coded in the same picture, and generate quantized coefficients after transform, and in some cases also to generate intra prediction information (e.g., an intra prediction direction information according to one or more intra encoding techniques). The intra encoder (722) may calculates intra prediction results (e.g., predicted block) based on the intra prediction information and reference blocks in the same picture.

The general controller (721) may be configured to determine general control data and control other components of the video encoder (703) based on the general control data. In an example, the general controller (721) determines the prediction mode of the block, and provides a control signal to the switch (726) based on the prediction mode. For example, when the prediction mode is the intra mode, the general controller (721) controls the switch (726) to select the intra mode result for use by the residue calculator (723), and controls the entropy encoder (725) to select the intra prediction information and include the intra prediction information in the bitstream; and when the predication mode for the block is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) may be configured to calculate a difference (residue data) between the received block and prediction results for the block selected from the intra encoder (722) or the inter encoder (730). The residue encoder (724) may be configured to encode the residue data to generate transform coefficients. For example, the residue encoder (724) may be configured to convert the residue data from a spatial domain to a frequency domain to generate the transform coefficients. The transform coefficients are then subject to quantization processing to obtain quantized transform coefficients. In various example embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures.

The entropy encoder (725) may be configured to format the bitstream to include the encoded block and perform entropy coding. The entropy encoder (725) is configured to include in the bitstream various information. For example, the entropy encoder (725) may be configured to include the general control data, the selected prediction information (e.g., intra prediction information or inter prediction information), the residue information, and other suitable information in the bitstream. When coding a block in the merge submode of either inter mode or bi-prediction mode, there may be no residue information.

Figure 8:
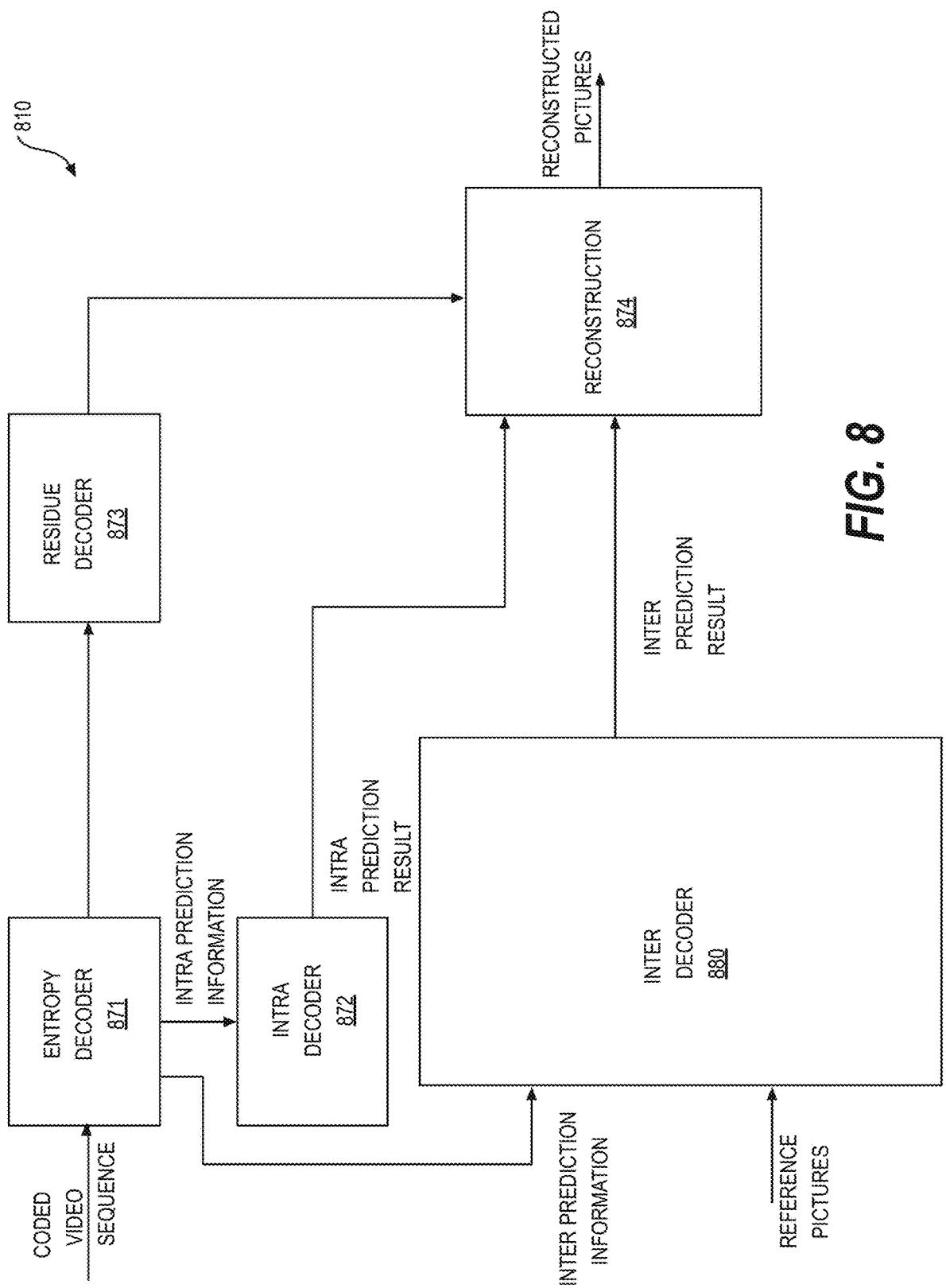
FIG. 8 shows a block diagram of a video decoder in accordance with another example embodiment.

FIG. 8 shows a diagram of an example video decoder (810) according to another embodiment of the disclosure. The video decoder (810) is configured to receive coded pictures that are part of a coded video sequence, and decode the coded pictures to generate reconstructed pictures. In an example, the video decoder (810) may be used in place of the video decoder (410) in the example of FIG. 4.

In the example of FIG. 8, the video decoder (810) includes an entropy decoder (871), an inter decoder (880), a residue decoder (873), a reconstruction module (874), and an intra decoder (872) coupled together as shown in the example arrangement of FIG. 8.

The entropy decoder (871) can be configured to reconstruct, from the coded picture, certain symbols that represent the syntax elements of which the coded picture is made up. Such symbols can include, for example, the mode in which a block is coded (e.g., intra mode, inter mode, bi-predicted mode, merge submode or another submode), prediction information (e.g., intra prediction information or inter prediction information) that can identify certain sample or metadata used for prediction by the intra decoder (872) or the inter decoder (880), residual information in the form of, for example, quantized transform coefficients, and the like. In an example, when the prediction mode is the inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) may be configured to receive the inter prediction information, and generate inter prediction results based on the inter prediction information.

The intra decoder (872) may be configured to receive the intra prediction information, and generate prediction results based on the intra prediction information.

The residue decoder (873) may be configured to perform inverse quantization to extract de-quantized transform coefficients, and process the de-quantized transform coefficients to convert the residual from the frequency domain to the spatial domain. The residue decoder (873) may also utilize certain control information (to include the Quantizer Parameter (QP)) which may be provided by the entropy decoder (871) (data path not depicted as this may be low data volume control information only).

The reconstruction module (874) may be configured to combine, in the spatial domain, the residual as output by the residue decoder (873) and the prediction results (as output by the inter or intra prediction modules as the case may be) to form a reconstructed block forming part of the reconstructed picture as part of the reconstructed video. It is noted that other suitable operations, such as a deblocking operation and the like, may also be performed to improve the visual quality.

It is noted that the video encoders (403), (603), and (703), and the video decoders (410), (510), and (810) can be implemented using any suitable technique. In some example embodiments, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

In some example implementations, loop filters may be included in the encoders and decoders for reducing encoding artifacts and improving quality of the decoded pictures. For example, loop filters 555 may be included as part of the decoder 530 of FIG. 5. For another example, loop filters may be part of the embedded decoder unit 633 in the encoder 620 of FIG. 6. These filters are referred to as loop filters because they are included in the decoding loop for video blocks in decoders or encoders. Each loop filter may be associated with one or more filtering parameters. Such filtering parameters may be predefined or may be derived by the encoder during the encoding process. These filtering parameters (if derived by the encoder) or their indices (if predefined) may be included in the final bitstream in encoded form. A decoder may then parse these filtering parameters from the bitstream and perform loop filtering based on the parsed filtering parameters during decoding.

Various loop filters may be used for reducing coding artifact and improving decoded video quality in different aspects. Such loop filters may include but not limited to one or more deblocking filters, Adaptive Loop Filters (ALFs), Cross-Component Adaptive Loop Filters (CC-ALFs), Constrained Directional Enhancement Filters (CDEFs), Sample Adaptive Offset (SAO) filters, Cross-Component Sample Offset (CCSO) filters, and Local Sample Offset (LSO) filters. These filters may or may not be inter-dependent. They may be arranged in the decoding loop of the decoder or encoder in any suitable order that is compatible with their interdependence (if any). These various loop filters are described in more detail in the disclosure below.

An Adaptive Loop Filter (ALF) with block-based filter adaption can be applied by encoders/decoders to reduce artifacts. ALF is adaptive in the sense that the filtering coefficients/parameters or their indices are signaled in the bitstream and can be designed based on image content and distortion of the reconstructed picture. ALF may be applied to reduce distortion introduced by the encoding process and improve the reconstructed image quality.

For a luma component, one of a plurality of filters (e.g., 25 filters) may be selected for a luma block (e.g., a 4×4 luma block), for example, based on a direction and activity of local gradients. The filter coefficients of these filters may be derived by the encoder during encoding process and signaled to the decoder in the bitstream.

An ALF can have any suitable shape and size. Referring to the examples of FIG. 9, ALFs (910)-(911) may have a diamond shape, such as a 5×5 diamond-shape for the ALF (910) and a 7×7 diamond-shape for the ALF (911). In the ALF (910), thirteen (13) elements (920)-(932) can be used in the filtering process and form a diamond shape. Seven values (e.g., C0-C6) can be used and arranged in the illustrated example manner for the 13 elements (920)-(932). In the ALF (911), twenty-five (25) elements (940)-(964) can be used in the filtering process and form a diamond shape. Thirteen (13) values (e.g., C0-C12) can be used for the 25 elements (940)-(964) in the illustrated example manner.

Referring to FIG. 9, in some examples, ALF filters of one of the two diamond shapes (910)-(911) may be selected for processing a luma or chroma block. For example, the 5×5 diamond-shaped filter (910) can be applied for chroma components (e.g., chroma blocks, chroma CBs), and the 7×7 diamond-shaped filter (911) can be applied for a luma component (e.g., a luma block, a luma CB). Other suitable shape(s) and size(s) can be used in the ALF. For example, a 9×9 diamond-shaped filter can be used.

Filter coefficients at locations indicated by the values (e.g., C0-C6 in (910) or C0-C12 in (920)) can be non-zero. Further, when the ALF includes a clipping function, clipping values at the locations can be non-zero. The clipping function may be used to limit the upper bound of the filter value in the luma or chroma blocks.

In some implementations, a specific ALF to be applied to a particular block of a luma component may be based on a classification of the luma block. For block classification of a luma component, a 4×4 block (or luma block, luma CB) can be categorized or classified as one of multiple (e.g., 25) classes, corresponding to, e.g., 25 different ALFs (e.g., 25 of 7 by 7 ALFs with different filter coefficients). A classification index C can be derived based on a directionality parameter D and a quantized value Â of an activity value A using Eq. (1).

$$C = 5D + \hat{A} \qquad \text{Eq. (1)}$$

To calculate the directionality parameter D and the quantized value Â, gradients $g_v$, $g_h$, $g_{d1}$, and $g_{d2}$ of a vertical, a horizontal, and two diagonal directions (e.g., d1 and d2), respectively, can be calculated using 1-D Laplacian as follows.

$$g_v = \Sigma_{k=i-2}^{i+3} \Sigma_{l=j-2}^{j+3} V_{k,l}, \; V_{k,l} = |2R(k,l) - R(k,l-1) - R(k,l+1)| \qquad \text{Eq. (2)}$$

$$g_h = \Sigma_{k=i-2}^{i+3} \Sigma_{l=j-2}^{j+3} H_{k,l}, \; H_{k,l} = |2R(k,l) - R(k-1,l) - R(k+1,l)| \qquad \text{Eq. (3)}$$

$$g_{d1} = \Sigma_{k=i-2}^{i+3} \Sigma_{l=j-2}^{j+3} D1_{k,l}, \; D1_{k,l} = |2R(k,l) - R(k-1,l-1) - R(k+1,l+1)| \qquad \text{Eq. (4)}$$

$$g_{d2} = \Sigma_{k=i-2}^{i+3} \Sigma_{l=j-2}^{j+3} D2_{k,l}, \; D2_{k,l} = |2R(k,l) - R(k-1,l+1) - R(k+1,l-1)| \qquad \text{Eq. (5)}$$

where indices i and j refer to coordinates of an upper left sample within the 4×4 block and R(k,l) indicates a reconstructed sample at a coordinate (k,l). The directions (e.g., d1 and d2) refer to 2 diagonal directions.

Figures 10A, 10B:
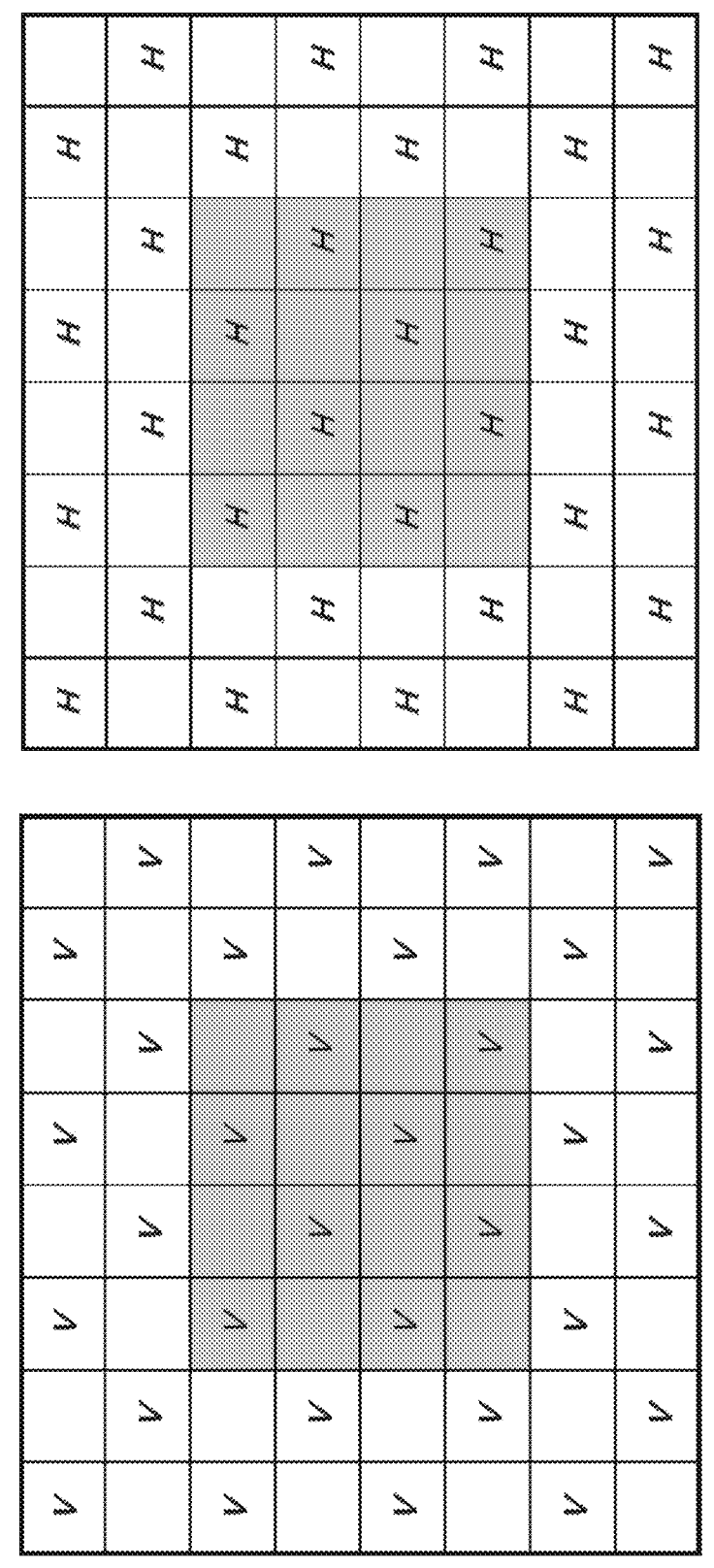
Figures 10C, 10D:
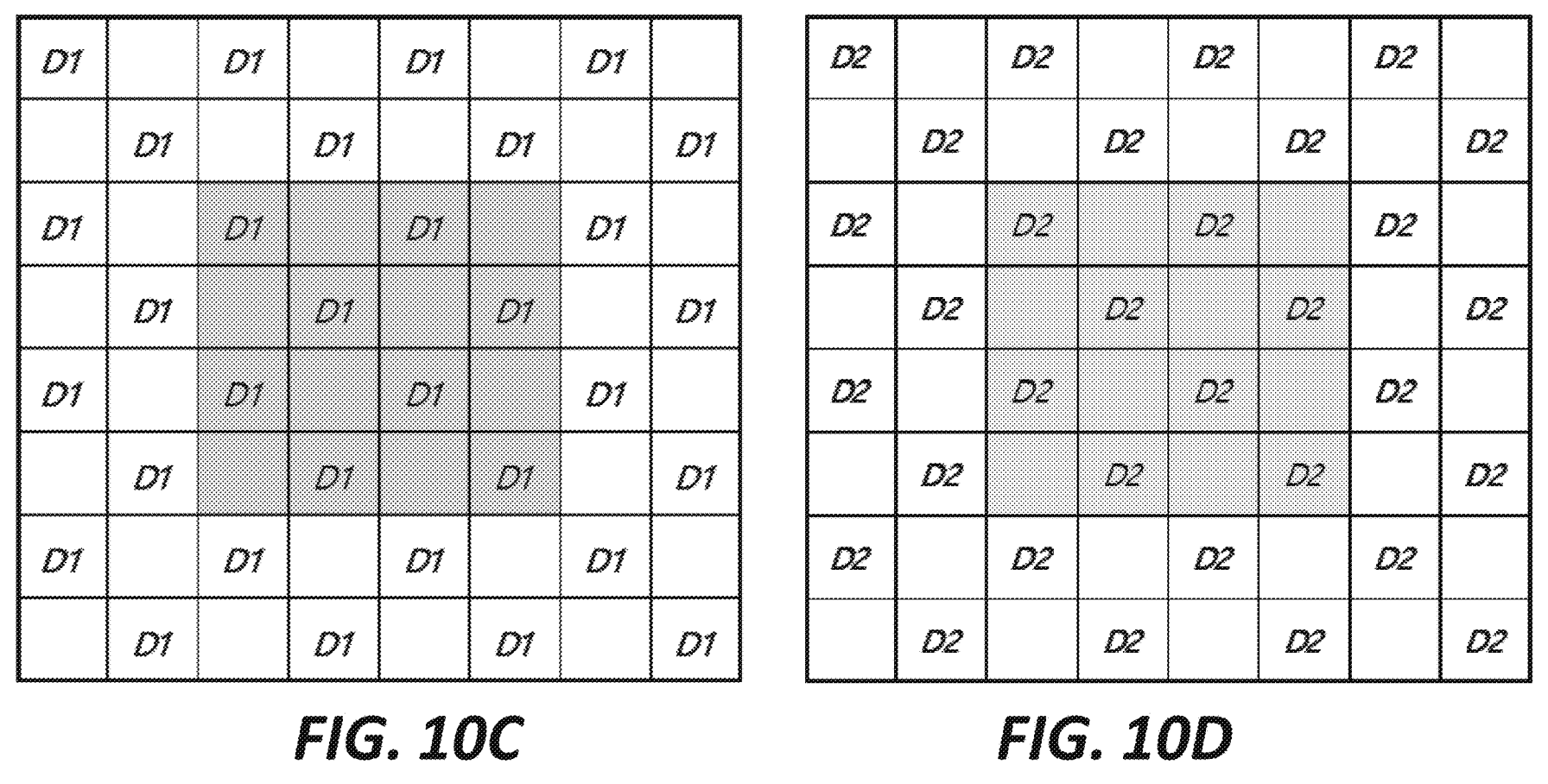

To reduce complexity of the block classification described above, a subsampled 1-D Laplacian calculation may be applied. FIGS. 10A-10D show examples of subsampled positions used for calculating the gradients $g_v$, $g_h$, $g_{d1}$, and $g_{d2}$ of the vertical (FIG. 10A), the horizontal (FIG. 10B), and the two diagonal directions d1 (FIG. 10C) and d2 (FIG. 10D), respectively. In FIG. 10A, labels 'V' show the subsampled positions to calculate the vertical gradient $g_v$. In FIG. 10B, labels 'H' show the subsampled positions to calculate the horizontal gradient $g_h$. In FIG. 10C, labels 'D1' show the subsampled positions to calculate the d1 diagonal gradient $g_{d1}$. In FIG. 10D, labels 'D2' show the subsampled positions to calculate the d2 diagonal gradient $g_{d2}$. FIGS. 10A and 10B show that the same subsampled positions can be used for gradient calculation of the different directions. In some other implementations, a different subsampling scheme can be used for all directions. In still some other implementations, different subsampling schemes can be used for different directions.

A maximum value $g_{h,v}^{max}$ and a minimum value $g_{h,v}^{min}$ of the gradients of horizontal and vertical directions $g_v$ and $g_h$ can be set as:

$$g_{h,v}^{max} = \max(g_h, g_v), \; g_{h,v}^{min} = \min(g_h, g_v) \qquad \text{Eq. (6)}$$

A maximum value $g_{d1,d2}^{max}$ and a minimum value $g_{d1,d2}^{min}$ of the gradients of two diagonal directions $g_{d1}$ and $g_{d2}$ can be set as:

$$g_{d1,d2}^{max} = \max(g_{d1}, g_{d2}), \; g_{d1,d2}^{min} = \min(g_{d1}, g_{d2}) \qquad \text{Eq. (7)}$$

The directionality parameter D can be derived based on the above values and two thresholds $t_1$ and $t_2$ as below.

Step 1. If (1) $g_{h,v}^{max} \leq t_1 \cdot g_{h,v}^{min}$ and (2) $g_{d1,d2}^{max} \leq t_1 \cdot g_{d1,d2}^{min}$ are true, D is set to 0.

Step 2. If $g_{h,v}^{max}/g_{h,v}^{min} > g_{d1,d2}^{max}/g_{d1,d2}^{min}$, continue to Step 3; otherwise continue to Step 4.

Step 3. If $g_{h,v}^{max} > t_2 \cdot g_{h,v}^{min}$, D is set to 2; otherwise D is set to 1.

Step 4. If $g_{d1,d2}^{max} > t_2 \cdot g_{d1,d2}^{min}$, D is set to 4; otherwise D is set to 3.

Figure 10E:
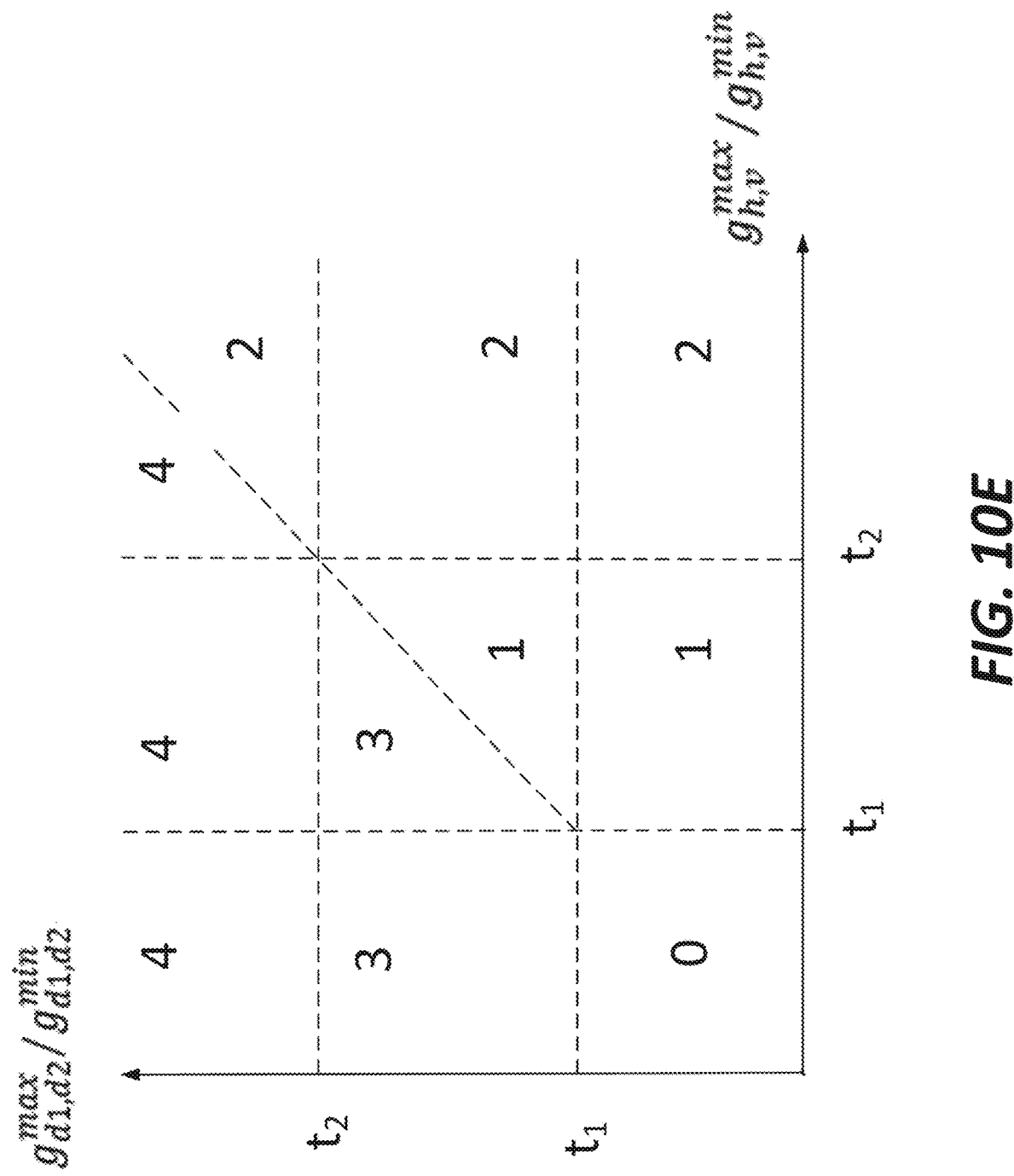
FIG. 10E shows an example manner to determine block directionality based on various gradients for use by an Adaptive Loop Filter (ALF).

In other words, the directionality parameter D is denoted by several discrete levels and are determined based on the gradient value spread for the luma block between horizontal and vertical directions, and between the two diagonal directions, as illustrated in FIG. 10E.

The activity value A can be calculated as:

$$A = \sum_{k=i-2}^{i+3} \sum_{l=j-2}^{j+3} (V_{k,l} + H_{k,l}) \qquad \text{Eq. (8)}$$

The activity value A thus represents a composite measure of horizontal and vertical 1-D Laplacians. The activation value A for the luma block can be further quantized to a range of, for example, 0 to 4, inclusively, and the quantized value is denoted as Â.

For the luma component, the classification index C as calculated above may then be used to select one of the multiple classes (e.g., 25 classes) of diamond-shaped AFL filters. In some implementations, for chroma components in a picture, no block classification may be applied, and thus a single set of ALF coefficients can be applied for each chroma component. In such implementations, while there may be multiple ALF coefficient sets available for chroma component, the determination of an ALF coefficient may not be dependent on any classification of a chroma block.

Geometric transformations can be applied to filter coefficients and corresponding filter clipping values (also referred to as clipping values). Before filtering a block (e.g., a 4×4 luma block), geometric transformations such as rotation or diagonal and vertical flipping can be applied to the filter coefficients f(k,l) and the corresponding filter clipping values c(k,l), for example, depending on gradient values (e.g., $g_v$, $g_h$, $g_{d1}$, and/or $g_{d2}$) calculated for the block. The geometric transformations applied to the filter coefficients f(k,l) and the corresponding filter clipping values c(k,l) can be equivalent to applying the geometric transformations to samples in a region supported by the filter. The geometric transformations can make different blocks to which an ALF is applied more similar by aligning the respective directionality.

Three geometric transformation options, including a diagonal flip, a vertical flip, and a rotation can be performed as described by Eqs. (9)-(11), respectively.

$$f_D(k,l) = f(l,k), \ c_D(k,l) = c(l,k), \qquad \text{Eq. (9)}$$

$$f_V(k,l) = f(k,K-l-1), \ c_V(k,l) = c(k,K-l-1) \qquad \text{Eq. (10)}$$

$$f_R(k,l) = f(K-l-1,k), \ c_R(k,l) = c(K-l-1,k) \qquad \text{Eq. (11)}$$

where K represents a size of the ALF or the filter, and $0 \leq k, l \leq K-1$ are coordinates of coefficients. For example, a location (0, 0) is at an upper left corner and a location (K−1, K−1) is at a lower right corner of the filter f or a clipping value matrix (or clipping matrix) c. The transformations can be applied to the filter coefficients f (k, l) and the clipping values c(k,l) depending on the gradient values calculated for the block. An example of a relationship between the transformation and the four gradients are summarized in Table 1.

TABLE 1

Mapping of the gradient calculated for a block and the transformation

| Gradient values | Transformation |
| --- | --- |
| $g_{d2} < g_{d1}$ and $g_h < g_v$ | No transformation |
| $g_{d2} < g_{d1}$ and $g_v < g_h$ | Diagonal flip |
| $g_{d1} < g_{d2}$ and $g_h < g_v$ | Vertical flip |
| $g_{d1} < g_{d2}$ and $g_v < g_h$ | Rotation |

In some embodiments, ALF filter parameters derived by the encoder may be signaled in an Adaptation Parameter Set (APS) for a picture. In the APS, one or more sets (e.g., up to 25 sets) of luma filter coefficients and clipping value indexes can be signaled. They may be indexed in the APS. In an example, a set of the one or more sets can include luma filter coefficients and one or more clipping value indexes. One or more sets (e.g., up to 8 sets) of chroma filter coefficients and clipping value indexes may be derived by the encoder and signaled. To reduce signaling overhead, filter coefficients of different classifications (e.g., having different classification indices) for luma components can be merged. In a slice header, indices of the APS's used for a current slice can be signaled. In another example, the signaling of ALF may be CTU based.

In an embodiment, a clipping value index (also referred to as clipping index) can be decoded from the APS. The clipping value index can be used to determine a corresponding clipping value, for example, based on a relationship between the clipping value index and the corresponding clipping value. The relationship can be pre-defined and stored in a decoder. In an example, the relationship is described by one or more tables, such as a table (e.g., used for a luma CB) of the clipping value index and the corresponding clipping value for a luma component, and a table (e.g., used for a chroma CB) of the clipping value index and the corresponding clipping value for a chroma component. The clipping value can be dependent on a bit depth B. The bit depth B may refer to an internal bit depth, a bit depth of reconstructed samples in a CB to be filtered, or the like. In some examples, a table of clipping values (e.g., for luma and/or for chroma) may be obtained using Eq. (12).

$$\text{AlfClip} = \{\text{round}(2^{B-\alpha*n}) \text{ for } n \in [0 \ldots N-1]\}, \qquad \text{Eq. (12)}$$

where AlfClip is the clipping value, B is the bit depth (e.g., bitDepth), N (e.g., N=4) is a number of allowed clipping values, α is a pre-defined constant value. In an example, α is equal to 2.35. n is the clipping value index (also referred to as clipping index or clipIdx). Table 2 shows an example of a table obtained using Eq. (12) with N=4. The clipping index n can be 0, 1, 2, and 3 in Table 2 (up to N−1). Table 2 can be used for luma blocks or chroma blocks.

TABLE 2

AlfClip can depend on the bit depth B and clipIdx

| bitDepth | clipIdx 0 | 1 | 2 | 3 |
| --- | --- | --- | --- | --- |
| 8 | 255 | 64 | 16 | 4 |
| 9 | 511 | 108 | 23 | 5 |
| 10 | 1023 | 181 | 32 | 6 |
| 11 | 2047 | 304 | 45 | 7 |
| 12 | 4095 | 512 | 64 | 8 |
| 13 | 8191 | 861 | 91 | 10 |
| 14 | 16383 | 1448 | 128 | 11 |

TABLE 2-continued

AlfClip can depend on the bit depth B and clipIdx

| bitDepth | clipIdx | | | |
|---|---|---|---|---|
| | 0 | 1 | 2 | 3 |
| 15 | 32767 | 2435 | 181 | 13 |
| 16 | 65535 | 4096 | 256 | 16 |

In a slice header for a current slice, one or more APS indices (e.g., up to 7 APS indices) can be signaled to specify luma filter sets that can be used for the current slice. The filtering process can be controlled at one or more suitable levels, such as a picture level, a slice level, a CTB level, and/or the like. In an example embodiment, the filtering process can be further controlled at a CTB level. A flag can be signaled to indicate whether the ALF is applied to a luma CTB. The luma CTB can choose a filter set among a plurality of fixed filter sets (e.g., 16 fixed filter sets) and the filter set(s) (e.g., up to 25 filters derived by the encoder, as described above, and also referred to as signaled filter set(s)) that are signaled in the APS's. A filter set index can be signaled for the luma CTB to indicate the filter set (e.g., the filter set among the plurality of fixed filter sets and the signaled filter set(s)) to be applied. The plurality of fixed filter sets can be pre-defined and hard-coded in an encoder and a decoder, and can be referred to as pre-defined filter sets. The pre-defined filters coefficients thus need not be signaled.

For a chroma component, an APS index can be signaled in the slice header to indicate the chroma filter sets to be used for the current slice. At the CTB level, a filter set index can be signaled for each chroma CTB if there is more than one chroma filter set in the APS.

The filter coefficients can be quantized with a norm equal to 128. In order to decrease the multiplication complexity, a bitstream conformance can be applied so that the coefficient value of the non-central position can be in a range of −27 to 27−1, inclusive. In an example, the central position coefficient is not signaled in the bitstream and can be considered as equal to 128.

In some embodiments, the syntaxes and semantics of clipping index and clipping values are defined as follows: alf_luma_clip_idx[sfIdx][j] can be used to specify the clipping index of the clipping value to use before multiplying by the j-th coefficient of the signaled luma filter indicated by sfIdx. A requirement of bitstream conformance can include that the values of alf_luma_clip_idx[sfIdx][j] with sfIdx=0 to alf_luma_num_filters_signalled_minus1 and j=0 to 11 shall be in the range of, for example, 0 to 3, inclusive.

The luma filter clipping values AlfClipL[adaptation_parameter_set_id] with elements AlfClipL[adaptation_parameter_set_id][filtIdx][j], with filtIdx=0 to NumAlfFilters−1 and j=0 to 11 can be derived as specified in Table 2 depending on bitDepth set equal to BitDepthY and clipIdx set equal to alf_luma_clip_idx[alf_luma_coeff_delta_idx [filtIdx]][j].

Alf_chroma_clip_idx[altIdx][j] can be used to specify the clipping index of the clipping value to use before multiplying by the j-th coefficient of the alternative chroma filter with index altIdx. A requirement of bitstream conformance can include that the values of alf_chroma_clip_idx[altIdx][j] with altIdx=0 to alf_chroma_num_alt_filters_minus1, j=0 to 5 shall be in the range of 0 to 3, inclusive.

The chroma filter clipping values AlfClipC[adaptation_parameter_set_id][altIdx] with elements AlfClipC[adaptation_parameter_set_id][altIdx][j], with altIdx=0 to alf_chroma_num_alt_filters_minus1, j=0 to 5 can be derived as specified in Table 2 depending on bitDepth set equal to BitDepthC and clipIdx set equal to alf_chroma_clip_idx [altIdx][j].

In an embodiment, the filtering process can be described as below. At a decoder side, when the ALF is enabled for a CTB, a sample R(i,j) within a CU (or CB) of the CTB can be filtered, resulting in a filtered sample value R'(i,j) as shown below using Eq. (13). In an example, each sample in the CU is filtered.

$$R'(i, j) = R(i, j) + \left(\left(\sum_{k \neq 0}\sum_{l \neq 0} f(k, l) \times K(R(i+k, j+l) - R(i, j), c(k, l)) + 64\right) >> 7\right) \quad \text{Eq. (13)}$$

where f(k,l) denotes the decoded filter coefficients, K(x, y) is a clipping function, and c(k, l) denotes the decoded clipping parameters (or clipping values). The variables k and l can vary between −L/2 and L/2 where L denotes a filter length (e.g., L=5 and 7, for the example diamond filters 910 and 911 of FIG. 9 for luma and chroma components, respectively). The clipping function K(x, y)=min (y, max(−y, x)) corresponds to a clipping function Clip3 (−y, y, x). By incorporating the clipping function K(x, y), the loop filtering method (e.g., ALF) becomes a non-linear process, and can be referred to a nonlinear ALF.

The selected clipping values can be coded in an "alf_data" syntax element as follows: a suitable encoding scheme (e.g., a Golomb encoding scheme) can be used to encode a clipping index corresponding to the selected clipping value such as shown in Table 2. The encoding scheme can be the same encoding scheme used for encoding the filter set index.

Figure 11A:
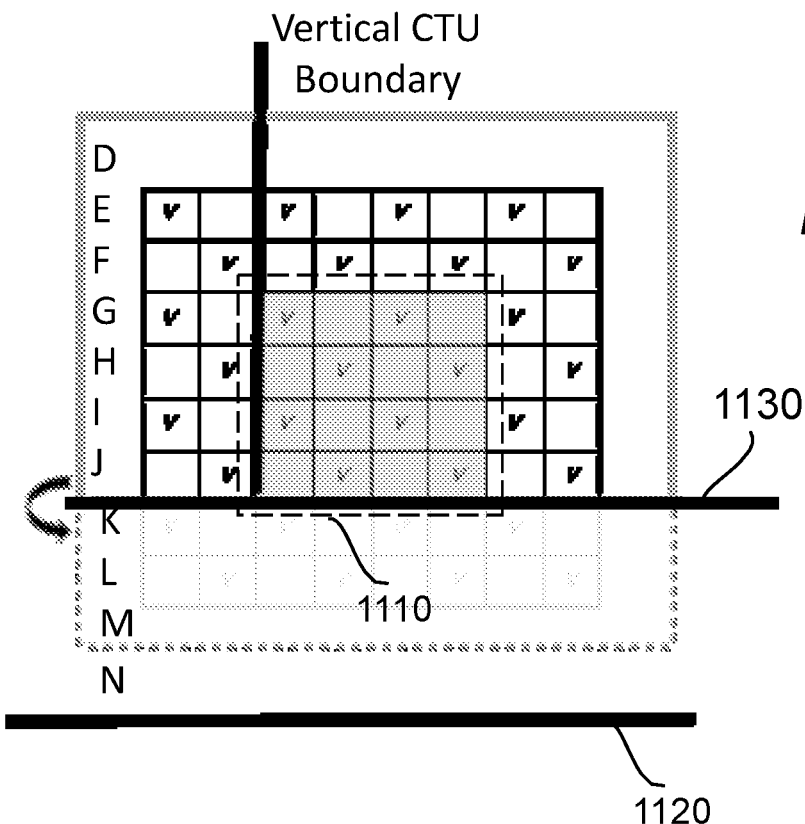
FIGS. 11A and 11B show modified block classifications at virtual boundaries according to example embodiments of the disclosure.

In an embodiment, a virtual boundary filtering process can be used to reduce a line buffer requirement of the ALF. Accordingly, modified block classification and filtering can be employed for samples near CTU boundaries (e.g., a horizontal CTU boundary). A virtual boundary (1130) can be defined as a line by shifting a horizontal CTU boundary (1120) by "N$_{samples}$" samples, as shown in FIG. 11A, where N$_{samples}$ can be a positive integer. In an example, N$_{samples}$ is equal to 4 for a luma component, and N$_{samples}$ is equal to 2 for a chroma component.

Figure 11B:
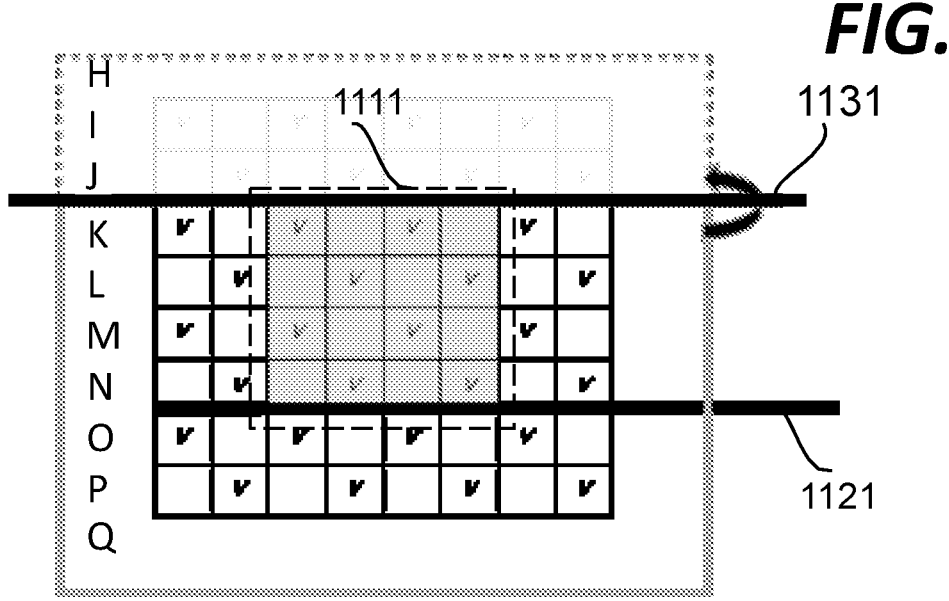

Referring to FIG. 11A, a modified block classification can be applied for a luma component. In an example, for the 1-D Laplacian gradient calculation of a 4×4 block (1110) above the virtual boundary (1130), only samples above the virtual boundary (1130) are used. Similarly, referring to FIG. 11B, for a 1-D Laplacian gradient calculation of a 4×4 block (1111) below a virtual boundary (1131) that is shifted from a CTU boundary (1121), only samples below the virtual boundary (1131) are used. The quantization of an activity value A can be accordingly scaled by taking into account a reduced number of samples used in the 1D Laplacian gradient calculation.

Figures 12A, 12B, 12C, 12D, 12E, 12F:
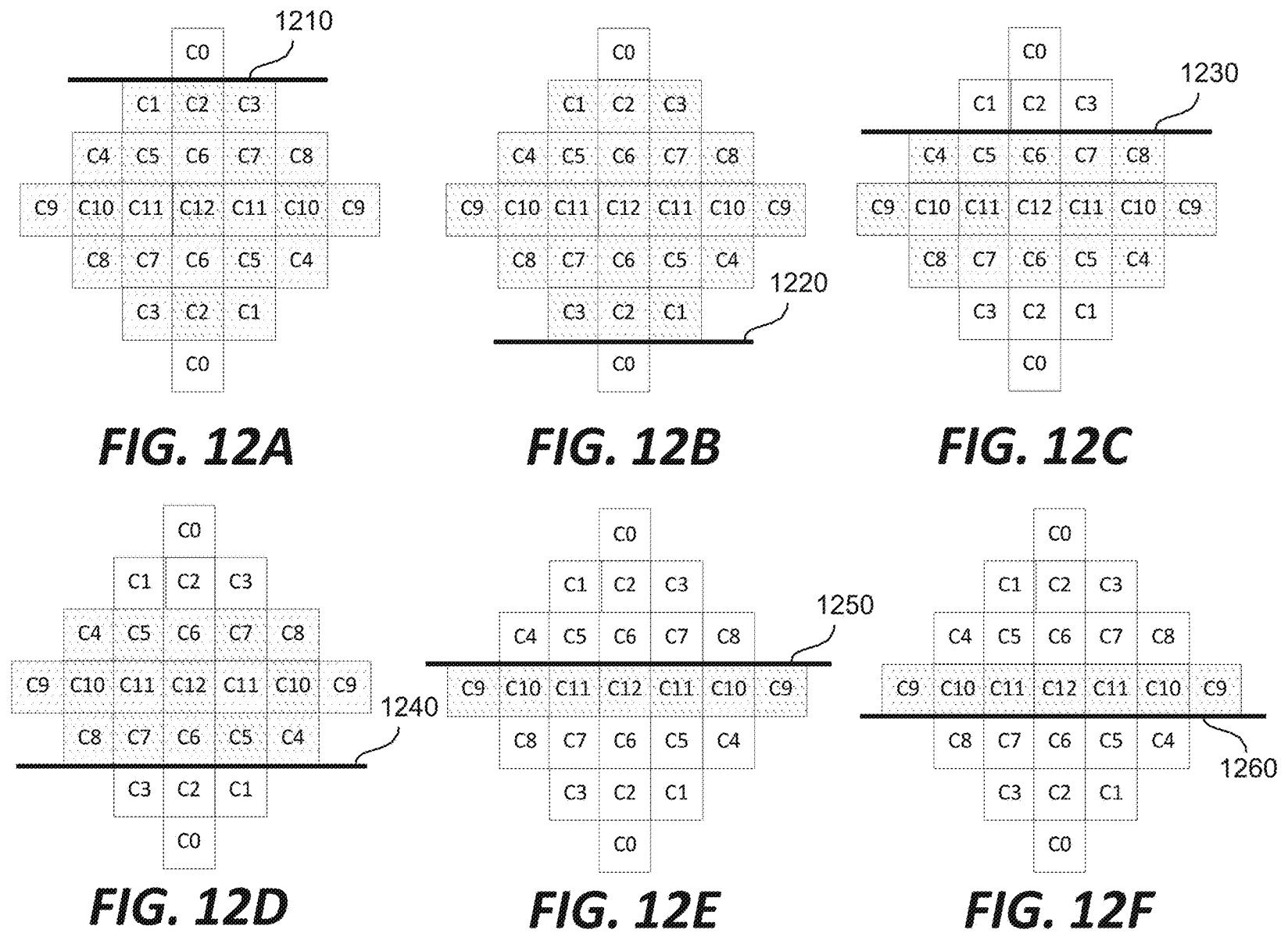

For a filtering processing, a symmetric padding operation at virtual boundaries can be used for both a luma component and a chroma component. FIGS. 12A-12F illustrate examples of such modified ALF filtering for a luma component at virtual boundaries. When a sample being filtered is located below a virtual boundary, neighboring samples that are located above the virtual boundary can be padded. When a sample being filtered is located above a virtual boundary, neighboring samples that are located below the virtual boundary can be padded. Referring to FIG. 12A, a neighboring sample C0 can be padded with a sample C2 that is located below a virtual boundary (1210). Referring to FIG. 12B, a neighboring sample C0 can be padded with a sample C2 that is located above a virtual boundary (1220). Referring to FIG. 12C, neighboring samples C1-C3 can be padded with samples C5-C7, respectively, that are located below a virtual boundary (1230). Sample C0 can be padded with sample C6. Referring to FIG. 12D, neighboring samples C1-C3 can be padded with samples C5-C7, respectively, that are located above a virtual boundary (1240). Sample C0 can be padded with sample C6. Referring to FIG. 12E, neighboring samples C4-C8 can be padded with samples C10, C11, C12, C11, and C10, respectively, that are located below a virtual boundary (1250). Samples C1-C3 can be padded with samples C11, C12, and C11. Sample C0 can be padded with sample C12. Referring to FIG. 12F, neighboring samples C4-C8 can be padded with samples C10, C11, C12, C11, and C10, respectively, that are located above a virtual boundary (1260). Samples C1-C3 can be padded with samples C11, C12, and C11. Sample C0 can be padded with sample C12.

In some examples, the above description can be suitably adapted when sample(s) and neighboring sample(s) are located to the left (or to the right) and to the right (or to the left) of a virtual boundary.

A largest coding unit (LCU)-aligned picture quadtree splitting can be used. In order to enhance coding efficiency, a coding unit synchronous picture quadtree-based adaptive loop filter can be used in video coding. In an example, a luma picture may be split into multiple multi-level quadtree partitions, and each partition boundary is aligned to boundaries of largest coding units (LCUs). Each partition can have a filtering process, and thus can be referred to as a filter unit or filtering unit (FU).

An example 2-pass encoding flow is described as follows. At a first pass, a quadtree split pattern and the best filter (or an optimal filer) of each FU can be decided. Filtering distortions can be estimated by a fast filtering distortion estimation (FFDE) during the decision process. According to the decided quadtree split pattern and the selected filters of the FUs (e.g., all FUs), a reconstructed picture can be filtered. At a second pass, a CU synchronous ALF on/off control can be performed. According to the ALF on/off results, the first filtered picture is partially recovered by the reconstructed picture.

Figure 13:
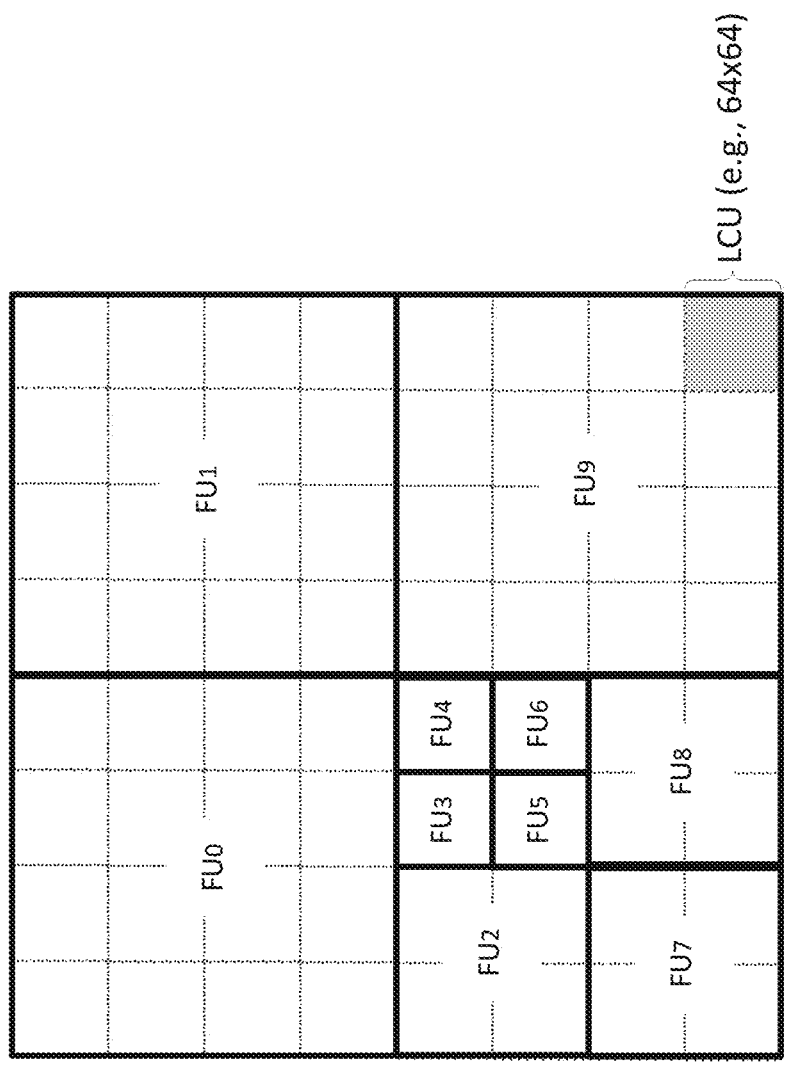
FIG. 13 shows an example of largest coding unit aligned picture quadtree splitting according to an embodiment of the disclosure.

A top-down splitting strategy can be adopted to divide a picture into multi-level quadtree partitions by using a rate-distortion criterion. Each partition can be referred to as a FU. The splitting process can align quadtree partitions with LCU boundaries, as shown in FIG. 13. FIG. 13 shows an example of LCU-aligned picture quadtree splitting according to an embodiment of the disclosure. In an example, an encoding order of FUs follows a z-scan order. For example, referring to FIG. 13, a picture is split into ten FUs (e.g., $FU_0$-$FU_9$, with a splitting depth of 2, with $FU_0$, $FU_1$, and $FU_9$ being the first level FUs, $FU_5$, $FU_7$, and $FU_8$ being the second depth level FUs, and $FU_3$-$FU_6$ being the third depth level FUs) and the encoding order is from $FU_0$ to $FU_9$, e.g., $FU_0$, $FU_1$, $FU_2$, $FU_3$, $FU_4$, $FU_5$, $FU_6$, $FU_7$, $FU_8$, and $FU_9$.

Figure 14:
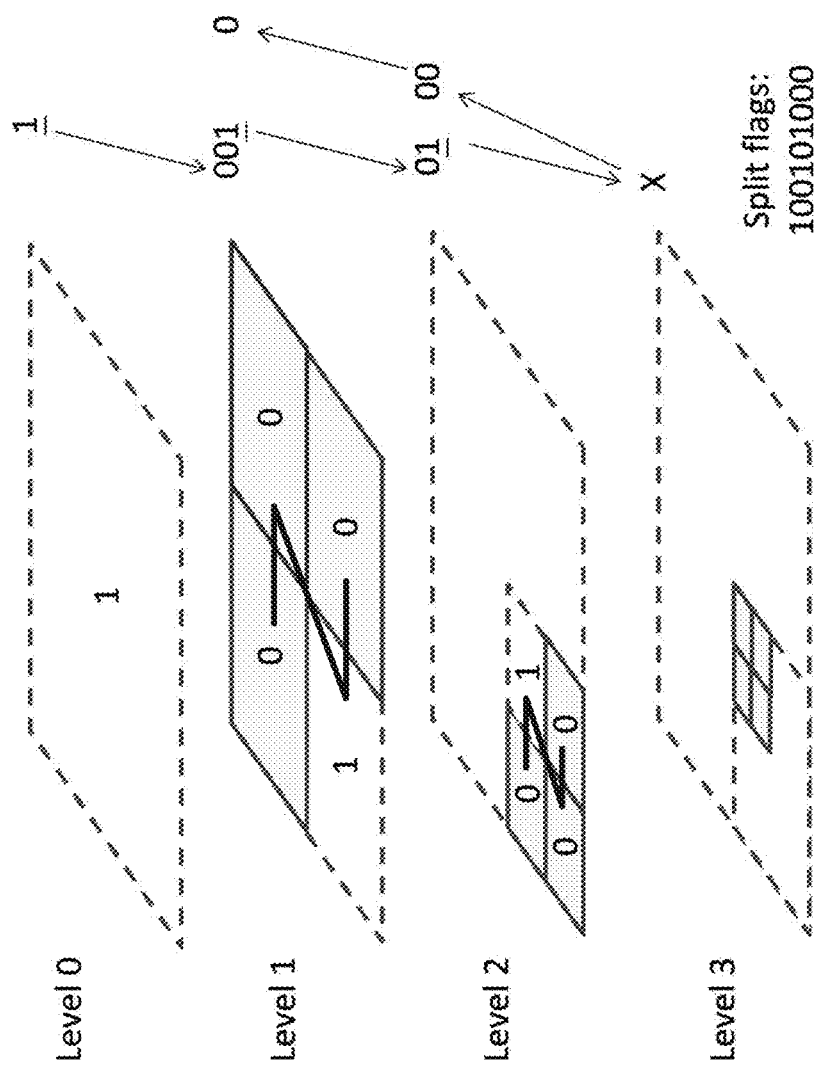
FIG. 14 shows a quadtree split pattern corresponding to FIG. 13 according to an example embodiment of the disclosure.

To indicate a picture quadtree split pattern, split flags ("1" representing a quadtree split, and "0" representing no quadtree split) can be encoded and transmitted in a z-scan order. FIG. 14 shows a quadtree split pattern corresponding to FIG. 13 according to an embodiment of the disclosure. As shown in an example in FIG. 14, quadtree split flags are encoded in a z scan order.

A filter of each FU can be selected from two filter sets based on a rate-distortion criterion. The first set can have ½-symmetric square-shaped and rhombus-shaped filters newly derived for a current FU. The second set can be from time-delayed filter buffers. The time-delayed filter buffers can store filters previously derived for FUs in prior pictures. The filter with the minimum rate-distortion cost of the two filter sets can be chosen for the current FU. Similarly, if the current FU is not the smallest FU and can be further split into four children FUs, the rate-distortion costs of the four children FUs can be calculated. By comparing the rate-distortion cost of the split and non-split cases recursively, the picture quadtree split pattern can be determined (in other words, whether the quadtree split of the current FU should stop).

In some examples, a maximum quadtree split level or depth may be limited to a predefined number. For example, the maximum quadtree split level or depth may be 2, and thus a maximum number of FUs may be 16 (or 4 to the power of maximum number of depth). During the quadtree split decision, correlation values for deriving Wiener coefficients of the 16 FUs at the bottom quadtree level (smallest FUs) can be reused. The remaining FUs can derive the Wiener filters of the remaining FUs from the correlations of the 16 FUs at the bottom quadtree level. Therefore, in an example, there is only one frame buffer access for deriving the filter coefficients of all FUs.

After the quadtree split pattern is determined, to further reduce the filtering distortion, the CU synchronous ALF on/off control can be performed. By comparing the filtering distortion and non-filtering distortion, a leaf CU can explicitly switch ALF on/off in a corresponding local region. The coding efficiency may be further improved by redesigning filter coefficients according to the ALF on/off results. In an example, the redesigning process needs additional frame buffer accesses. Thus, in some examples, such as a coding unit synchronous picture quadtree-based adaptive loop filter (CS-PQALF) encoder design, no redesign process is needed after the CU synchronous ALF on/off decision in order to minimize the number of frame buffer accesses.

A cross-component filtering process can apply cross-component filters, such as cross-component adaptive loop filters (CC-ALFs). The cross-component filter can use luma sample values of a luma component (e.g., a luma CB) to refine a chroma component (e.g., a chroma CB corresponding to the luma CB). In an example, the luma CB and the chroma CB are included in a CU.

Figure 15:
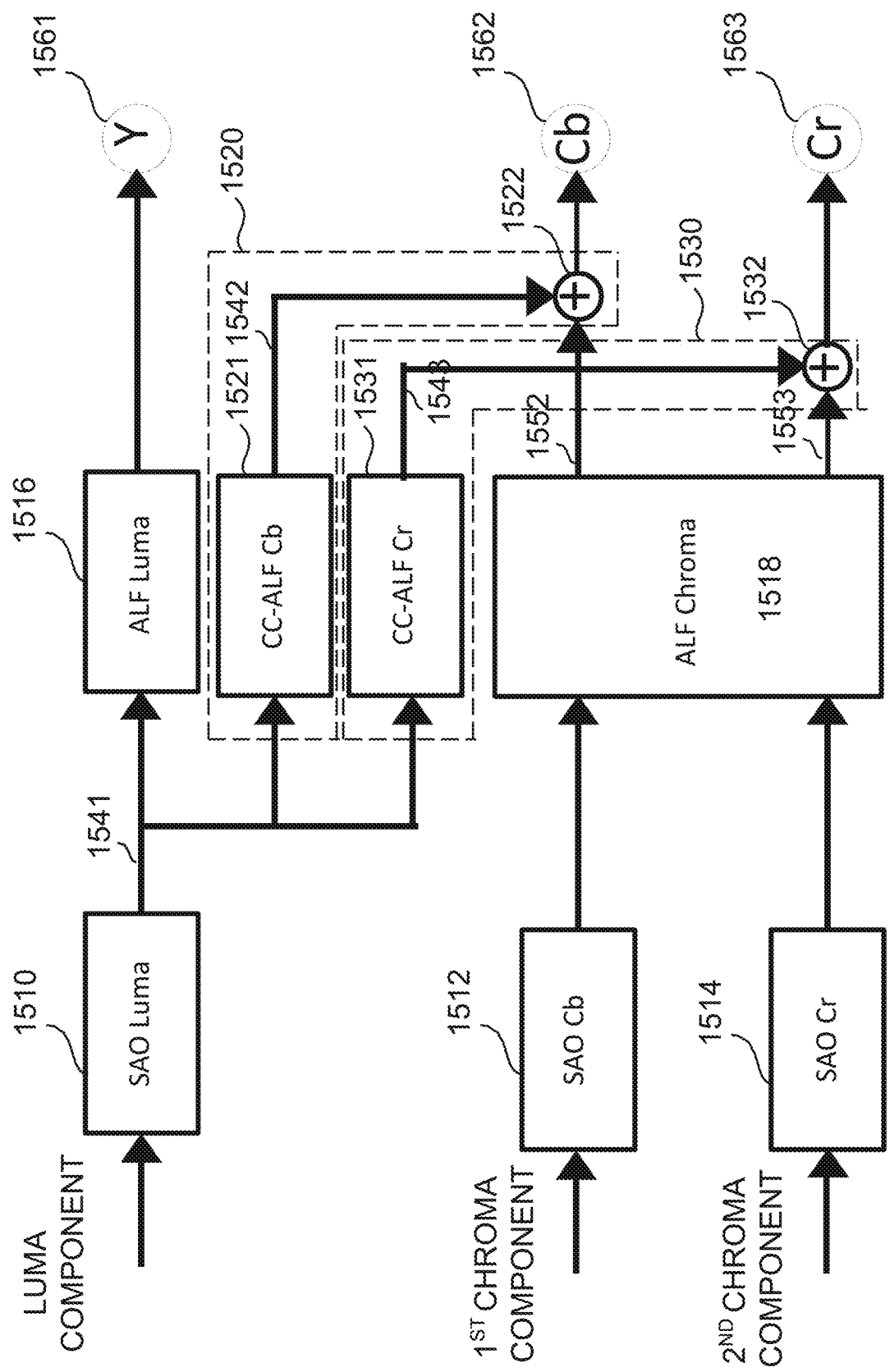
FIG. 15 shows cross-component filters used to generate chroma components according to an example embodiment of the disclosure.

FIG. 15 shows cross-component filters (e.g., CC-ALFs) used to generate chroma components according to an example embodiment of the disclosure. For example, FIG. 15 shows filtering processes for a first chroma component (e.g., a first chroma CB), a second chroma component (e.g., a second chroma CB), and a luma component (e.g., a luma CB). The luma component can be filtered by a sample adaptive offset (SAO) filter (1510) to generate a SAO filtered luma component (1541). The SAO filtered luma component (1541) can be further filtered by an ALF luma filter (1516) to become a filtered luma CB (1561) (e.g., 'Y').

The first chroma component can be filtered by a SAO filter (1512) and an ALF chroma filter (1518) to generate a first intermediate component (1552). Further, the SAO filtered luma component (1541) can be filtered by a cross-component filter (e.g., CC-ALF) (1521) for the first chroma component to generate a second intermediate component (1542). Subsequently, a filtered first chroma component (1562) (e.g., 'Cb') can be generated based on at least one of the second intermediate component (1542) and the first intermediate component (1552). In an example, the filtered first chroma component (1562) (e.g., 'Cb') can be generated by combining the second intermediate component (1542) and the first intermediate component (1552) with an adder (1522). The example cross-component adaptive loop filtering process for the first chroma component thus can include a step performed by the CC-ALF (1521) and a step performed by, for example, the adder (1522).

The above description can be adapted to the second chroma component. The second chroma component can be filtered by a SAO filter (1514) and the ALF chroma filter (1518) to generate a third intermediate component (1553). Further, the SAO filtered luma component (1541) can be filtered by a cross-component filter (e.g., a CC-ALF) (1531) for the second chroma component to generate a fourth intermediate component (1543). Subsequently, a filtered second chroma component (1563) (e.g., 'Cr') can be generated based on at least one of the fourth intermediate component (1543) and the third intermediate component (1553). In an example, the filtered second chroma component (1563) (e.g., 'Cr') can be generated by combining the fourth intermediate component (1543) and the third intermediate component (1553) with an adder (1532). In an example, the cross-component adaptive loop filtering process for the second chroma component thus can include a step performed by the CC-ALF (1531) and a step performed by, for example, the adder (1532).

A cross-component filter (e.g., the CC-ALF (1521), the CC-ALF (1531)) can operate by applying a linear filter having any suitable filter shape to the luma component (or a luma channel) to refine each chroma component (e.g., the first chroma component, the second chroma component). The CC-ALF utilize correlation across color components to reduce coding distortion in one color component based on samples from another color component.

Figure 16:
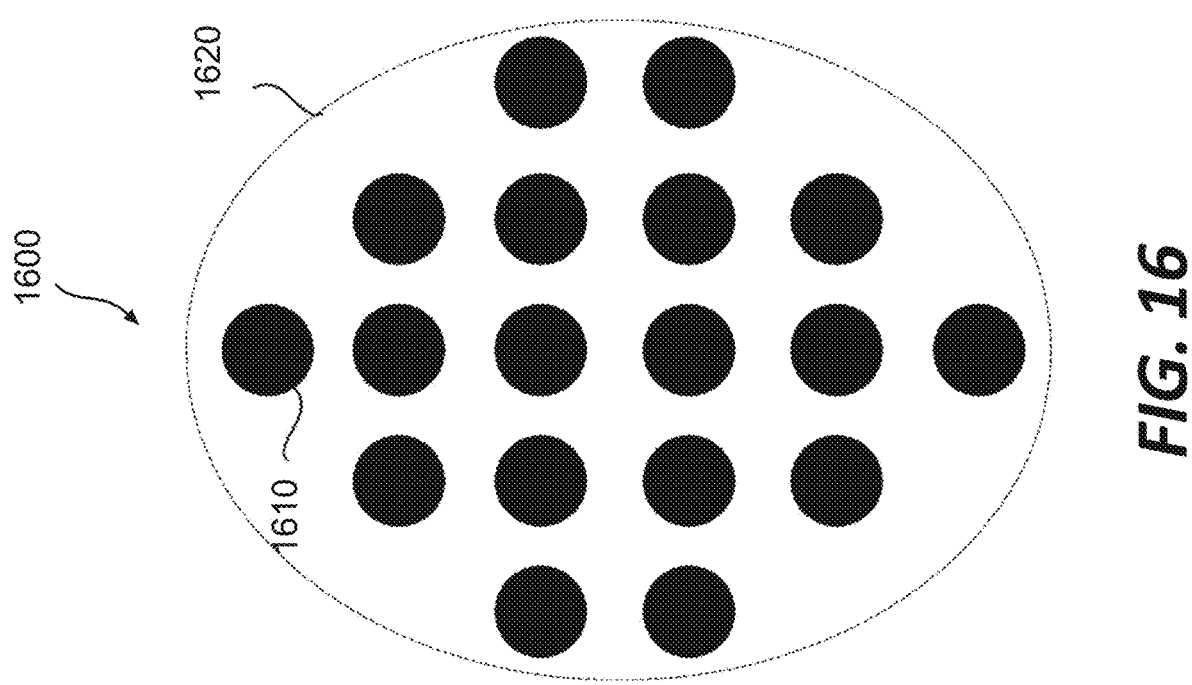
FIG. 16 shows an example of a cross-component ALF filter according to an embodiment of the disclosure.

FIG. 16 shows an example of a CC-ALF filter (1600) according to an embodiment of the disclosure. The filter (1600) can include non-zero filter coefficients and zero filter coefficients. The filter (1600) has a diamond shape (1620) formed by filter coefficients (1610) (indicated by circles having black fill). In an example, the non-zero filter coefficients in the filter (1600) are included in the filter coefficients (1610), and filter coefficients not included in the filter coefficients (1610) are zero. Thus, the non-zero filter coefficients in the filter (1600) are included in the diamond shape (1620), and the filter coefficients not included in the diamond shape (1620) are zero. In an example, a number of the filter coefficients of the filter (1600) is equal to a number of the filter coefficients (1610), which is 18 in the example shown in FIG. 14.

The CC-ALF can include any suitable filter coefficients (also referred to as the CC-ALF filter coefficients). Referring back to FIG. 15, the CC-ALF (1521) and the CC-ALF (1531) can have a same filter shape, such as the diamond shape (1620) shown in FIG. 16, and a same number of filter coefficients. In an example, values of the filter coefficients in the CC-ALF (1521) are different from values of the filter coefficients in the CC-ALF (1531).

In general, filter coefficients (e.g., non-zero filter coefficients, as derived by the encoder) in a CC-ALF can be transmitted, for example, in the APS. In an example, the filter coefficients can be scaled by a factor (e.g., $2^{10}$) and can be rounded for a fixed-point representation. Application of a CC-ALF can be controlled on a variable block size and signaled by a context-coded flag (e.g., a CC-ALF enabling flag) received for each block of samples. The context-coded flag, such as the CC-ALF enabling flag, can be signaled at any suitable level, such as a block level. The block size along with the CC-ALF enabling flag can be received at a slice-level for each chroma component. In some examples, block sizes (in chroma samples) 16×16, 32×32, and 64×64 can be supported.

In an example, the syntax changes of CC-ALF are described below in Table 3.

TABLE 3

Syntax changes of CC-ALF

| |
| --- |
| if ( slice_cross_component_alf_cb_enabled_flag ) |
|   alf_ctb_cross_component_cb_idc[ xCtb >> CtbLog2SizeY ][ yCtb >> Ctb Log2SizeY ]    ae(v) |
|   if( slice_cross_component_alf_cb_enabled_flag = = 0 \|\| alf_ctb_cross_component_cb_idc[ xCtb >> CtbLog2SizeY ][ yCtb >> CtbLog2SizeY ] == 0 ) |
|     if( slice_alf_chroma_idc = = 1 \|\| slice_alf_chroma_idc = = 3 ) { |
|       alf_ctb_flag[ 1 ][ xCtb >> CtbLog2SizeY ][ yCtb >> CtbLog2SizeY ]    ae(v) |
|       if( alf_ctb_flag[ 1 ][ xCtb >> CtbLog2SizeY ][ yCtb >> CtbLog2SizeY ] |
|         && aps_alf_chroma_num_alt_filters_minus1 > 0 ) |
|     alf_ctb_filter_alt_idx[ 0 ][ xCtb >> CtbLog2SizeY ][ yCtb >> CtbLog2SizeY ]    ae(v) |
|     } |
| if ( slice_cross_component_alf_cr_enabled_flag ) |
|   alf_ctb_cross_component_cr_idc[ xCtb >> CtbLog2SizeY ][ yCtb >> Ctb Log2SizeY ]    ae(v) |
|   if( slice_cross_component_alf_cr_enabled_flag = = 0 \|\| alf_ctb_cross_component_cr_idc[ xCtb >> CtbLog2SizeY ][ yCtb >> CtbLog2SizeY ] == 0 ) |
|     if( slice_alf_chroma_idc = = 2 \|\| slice_alf_chroma_idc = = 3 ) { |
|       alf_ctb_flag[ 2 ][ xCtb >> CtbLog2SizeY ][ yCtb >> CtbLog2SizeY ]    ae(v) |
|       if( alf_ctb_flag[ 2 ][ xCtb >> CtbLog2SizeY ][ yCtb >> CtbLog2SizeY ] |
|         && aps_alf_chroma_num_alt_filters_minus1 > 0 ) |
|     alf_ctb_filter_alt_idx[ 1 ][ xCtb >> CtbLog2SizeY ][ yCtb >> CtbLog2SizeY ]    ae(v) |
|     } |

The semantics of the example CC-ALF related syntaxes above can be described below:

alf_ctb_cross_component_cb_idc [xCtb>>CtbLog2SizeY][yCtb>>CtbLog2SizeY] equal to 0 can indicate that the cross component Cb filter is not applied to a block of Cb color component samples at a luma location (xCtb, yCtb).

alf_ctb_cross_component_cb_idc [xCtb>>CtbLog2SizeY][yCtb>>CtbLog2SizeY] not equal to 0 can indicate that the alf_ctb_cross_component_cb_idc [xCtb>>CtbLog2SizeY][yCtb>>CtbLog2SizeY]-th cross component Cb filter is applied to the block of Cb color component samples at the luma location (xCtb, yCtb).

alf_ctb_cross_component_cr_idc [xCtb>>CtbLog2SizeY][yCtb>>CtbLog2SizeY] equal to 0 can indicate that the cross component Cr filter is not applied to block of Cr color component samples at the luma location (xCtb, yCtb).

alf_ctb_cross_component_cr_idc [xCtb>>CtbLog2SizeY][yCtb>>CtbLog2SizeY] not equal to 0 can indicate that the alf_ctb_cross_component_cr_idc [xCtb>>CtbLog2SizeY][yCtb>>CtbLog2SizeY]-th cross component Cr filter is applied to the block of Cr color component samples at the luma location (xCtb, yCtb).

Figure 17A:
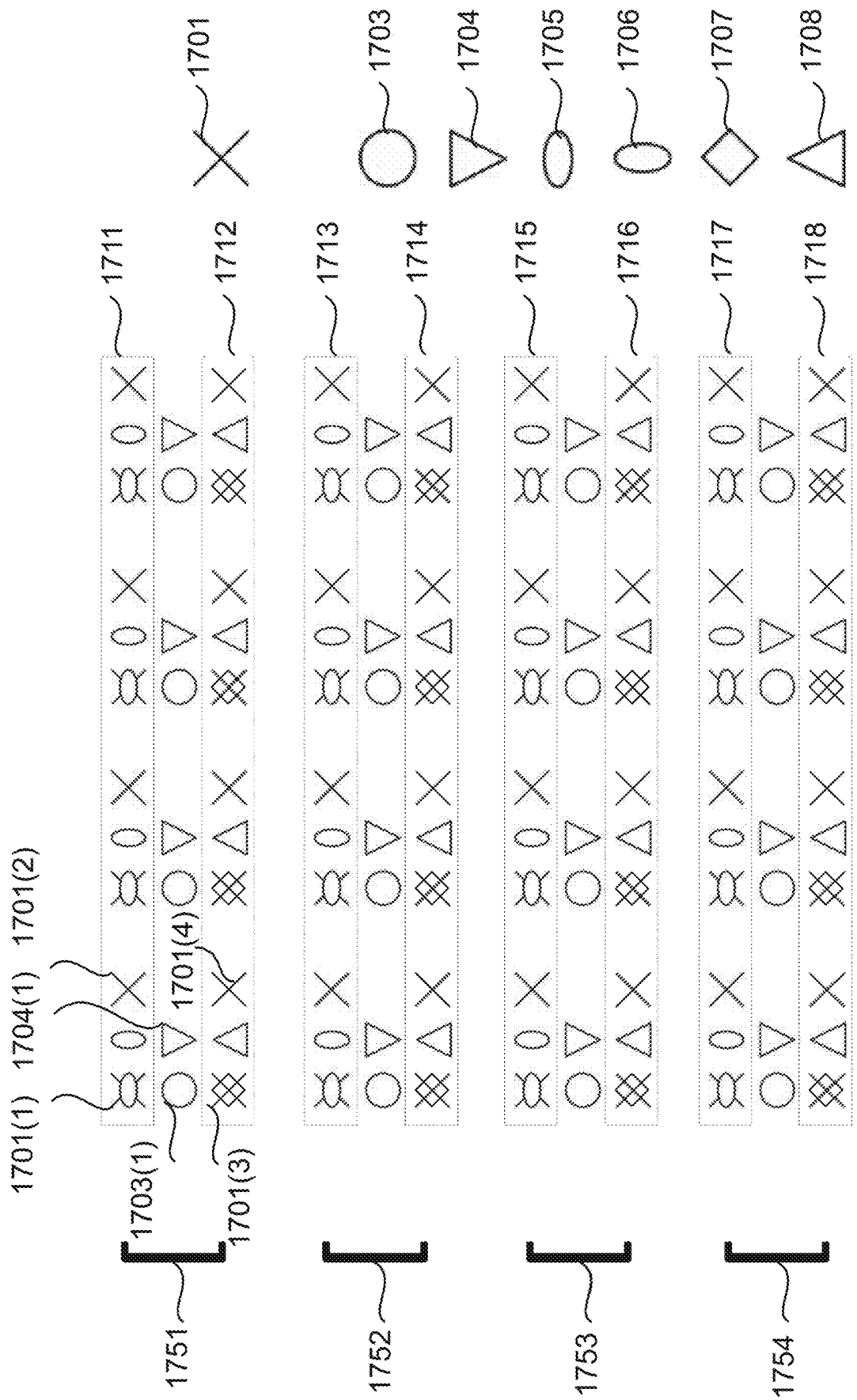
FIGS. 17A-17B show exemplary locations of chroma samples relative to luma samples according to embodiments of the disclosure.
Figure 17B:
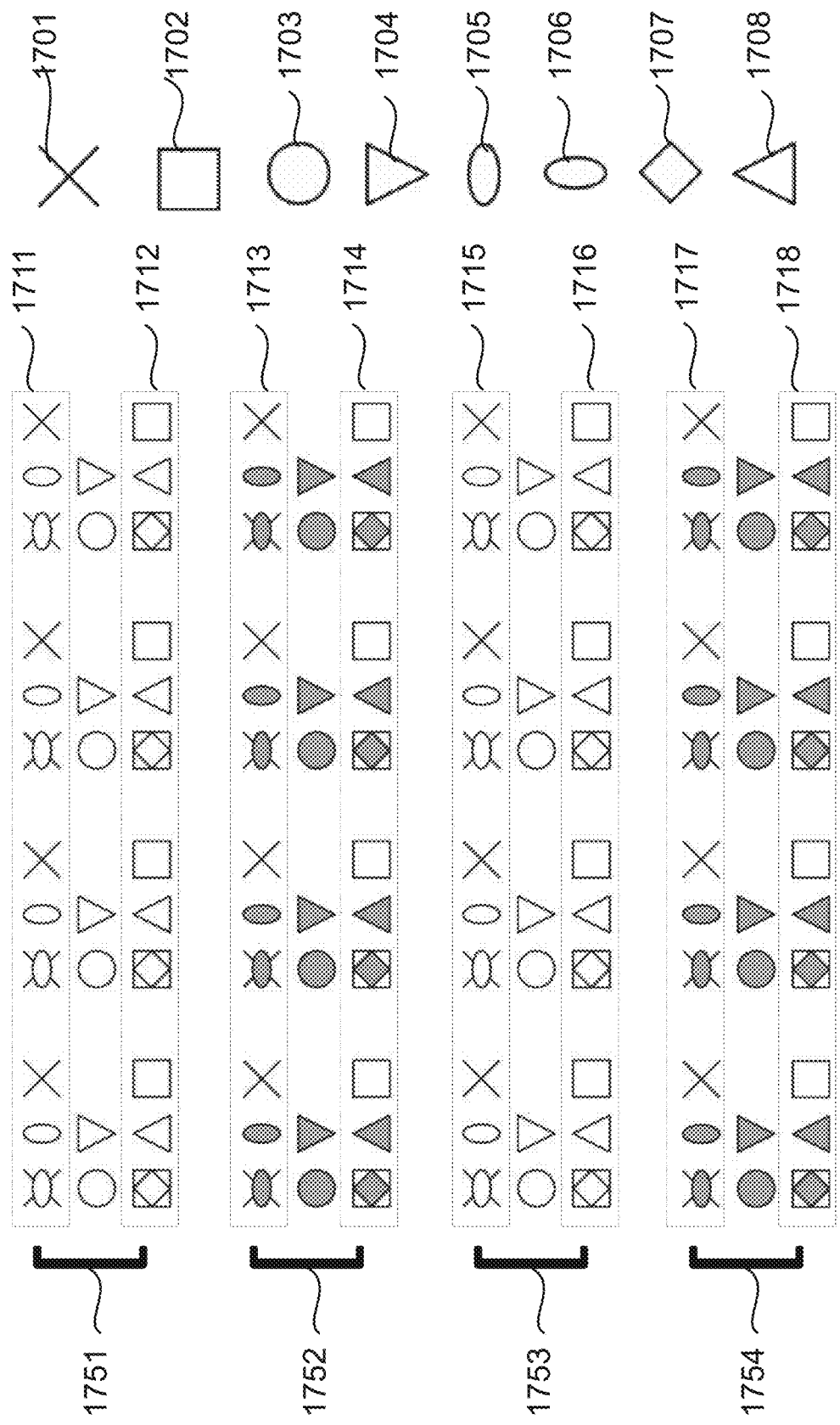

Examples of chroma sampling formats are described below. In general, a luma block can correspond to one or more chroma blocks, such as two chroma blocks. A number of samples in each of the chroma block(s) can be less than a number of samples in the luma block. A chroma subsampling format (also referred to as a chroma subsampling format, e.g., specified by chroma_format_idc) can indicate a chroma horizontal subsampling factor (e.g., SubWidthC) and a chroma vertical subsampling factor (e.g., SubHeightC) between each of the chroma block(s) and the corresponding luma block. Chroma subsampling scheme may be specified as 4:x:y formats for a nominal 4 (horizontal) by 4 (vertical) block, with x being the horizontal chroma subsampling factor (the number of chroma samples retained in the first row of the block) and y being how many chroma samples are retained in the second row of the block. In an example, the chroma subsampling format may be 4:2:0, indicating that the chroma horizontal subsampling factor (e.g., SubWidthC) and the chroma vertical subsampling factor (e.g., SubHeightC) are both 2, as shown in FIGS. 17A-17B. In another example, the chroma subsampling format may be 4:2:2, indicating that the chroma horizontal subsampling factor (e.g., SubWidthC) is 2, and the chroma vertical subsampling factor (e.g., SubHeightC) is 1. In yet another example, the chroma subsampling format may be 4:4:4, indicating that the chroma horizontal subsampling factor (e.g., SubWidthC) and the chroma vertical subsampling factor (e.g., SubHeightC) are 1. As such, a chroma sample format or type (also referred to as a chroma sample position) can indicate a relative position of a chroma sample in the chroma block with respect to at least one corresponding luma sample in the luma block.

FIGS. 17A-17B show exemplary locations of chroma samples relative to luma samples according to embodiments of the disclosure. Referring to FIG. 17A, the luma samples (1701) are located in rows (1711)-(1718). The luma samples (1701) shown in FIG. 17A can represent a portion of a picture. In an example, a luma block (e.g., a luma CB) includes the luma samples (1701). The luma block can correspond to two chroma blocks having the chroma subsampling format of 4:2:0. In an example, each chroma block includes chroma samples (1703). Each chroma sample (e.g., the chroma sample (1703(1)) corresponds to four luma samples (e.g., the luma samples (1701(1))-(1701(4)). In an example, the four luma samples are the top-left sample (1701(1)), the top-right sample (1701(2)), the bottom-left sample (1701(3)), and the bottom-right sample (1701(4)). The chroma sample (e.g., (1703(1))) may be located at a left center position that is between the top-left sample (1701(1)) and the bottom-left sample (1701(3)), and a chroma sample type of the chroma block having the chroma samples (1703) can be referred to as a chroma sample type 0. The chroma sample type 0 indicates a relative position 0 corresponding to the left center position in the middle of the top-left sample (1701(1)) and the bottom-left sample (1701(3)). The four luma samples (e.g., (1701(1))-(1701(4))) can be referred to as neighboring luma samples of the chroma sample (1703) (1).

In an example, each chroma block may include chroma samples (1704). The above description with reference to the chroma samples (1703) can be adapted to the chroma samples (1704), and thus detailed descriptions can be omitted for purposes of brevity. Each of the chroma samples (1704) can be located at a center position of four corresponding luma samples, and a chroma sample type of the chroma block having the chroma samples (1704) can be referred to as a chroma sample type 1. The chroma sample type 1 indicates a relative position 1 corresponding to the center position of the four luma samples (e.g., (1701(1))-(1701(4))). For example, one of the chroma samples (1704) can be located at a center portion of the luma samples (1701(1))-(1701(4)).

In an example, each chroma block includes chroma samples (1705). Each of the chroma samples (1705) can be located at a top left position that is co-located with the top-left sample of the four corresponding luma samples (1701), and a chroma sample type of the chroma block having the chroma samples (1705) can be referred to as a chroma sample type 2. Accordingly, each of the chroma samples (1705) is co-located with the top left sample of the four luma samples (1701) corresponding to the respective chroma sample. The chroma sample type 2 indicates a relative position 2 corresponding to the top left position of the four luma samples (1701). For example, one of the chroma samples (1705) can be located at a top left position of the luma samples (1701(1))-(1701(4)).

In an example, each chroma block includes chroma samples (1706). Each of the chroma samples (1706) can be located at a top center position between a corresponding top-left sample and a corresponding top-right sample, and a chroma sample type of the chroma block having the chroma samples (1706) can be referred to as a chroma sample type 3. The chroma sample type 3 indicates a relative position 3 corresponding to the top center position between the top-left sample and the top-right sample. For example, one of the chroma samples (1706) can be located at a top center position of the luma samples (1701(1))-(1701(4)).

In an example, each chroma block includes chroma samples (1707). Each of the chroma samples (1707) can be located at a bottom left position that is co-located with the bottom-left sample of the four corresponding luma samples (1701), and a chroma sample type of the chroma block having the chroma samples (1707) can be referred to as a chroma sample type 4. Accordingly, each of the chroma samples (1707) is co-located with the bottom left sample of the four luma samples (1701) corresponding to the respective chroma sample. The chroma sample type 4 indicates a relative position 4 corresponding to the bottom left position of the four luma samples (1701). For example, one of the chroma samples (1707) can be located at a bottom left position of the luma samples (1701(1))-(1701)(4)).

In an example, each chroma block includes chroma samples (1708). Each of the chroma samples (1708) is located at a bottom center position between the bottom-left sample and the bottom-right sample, and a chroma sample type of the chroma block having the chroma samples (1708) can be referred to as a chroma sample type 5. The chroma sample type 5 indicates a relative position 5 corresponding to the bottom center position between the bottom-left sample and the bottom-right sample of the four luma samples (1701). For example, one of the chroma samples (1708) can be located between the bottom-left sample and the bottom-right sample of the luma samples (1701(1))-(1701)(4)).

In general, any suitable chroma sample type can be used for a chroma subsampling format. The chroma sample types 0-5 provide exemplary chroma sample types described with the chroma subsampling format 4:2:0. Additional chroma sample types may be used for the chroma subsampling format 4:2:0. Further, other chroma sample types and/or variations of the chroma sample types 0-5 can be used for other chroma subsampling formats, such as 4:2:2, 4:4:4, or the like. In an example, a chroma sample type combining the chroma samples (1705) and (1707) may be used for the chroma subsampling format 4:2:2.

In another example, the luma block is considered to have alternating rows, such as the rows (1711)-(1712) that include the top two samples (e.g., (1701(1))-(1701)(2))) of the four luma samples (e.g., (1701(1))-(1701)(4))) and the bottom two samples (e.g., (1701(3))-(1701)(4))) of the four luma samples (e.g., (1701(1)-(1701)(4))), respectively. Accordingly, the rows (1711), (1713), (1715), and (1717) can be referred to as current rows (also referred to as a top field), and the rows (1712), (1714), (1716), and (1718) can be referred to as next rows (also referred to as a bottom field). The four luma samples (e.g., (1701(1))-(1701)(4))) are located at the current row (e.g., (1711)) and the next row (e.g., (1712)). The relative chroma positions 2-3 above are located in the current rows, the relative chroma positions 0-1 above are located between each current row and the respective next row, and the relative chroma positions 4-5 above are located in the next rows.

The chroma samples (1703), (1704), (1705), (1706), (1707), or (1708) are located in rows (1751)-(1754) in each chroma block. Specific locations of the rows (1751)-(1754) can depend on the chroma sample type of the chroma samples. For example, for the chroma samples (1703)-(1704) having the respective chroma sample types 0-1, the row (1751) is located between the rows (1711)-(1712). For the chroma samples (1705)-(1706) having the respective the chroma sample types 2-3, the row (1751) is co-located with the current row (1711). For the chroma samples (1707)-(1708) having the respective the chroma sample types 4-5, the row (1751) is co-located with the next row (1712). The above descriptions can be suitably adapted to the rows (1752)-(1754), and the detailed descriptions are omitted for brevity.

Any suitable scanning method can be used for displaying, storing, and/or transmitting the luma block and the corresponding chroma block(s) described above in FIG. 17A. In some example implementations, progressive scanning may be used.

Alternatively, an interlaced scan may be used, as shown in FIG. 17B. As described above, the chroma subsampling format may be 4:2:0 (e.g., chroma_format_idc is equal to 1). In an example, a variable chroma location type (e.g., ChromaLocType) may indicate the current rows (e.g., ChromaL-ocType is chroma_sample_loc_type_top_field) or the next rows (e.g., ChromaLocType is chroma_sample_loc_type_bottom_field). The current rows (1711), (1713), (1715), and (1717) and the next rows (1712), (1714), (1716), and (1718) can be scanned separately. For example, the current rows (1711), (1713), (1715), and (1717) can be scanned first followed by the next rows (1712), (1714), (1716), and (1718) being scanned. The current rows can include the luma samples (1701) while the next rows can include the luma samples (1702).

Similarly, the corresponding chroma block can be scanned in an interlaced manner. The rows (1751) and (1753) including the chroma samples (1703), (1704), (1705), (1706), (1707), or (1708) with no fill can be referred to as current rows (or current chroma rows), and the rows (1752) and (1754) including the chroma samples (1703), (1704), (1705), (1706), (1707), or (1708) with gray fill can be referred to as next rows (or next chroma rows). In an example, during the interlaced scan, the rows (1751) and (1753) may be scanned first followed by scanning the rows (1752) and (1754).

Besides ALF described above, a constrained directional enhancement filter (CDEF) may also be used for loop filtering in video coding. An in-loop CDEF may be used to filter out coding artifacts such as quantization ringing artifacts while retaining details of an image. In some coding technologies, a sample adaptive offset (SAO) algorithm may be employed to achieve a similar goal by defining signal offsets for different classes of pixels. Unlike SAO, a CDEF is a non-linear spatial filter. In some examples, the design of the CDEF filter is constrained to be easily vectorizable (e.g., implementable with single instruction, multiple data (SIMD) operations), which was not the case for other non-linear filters such as a median filter and a bilateral filter.

The CDEF design originates from the following observations. In some situations, an amount of ringing artifacts in a coded image can be approximately proportional to a quantization step size. The smallest detail retained in the quantized image is also proportional to the quantization step size. As such, retaining image details would demand smaller quantization step size which would yield higher undesirable quantization ringing artifacts. Fortunately, for a given quantization step size, the amplitude of the ringing artifacts can be less than the amplitude of the details, thereby affording an opportunity for designing a CDEF to strike a balance to filter out the ringing artifacts while maintaining sufficient details.

A CDEF can first identify a direction of each block. The CDEF can then adaptively filter along the identified direction and to a lesser degree along directions rotated 45° from the identified direction. The filter strengths can be signaled explicitly, allowing a high degree of control over blurring of details. An efficient encoder search can be designed for the filter strengths. CDEF can be based on two in-loop filters and the combined filter can be used for video coding. In some example implementations, the CDEF filter(s) may follow deblocking filter(s) for in-loop filtering.

Figure 18:
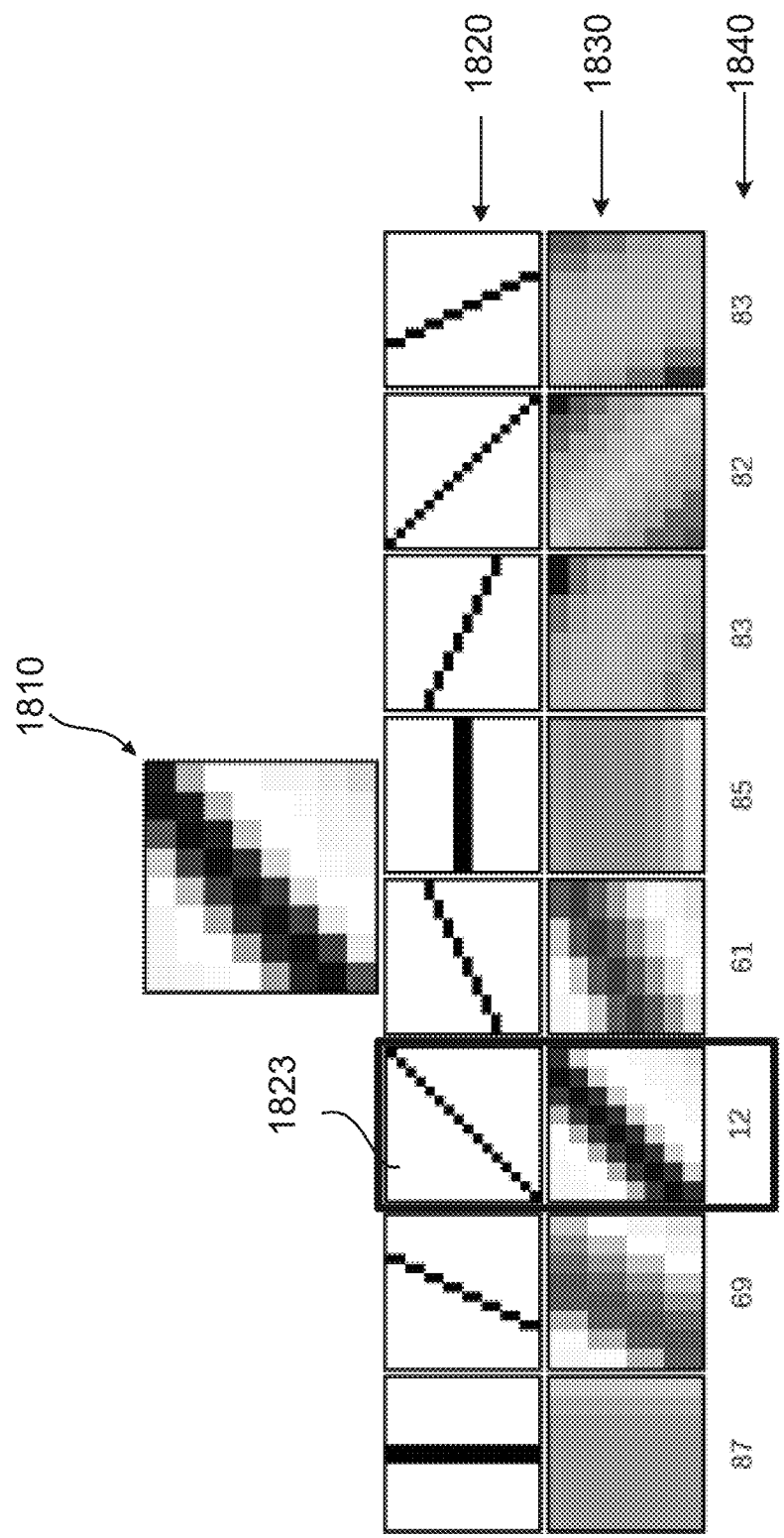
FIG. 18 shows an example of direction search for a block according to an embodiment of the disclosure.

The direction search can operate on reconstructed pixels (or samples), for example, after a deblocking filter, as illustrated in FIG. 18. Since the reconstructed pixels are available to a decoder, the directions may not require signaling. The direction search can operate on blocks having a suitable size (e.g., 8×8 blocks) that are small enough to adequately handle non-straight edges (so that the edges appear sufficient straight in the filtering blocks) and are large enough to reliably estimate directions when applied to a quantized image. Having a constant direction over an 8×8 region can make vectorization of the filter easier. For each block, the direction that best matches a pattern in the block can be determined by minimizing a difference measure, such as a sum of squared differences (SSD), RMS error, and the like, between the quantized block and each of the perfectly directional blocks. In an example, a perfectly directional block (e.g., one of (1820) of FIG. 18) refers to a block where all pixels along a line in one direction have the same value. FIG. 18 shows an example of direction search for an 8×8 block (1810) according to an example embodiment of the disclosure. In an example shown in FIG. 18, the 45-degree direction (1823) among a set of directions (1820) is selected because the 45-degree direction (1823) can minimize the error (1840). For example, the error for the 45-degree direction is 12 and is the smallest among the errors ranging from 12 to 87 indicated by a row (1840).

An example non-linear low-pass directional filter is described in further detail below. Identifying the direction can help align filter taps along the identified direction to reduce ringing artifacts while preserving the directional edges or patterns. However, in some examples, directional filtering alone cannot sufficiently reduce ringing artifacts. It is desired to use additional filter taps on pixels that do not lie along a main direction (e.g., the identified direction). To reduce the risk of blurring, the additional filter taps can be treated more conservatively. Accordingly, a CDEF can define primary taps and secondary taps. In some example implementations, a complete two-dimensional (2-D) CDEF filter may be expressed as $$y(i, j) = x(i, j) + \text{round}\left(\sum_{m,n} w_{d,m,n}^{(p)} f(x(m, n) - x(i, j), S^{(p)}, D) + \sum_{m,n} w_{d,m,n}^{(s)} f(x(m, n) - x(i, j), S^{(s)}, D)\right), \quad \text{Eq. (14)}$$

In Eq. (14), D represents a damping parameter, $S^{(p)}$ and $S^{(s)}$ represent the strengths of the primary and secondary taps, respectively, and a function round(·) can round ties away from zero, $w_{d,m,n}^{(p)}$ and $w_{d,m,n}^{(s)}$ represent the filter weights, and f(d, S, D) represents a constraint function operating on a difference d (e.g., d=x(m, n)−x(i, j)) between a filtered pixel (e.g., x(i, j)) and each of the neighboring pixels (e.g., x(m, n)). When the difference is small, f(d, S, D) can be equal to the difference d (e.g., f(d, S, D)=d), and thus the filter can behave as a linear filter. When the difference is large, f(d, S, D) can be equal to 0 (e.g.,f(d, S, D)=0), which effectively ignores the filter tap.

As another in-loop processing component, a set of in-loop restoration schemes may be used in video coding post deblocking to generally de-noise and enhance the quality of edges beyond a deblocking operation. The set of in-loop restoration schemes can be switchable within a frame (or a picture) per suitably sized tile. Some examples of the in-loop restoration schemes are described below based on separable symmetric Wiener filters and dual self-guided filters with subspace projection. Because content statistics can vary substantially within a frame, the filters can be integrated within a switchable framework where different filters can be triggered in different regions of the frame.

An example separable symmetric Wiener filter is described below. The Wiener filter can be used as one of the switchable filters. Every pixel (or sample) in a degraded frame can be reconstructed as a non-causal filtered version of pixels within a w×w window around the pixel, where w=2r+1 and is odd for an integer r. The 2-D filter taps can be denoted by a vector F in a column-vectorized form having $w^2$×1 elements, and a straightforward linear minimum mean square error (LMMSE) optimization may lead to filter parameters given by F=H$^{-1}$M, where H is equal to E[XX$^T$] and is the auto-covariance of x, the column-vectorized version of the $w^2$ samples in the w×w window around a pixel, and where M is equal to E[YX$^T$] representing the cross correlation of x with the scalar source sample y to be estimated. The encoder can be configured to estimate H and M from realizations in the deblocked frame and the source, and send the resultant filter F to a decoder. However, in some example implementations, a substantial bitrate cost can occur in transmitting $w^2$ taps. Further, non-separable filtering can make decoding prohibitively complex. Therefore, a plurality of additional constraints may be imposed on the nature of F. For example, F may be constrained to be separable so that the filtering can be implemented as separable horizontal and vertical w-tap convolutions. In an example, each of the horizontal and vertical filters are constrained to be symmetric. Further, in some example implementations, a sum of the horizontal and vertical filter coefficients may be assumed to sum to 1.

Dual self-guided filtering with subspace projection may also be used as one of the switchable filters for in-loop restoration and is described below. In some example implementations, guided filtering can be used in image filtering where a local linear model is used to compute a filtered output y from an unfiltered sample x. The local linear model may be written as $$y = Fx + G \quad \text{Eq. (15)}$$

where F and G can be determined based on statistics of a degraded image and a guidance image (also referred to as a guide image) in a neighborhood of the filtered pixel. If the guide image is identical to the degraded image, the resultant self-guided filtering can have the effect of edge preserving smoothing. According to some aspects of the disclosure, the specific form of self-guided filtering may depend on two parameters: a radius r and a noise parameter e, and is enumerated as follows:

1. Obtain a mean μ and a variance $\sigma^2$ of pixels in a (2r+1)×(2r+1) window around every pixel. For example, obtaining the mean μ and the variance $\sigma^2$ of the pixels may be implemented efficiently with box filtering based on integral imaging.

2. Compute parameters f and g for every pixel based on Eq. (16)

$$f = \sigma^2/(\sigma^2 + e); \quad g = (1-f)\mu \quad \text{Eq. (16)}$$

3. Compute F and G for every pixel as averages of values of the parameters f and g in a 3×3 window around the pixel for use.

The dual self-guided filtering may be controlled by the radius r and the noise parameter e, where a larger radius r can imply a higher spatial variance and a higher noise parameter e can imply a higher range variance.

Figure 19:
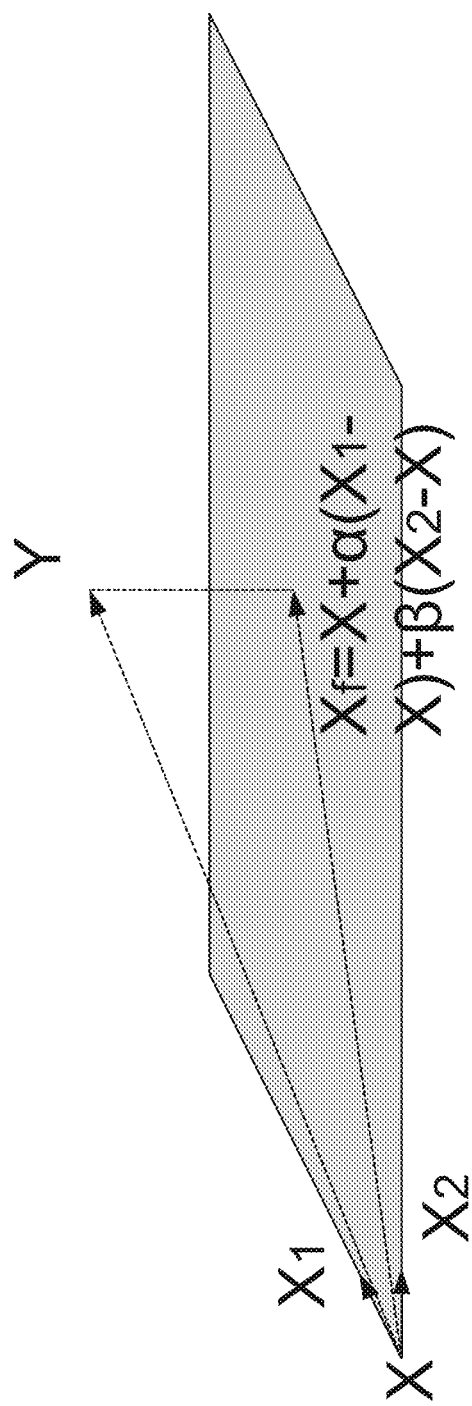
FIG. 19 shows an example of a subspace projection according to an embodiment of the disclosure.

FIG. 19 shows an example of a subspace projection according to an example embodiment of the disclosure. In the example shown in FIG. 19, the subspace projection may use cheap restorations $X_1$ and $X_2$ to produce a final restoration $X_f$ closer to a source Y. Even though cheap restorations $X_1$ and $X_2$ are not close to a source Y, appropriate multipliers {α, β} can bring the cheap restorations $X_1$ and $X_2$ much closer to the source Y if the cheap restorations $X_1$ and $X_2$ move in the right direction. For example, the final restoration $X_f$ may be obtained based on Eq. (17) below.

$$X_f = X + \alpha(X_1 - X) + \beta(X_2 - X) \quad \text{Eq. (17)}$$

Besides the deblocking filter, the ALF, the CDEF, and the loop restoration described above, a loop filtering method referred to as a Cross-Component Sample Offset (CCSO) filter or CCSO, may also be implemented in the loop filtering process to reduce distortion of reconstructed samples (also referred to as reconstruction samples). The CCSO filter may be placed anywhere within the loop filing stage. In a CCSO filtering process, a non-linear mapping can be used to determine an output offset based on processed input reconstructed samples of a first color component. The output offset can be added to a reconstructed sample of a second color component in a filtering process of CCSO.

The input reconstructed samples can be from the first color component located in a filter support area, as shown in FIG. 20. Specifically, FIG. 20 shows an example of the filter support area in a CCSO filter according to an embodiment of the disclosure. The filter support area can include four reconstructed samples: p0, p1, p2, and p3. The four input reconstructed samples in the example of FIG. 20 follow a cross-shape in a vertical direction and a horizontal direction. In an example, a center sample (denoted by c) in the first color component and a sample (denoted by f) to be filtered in the second color component are co-located. When processing the input reconstructed samples, the following steps can be applied:

Step 1: Delta values (e.g., differences) between the four reconstructed samples: p0, p1, p2, and p3 and the center sample c are computed, and are denoted as m0, m1, m2, and m3, respectively. For example, the delta value between p0 and c is m0.

Step 2: The delta values m0 to m3 can be further quantized into a number of (e.g., 4) discrete values. The quantized values can be denoted, for example, as d0, d1, d2, and d3 for m0, m1, m2, and m3, respectively. In an example, the quantized value for each of the d0, d1, d2, and d3 may be −1, 0, or 1 based on the following quantization process:

$$di=-1, \text{ if } mi<-N;\qquad\qquad\text{Eq. (18)}$$

$$di=0, \text{ if } -N<=mi<=N;\qquad\qquad\text{Eq. (19)}$$

$$di=1, \text{ if } mi>N.\qquad\qquad\text{Eq. (20)}$$

where N is a quantization step size, example values of N are 4, 8, 12, 16, and the like, di and mi refer to the respective quantized value and the delta value where i is 0, 1, 2, or 3.

The quantized values d0 to d3 can be used to identify a combination of the non-linear mapping. In the example shown in FIG. 20, the CCSO filter has four filter inputs d0 to d3, and each filter input can have one of the three quantized values (e.g., −1, 0, and 1), and thus a total number of combinations is 81 (e.g., $3^4$). FIGS. 21A-21C show an example of the 81 combinations according to an embodiment of the disclosure. The last column can represent the output offset value for each combination. The output offset values can be integers, such as 0, 1, −1, 3, −3, 5, −5, −7, and the like. The first column represents indices assigned to these combinations of quantized d0, d1, d2 and d3. The middle columns represent all possible combinations of the quantized d0, d1, d2 and d3.

The final filtering process of the CCSO filter can be applied as follows:

$$f'=\text{clip}(f+s),\qquad\qquad\text{Eq. (21)}$$

where f is the reconstructed sample to be filtered, s is the output offset value, for example, retrieved from FIGS. 21A-21C. In an example shown in Eq. (21), the filtered sample value f' of the reconstructed sample to be filtered f can be further clipped into a range associated with a bit-depth.

A Local Sample Offset (LSO) method or an LSO filtering process can be used in video coding. In LSO, a similar filtering approach as used in CCSO can be applied. However, an output offset value can be applied on a color component that is the same color component of which the input reconstructed samples used in the filtering process are in. Accordingly, in LSO, the input reconstructed samples (e.g., p0-p3 and c) used in the filtering process and the reconstructed sample to be filtered (e.g., f) are in a same component, such as a luma component, a chroma component, or any suitable component. An LSO can a filter shape (such as shown in FIG. 20) that is similar or identical to that of a CCSO.

Figure 22:
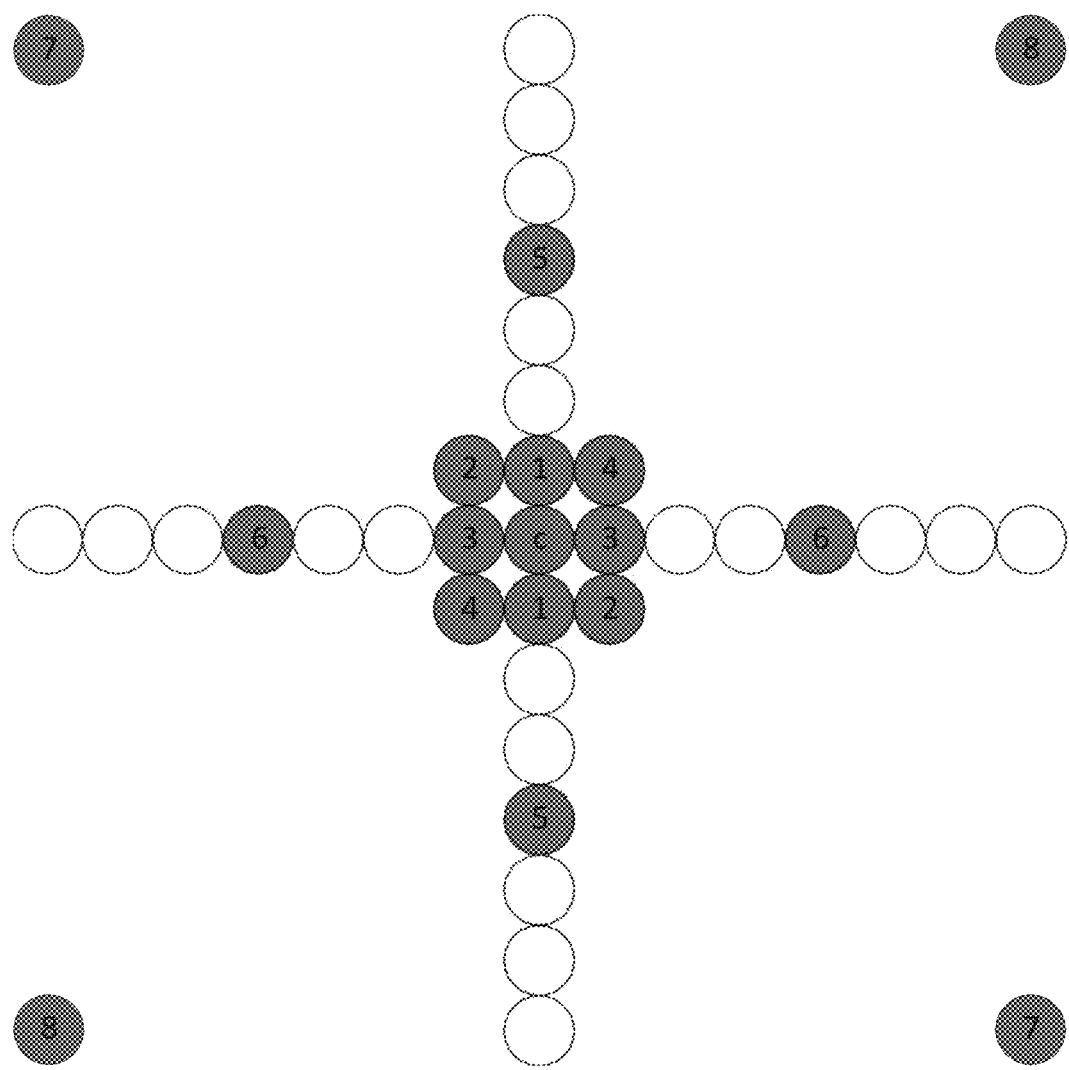
FIG. 22 shows an example implementation of a CCSO filter according to an embodiment of the disclosure.

The example CCSO filtering of reconstructed sample f in the second color to be filtered corresponding to sample c of the first color with p0, p1, p2, and p1 of the first color, as shown in FIG. 20, may be referred to as a 5-tap CCSO filter design. Alternatively, other CCSO design with different number of filter tabs may be used. For example, a lower-complexity three tap CCSO design can be used in video coding. FIG. 22 shows an example implementation of CCSO according to an embodiment of the disclosure. Any of the eight different example filter shapes may be defined for a 3-tap CCSO implementation. Each of the filter shapes can define positions of the three reconstructed samples (also referred to as three taps) in a first component (also referred to as a first color component). The three reconstructed samples can include a center sample (denoted as c) and two symmetrically located samples, as denoted with same number (one of 1-8) in FIG. 22. In an example, a reconstructed sample in a second color component to be filtered is co-located with the center sample c. For purposes of clarity, the reconstructed sample in the second color component to be filtered is not shown in FIG. 22.

A Sample Adaptive Offset (SAO) filter can be used in video coding. In some example implementations, a SAO filter or a SAO filtering process can be applied to a reconstruction signal after a deblocking filter by using offset values, for example, in a slice header. For luma samples, an encoder can determine whether the SAO filter is applied for a current slice. If the SAO filter is enabled, a current picture can be recursively split into four sub-regions and one of six SAO types (e.g., SAO types 1-6) can be selected for each sub-region, as shown in Table 4. The SAO filter can classify reconstructed pixels into a plurality of categories and reduce the distortion by adding an offset to pixels of each category in a current sub-region. Edge properties can be used for pixel classification in the SAO types 1-4, and a pixel intensity can be used for pixel classification in the SAO types 5-6.

TABLE 4

Specification of SAO types

| SAO type | SAO type to be used | Number of categories |
| --- | --- | --- |
| 0 | None | 0 |
| 1 | 1-D 0-degree pattern edge offset | 4 |
| 2 | 1-D 90-degree pattern edge offset | 4 |
| 3 | 1-D 135-degree pattern edge offset | 4 |
| 4 | 1-D 45-degree pattern edge offset | 4 |
| 5 | central bands band offset | 16 |
| 6 | side bands band offset | 16 |

A band offset (BO) can be used to classify pixels (e.g., all pixels) of a sub-region into multiple bands where each band can include pixels in a same intensity interval. An intensity range can be equally divided into a plurality of intervals (e.g., 32 intervals) from a minimum intensity value (e.g., zero) to a maximum intensity value (e.g. 255 for 8-bit pixels), and each interval can have an offset. Subsequently, the plurality of intervals or bands (e.g., 32 bands) can be divided into two groups. One group can include the 16 central bands, and the other group can include the 16 remaining bands. In an example, only offsets in one group are transmitted. Regarding the pixel classification operation in the BO, the five most significant bits of each pixel can be directly used as a band index.

Figure 23:
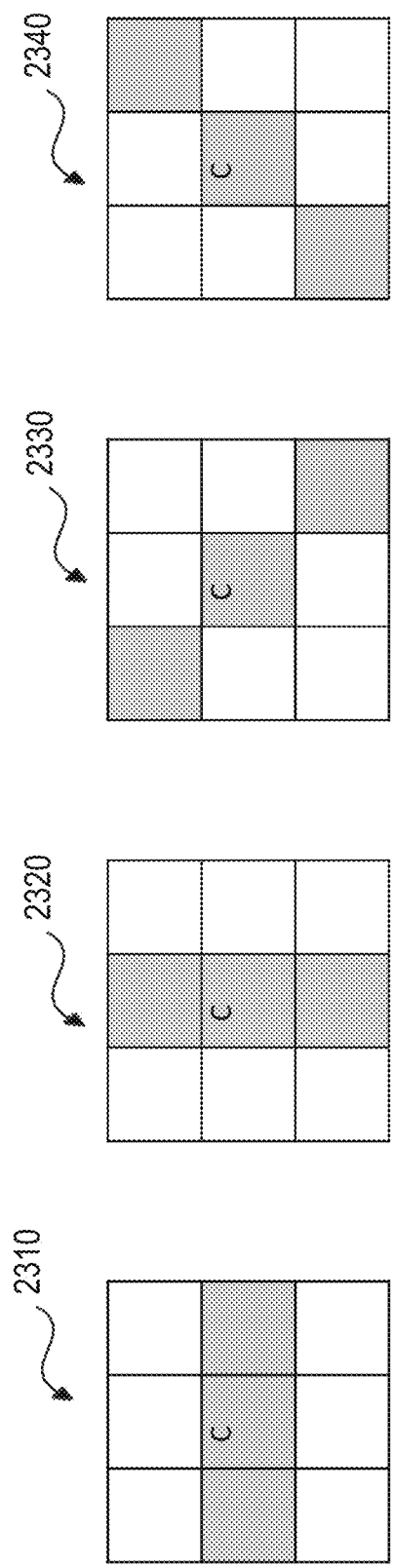
FIG. 23 shows four exemplary patterns for pixel classifications in an edge offset according to an embodiment of the disclosure.

An edge offset (EO) can use four 1-D 3-pixel patterns for pixel classification with consideration of edge directional information, as shown in FIG. 23. FIG. 23 shows examples of the four 1-D 3-pixel patterns for the pixel classification in the EO. From left to right, the four 1-D 3-pixel patterns correspond to a 1D 0-degree pattern (2310), a 1D 90-degree pattern (2320), a 1D 135-degree pattern (2330), and a 1D 45-degree pattern (2340), respectively. For each sub-region of a picture (e.g., the current picture), one of the four patterns can be selected to classify pixels into multiple categories by comparing each pixel with two neighboring pixels of the pixel. The selection can be sent in a bit-stream as side information. Table 5 shows the pixel classification rule for the EO.

TABLE 5

Pixel classification rule for the EO

| Category | Condition |
|---|---|
| 1 | c < 2 neighbors |
| 2 | c < 1 neighbor && c == 1 neighbor |
| 3 | c > 1 neighbor && c == 1 neighbor |
| 4 | c > 2 neighbors |
| 0 | None of the above |

In an example, it is desirable that the SAO on a decoder side is operated LCU-independently so that line buffers can be saved. In order to operate the SAO LCU-independently, in an example, pixels of the top and the bottom rows in each LCU are not SAO processed when the 90-degree, the 135-degree, and the 45-degree classification patterns are chosen, and pixels of the leftmost and rightmost columns in each LCU are not SAO processed when the 0-degree, the 135-degree, and the 45-degree patterns are chosen.

Table 6 below describes syntaxes that may be signaled for a CTU if the parameters are not merged from neighboring CTU.

TABLE 6

An example of SAO syntax

| | Descriptor |
|---|---|
| sao_offset_vlc( rx, ry, cIdx ) { | |
|   sao_type_idx[ cIdx ][ rx ][ ry ] | ue(v) |
|   if( sao_type_idx[ cIdx ][ rx ][ ry ] = =5 ) { | |
|     sao_band_position[ cIdx ][ rx ][ ry ] | u(5) |
|     for( i = 0; i < 4; i++ ) | |
|       sao_offset[ cIdx ][ rx ][ ry ][ i ] | se(v) |
|   } else if( sao_type_idx[ cIdx ][ rx ][ ry ] ! = 0 ) | |
|     for( i = 0; i < 4; i++ ) | |
|       sao_offset[ cIdx ][ rx ][ ry ][ i ] | ue(v) |
| } | |

In some implementations for the CCSO loop filtering process described above, a correspondence between combinations of quantized delta values (or their indices) and the cross-component sample offset values, as exemplarily illustrated for a 5-tap CCSO filtering in FIGS. 21A-21C, may be referred to as a CCSO lookup table (LUT). One or more of LUTs may be potentially used in a CCSO filtering process during video encoding or decoding. When multiple LUTs are provided for CCSO filtering, a selection from the multiple LUTs may be dynamically and adaptively made by the encoder or decoder during the loop filtering process at various levels (e.g. picture level, slice level, CTB level, CB level, FU level, and the like).

Each of these LUTs may be based on any suitable number of taps (e.g. 5 taps or 3-taps, or any other number of taps) and delta quantization levels (e.g., 3-level delta quantization described above, or any other number of delta quantization levels). As such, the LUTs may be of different sizes (e.g., $(5-1)^3=81$ quantized delta combination and offset correspondences for a 5-tap and 3 quantization level CCSO, as described above; or $(3-1)^3=8$ quantized delta combination and offset correspondences for a 3-ta and 3 quantization level CCSO).

As described above, some of these LUTs may be pre-defined. For example, these predefined CCSO LUTs may be pre-trained offline using training image data for general use by CCSO filtering processes. Such predefined LUTs may be fixed constant (fixed constant offsets for various predefined quantized delta value combinations) and thus the contents of these predefined LUTs may not need to be signaled in a video bitstream from an encoder to a decoder. Instead, these LUTs may be prestored, or may be hardwired or hard coded for use by the CCSO filtering process in a video encoder or video decoder.

As further described above, some of the CCSO LUTs besides the predefined/pre-trained LUTs that are used during the CCSO filtering process may be derived by the encoder during the encoding process rather than offline-trained. These CCSO LUTs are not pre-defined and thus their contents would need to be explicitly signaled in the bit-stream. The signaling of these encoder-derived LUTs are usually expensive since it involves significant overhead per frame, particularly for large LUTs, thereby potentially causing significant and undesirable overall bitrate loss. As such, it may be desirable to devise an efficient scheme for organizing, encoding, and signaling these LUTs in a bitstream.

In some example implementations, only predefined LUTs may be used in the CCSO filtering process when encoding or decoding a video. In some other example implementations, only encoder-derived LUTs may be used in the CCSO filtering process when encoding or decoding a video. In yet some other example implementations, both predefined LUTs and encoder-derived LUTs may be used in the CCSO filtering process when encoding or decoding a video, and CCSO filtering of a particular FU may use any LUT selected from the predefined and encoder-derived LUTs.

As described in detail above, the CCSO process refers to a filtering process which uses the reconstructed samples of a first color component as input (e.g., Y or Cb or Cr, in other words, including the luma component and not just limited to chroma components), and the output is applied on a second color component which is a different color component of the first color component according to a particular CCSO LUT. An example 5-tap filter shape of CCSO filter is shown in FIG. 20 and a corresponding example LUT is shown in FIGS. 21A-21C.

While the filtering process where the first color component and the second color component are different is referred to as CCSO, intra color offset process referred to as Local Sample Offset (LSO), as described above, may also be implemented. The LSO filter process may use reconstructed samples of a first color component as input (e.g., Y or Cb or Cr), and the output is applied on the same first color component according to a particular LSO LUT. The particular LSO LUT may be selected from one or more LUTs for LSO and used to determine the local sample offset, similar to the determination of the cross-component sample offset in the CCSO process. Like the CCSO LUTs, such LSO LUTs, for example, may be predefined (offline-trained) as fixed constant LUTs or may be derived by the encoder during the encoding process. The encoder-derived the LSO LUTs would need to be signaled in the bitstream, whereas the predefined/fixed/constant/offline-trained LSO LUTs may be pre-stored or hardwired or hard coded in an encoder or decoder and may not need to be signaled, similar to the predefined CCSO LUTs described above.

The following disclosure further describes various example implementations of dynamic and adaptive selection of the sample offset LUTs during in-loop filtering of reconstructed samples in coding blocks in decoders and encoder. These implementations and their underlying principles are applicable not only to CCSO filtering, but also applies to LSO filtering. For convenience of description, CCSO may be specifically referred to in some situations. However, the disclosure below is not limited to CCSO and are applicable to LSO as well.

In some example implementations, one or more predefined lookup tables (LUTs) may be defined for CCSO and/or LSO and these lookup tables may be used to derive the offset values that are added on the reconstructed sample value of a particular color component to calculate CCSO or LSO filtered sample value, according to, for example Eq. (21). These predefined CCSO and/or LSO LUTs are shared and made known among the encoders and decoders ahead of time. These LUTs thus may be stored, hardwired, or hard coded in any of the encoder or decoder devices.

Each LUTs represents a particular non-linear mapping between certain delta values and sample offset values. When multiple LUTs are available for use, selection of the LUTs at various filter levels (FU, or any other level) for each color component may be made in the encoder and signaled to the decoder. In some implementations described below, the selection of the LUTs (or various nonlinear mappings between various delta values and sample offset values) may be implemented with various local adaptivity.

In some implementations, the local adaptivity may be based on a certain statistic derived based on the coded information of the block area win which CCSO or LSO filtering is applied. These statistics characteristics of the filtering block area may represent image characteristics in the reconstructed samples that correlates with potential distortions that may be adaptively dealt with by sample offset filter selection (e.g., selection of the CCSO or LSO lookup tables). These statistics may include but are not limited to one or more of the followings.

I. Edge direction derived in CDEF described above, or edge direction derived using other edge detection methods such as Canny Edge detector or Sobel Edge detector.

II. A measurement of the smoothness of the reconstructed samples within the sample area at various filtering levels at which CDEF is applied.

In one embodiment, the smoothness may be computed by an range of sample values within the sample area. The range of sample value may be defined as the absolute difference between the maximum and the minimum sample values.

In another embodiment, the smoothness may be computed by interquartile range of sample values of pixels located within the sample area. The interquartile range of sample values is defined as the $A^{th}$ percentile minus the $B^{th}$ percentile of sample values. An example value of A may be 75% and an example value of B may be 25%.

In yet another embodiment, the smoothness may be computed by the variance of sample values within the sample area. The variance can be computed as follows:

$$S^2 = \frac{\sum_{i=1}^{n}(x_i - \bar{x})^2}{n-1}, \tag{21}$$

where $S^2$ is the variance, x, refers to the $i^{th}$ sample of current sample area which covers sample 1 to sample n, $\bar{x}$ represents the sample mean value, n represents the total number of samples within the sample area to which CCSO and/or LSO is applied.

In yet another embodiment, the smoothness may be computed by the standard deviation of sample values within the sample area. The standard deviation can be computed as follows:

$$S = \sqrt{\frac{\sum_{i=1}^{n}(x_i - \bar{x})^2}{n-1}}, \tag{22}$$

In yet another embodiment, the smoothness may be computed by a range of gradient values within the sample area. The range of gradient values may be defined as the absolute difference between the maximum and the minimum gradient values. The gradient value for each sample location may be calculated as a difference between the value of sample located at the current position and the value of sample located at its neighboring positions.

III. Coded/coding information, including but not limited to prediction mode (e.g., whether intra DC mode, intra Planar mode, intra PAETH mode, intra SMOOTH mode, intra recursive filtering mode, inter SKIP modes are applied) signaled for the block to which CCSO or LSO is applied, the information related to coefficients coding (such as coded block flag), the block size, quantization parameters, and motion vector (magnitude) associated with the current block.

IV. Information which is available for both encoder and decoder when applying CCSO or LSO, such as sample classification information derived during loop filtering process (such as ALF), filtering strength derived during deblocking process, CDEF, and Loop restoration.

In some general example implementations, the non-linear mapping used in CCSO or LSO filtering (or the CCSO or LSO LUTs) for a block may be selected depending on the statistics of the block. The statistics may include but are not limited to I, II, III, and IV described above.

In one embodiment, the color component that is the input of CCSO may be used to derive the statistics.

In another embodiment, the color component that is filtered by the output of CCSO may be used to derive the statistics.

In another embodiment, if the statistics defined in I above is used (edge direction statistics), the LUT used for current block in CCSO may be selected based on the edge information of the current block.

In one example where edge direction derived in CDEF is used as the statistics, there may be a predefined number (e.g., eight) of LUTs in total for CCSO and/or LSO. Each of the LUTs may correspond to one of the, e.g., eight, edge directions which are outputs of an example CDEF edge derivation process. One of the LUTs may be selected according to this correspondence for current block based on the edge direction. The example eight LUTs may be signaled (if not predefined) at various levels, e.g., frame-level in HLS (APS, Slice header, frame header, PPS).

In another more general example where edge direction derived in CDEF is used as the statistics, there may be N LUTs in total, each of which corresponds to more than one of the eight edge directions which are outputs of an example CDEF edge derivation process. One of the LUTs may be selected according to this correspondence for current block based on the edge direction. Example values of N are integers, and 1<N<8. The N LUTs maybe be signaled (if not predefined) at frame-level in HLS (APS, Slice header, frame header, PPS).

In some example implementations, if the statistics defined in II above is used (smoothness statistics), the selection of LUT for current block in CCSO and/or LSO may be based on whether the measurement smoothness value is smaller than (or greater than) one or more given thresholds.

In one example, the standard deviation (S) of current block may be compared with a predefined number of threshold values for LUT selection. For example, there may be a number of LUTs to selection from, e.g., 4 LUTs to select from. Correspondingly, there may be three threshold values (S1, S2, S3). As such, LUT selection from the four LUTs may be based on the following criteria: LUT1 may be selected if S<S1, LUT2 may be selected if S1≤S<S2, LUT3 may be selected if S2≤S<S3, LUT4 may be selected if S≥S4.

In one embodiment, if the statistics defined in III above is used (coding/coded information statistics), the selection of LUT used for current block in CCSO and/or LSO may be based on the coding/coded information.

In one example, the LUT for current block may be selected based on a prediction mode of the current block. Various prediction modes may correspond to various LUTs. For the prediction mode that is used in the current block, the corresponding LUT may be selected. Example prediction modes include but are not limited to intra DC mode, intra Planar mode, intra PAETH mode, intra SMOOTH mode, intra recursive filtering mode, inter SKIP modes, and the like.

In some example implementations, the various statistics information above may be used to determine the filter used in CCSO, including, but not limited to filter coefficients, filter tap positions and number of filter taps. Such determination may be equivalent to selectin of LUTs as described above, when such filtering parameters are embodied in different look up tables. Alternatively, if these composite LUTs are constructed that include variations of these parameters in a particular composite LUT, then the selection may involves selecting entries in the LUT rather than selection of LUTs.

In any of the implementations above, the statistics for selecting a LUT may be based on statistics of any color components. It may be based on a single color component or a combination of multiple color components. It may be based on a same color component as the color component to be filtered or on another color component different from the color component to be filtered. The color component(s) on which the statistic is performed may be referred to as "at least a first color component." The input color component to the selected sample offset filter and to be filtered may be referred to as "a second color component". The delta values used for looking up sample offset values in the selected sample offset filter may be taken from samples co-located with the samples being filtered in any of the color components, referred to as "a third color components". The first, second, and the third color components may be the same or may be different. For example, the second and third color component may be different (hence "cross component sample offset" filtering) or the same (hence "local sample offset" filtering).

In some example implementations, a number (e.g., M) of LUTs are signaled for a color component to CCSO or LSO is applied, and the index of selected LUT to apply for current block is also signaled. Example values of M are any integers within 1 to 1024.

In some example implementations, the number of LUTs (e.g., M) and the actual LUTs (if not predefined) may be signaled at various levels, including but not limited to sequence level, or picture level, or CTU/SB level in HLS (APS, Slice header, frame header, PPS, SPS, VPS). The index of selected LUT for current block may be signaled at various levels, including but not limited to CTU/SB level, or coded block level, or filter unit level in HLS (APS, Slice header, frame header, PPS, SPS, VPS).

The term "loop filtering parameter" with respect to the CCSO or LSO filters, when used in this disclosure, refers to parameters signaled in the bitstream indicating various characteristics of the CCSO or LSO filters, including but not limited to the flags indicating the type of LUTs (e.g., either predefined or encoder-derived), indices to LUTs, the number of delta levels in the LUTs, the quantization steps for the deltas, the number of taps for each filter, tap positions relative to the filtered sample position for each filter, and the like.

Figure 24:
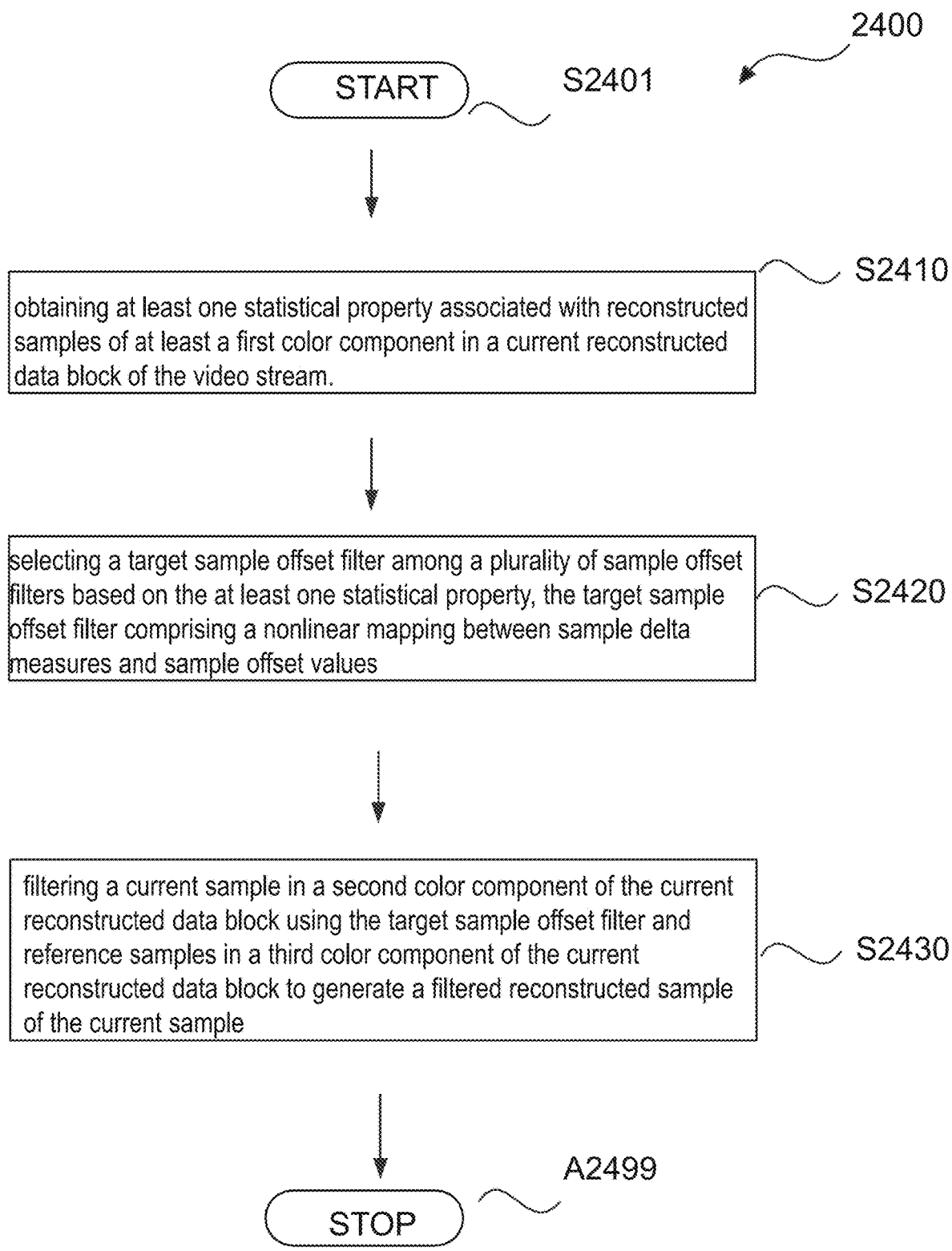
FIG. 24 shows a flow chart outlining a process (2400) according to an embodiment of the disclosure.

FIG. 24 shows a flow chart 2400 of an example method following the principles underlying the implementations above for in-loop cross sample offset filtering or local sample offset filtering. The example method flow starts at 2401. In S2410, at least one statistical property associated with reconstructed samples of at least a first color component in a current reconstructed data block of a video stream is obtained. In S2420, a target sample offset filter among a plurality of sample offset filters is selected based on the at least one statistical property, the target sample offset filter including a nonlinear mapping between sample delta measures and sample offset values. In S2430, a current sample in a second color component of the current reconstructed data block is filtered using the target sample offset filter and reference samples in a third color component of the current reconstructed data block to generate a filtered reconstructed sample of the current sample. The example method flow ends at S2499.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium. Embodiments in the disclosure may be applied to a luma block or a chroma block.

The techniques described above, can be implemented as computer software using computer-readable instructions and physically stored in one or more computer-readable media.

Figure 25:
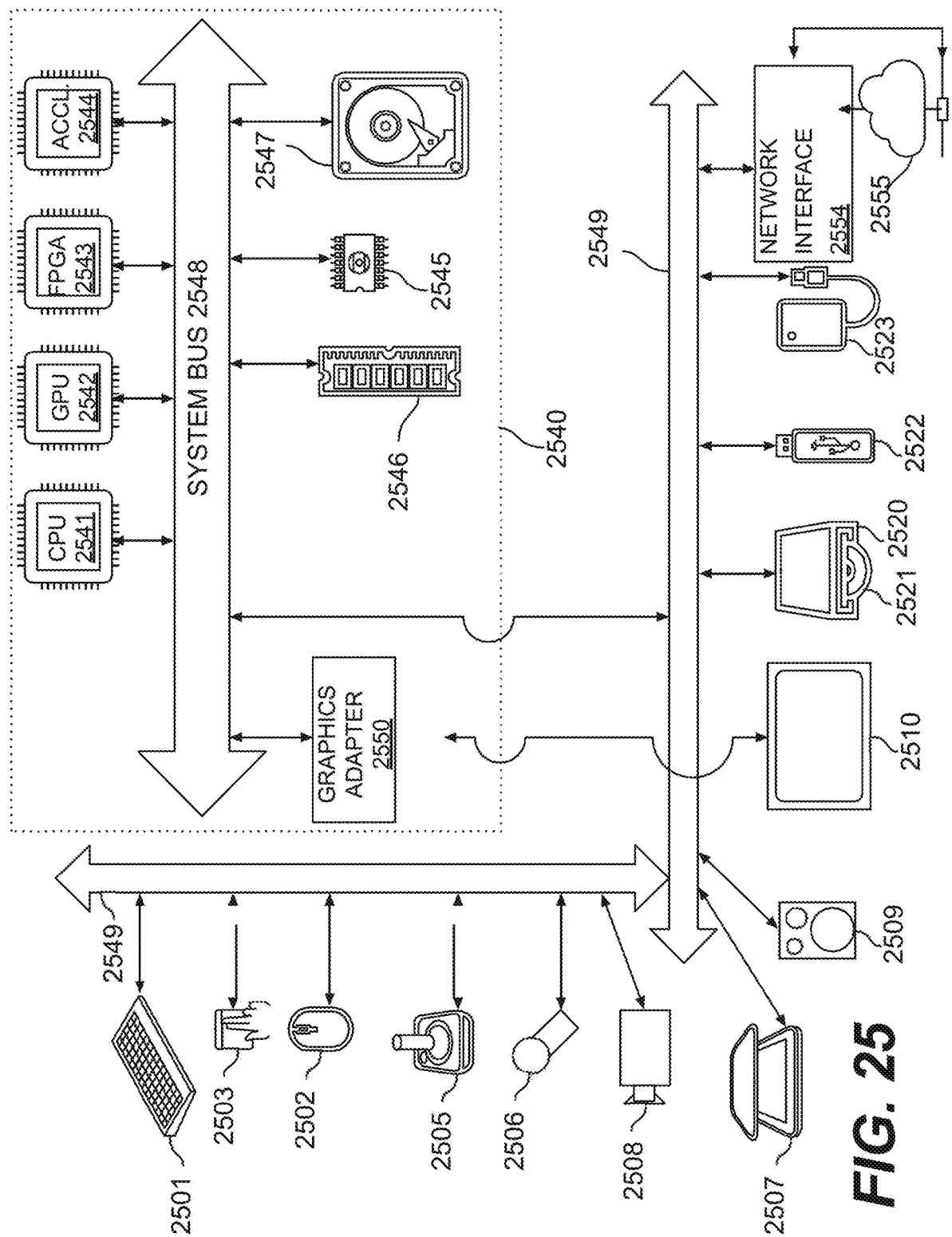
FIG. 25 shows a schematic illustration of a computer system in accordance with an example embodiment.

For example, FIG. 25 shows a computer system (2500) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 25 for computer system (2500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2500).

Computer system (2500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2501), mouse (2502), trackpad (2503), touch screen (2510), data-glove (not shown), joystick (2505), microphone (2506), scanner (2507), camera (2508).

Computer system (2500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2510), data-glove (not shown), or joystick (2505), but there can also be tactile feedback devices that do not serve as input devices), audio output devices (such as: speakers (2509), headphones (not depicted)), visual output devices (such as screens (2510) to include CRT screens, LCD screens, plasma screens, OLED screens, each with or without touch-screen input capability, each with or without tactile feedback capability—some of which may be capable to output two dimensional visual output or more than three-dimensional output through means such as stereographic output; virtual-reality glasses (not depicted), holographic displays and smoke tanks (not depicted)), and printers (not depicted).

Computer system (2500) can also include human accessible storage devices and their associated media such as optical media including CD/DVD ROM/RW (2520) with CD/DVD or the like media (2521), thumb-drive (2522), removable hard drive or solid state drive (2523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2500) can also include an interface (2554) to one or more communication networks (2555). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CAN bus, and so forth. Certain networks commonly require external network interface adapters that attached to certain general-purpose data ports or peripheral buses (2549) (such as, for example USB ports of the computer system (2500)); others are commonly integrated into the core of the computer system (2500) by attachment to a system bus as described below (for example Ethernet interface into a PC computer system or cellular network interface into a smartphone computer system). Using any of these networks, computer system (2500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2540) of the computer system (2500).

The core (2540) can include one or more Central Processing Units (CPU) (2541), Graphics Processing Units (GPU) (2542), specialized programmable processing units in the form of Field Programmable Gate Areas (FPGA) (2543), hardware accelerators for certain tasks (2544), graphics adapters (2550), and so forth. These devices, along with Read-only memory (ROM) (2545), Random-access memory (2546), internal mass storage such as internal non-user accessible hard drives, SSDs, and the like (2547), may be connected through a system bus (2548). In some computer systems, the system bus (2548) can be accessible in the form of one or more physical plugs to enable extensions by additional CPUs, GPU, and the like. The peripheral devices can be attached either directly to the core's system bus (2548), or through a peripheral bus (2549). In an example, the screen (2510) can be connected to the graphics adapter (2550). Architectures for a peripheral bus include PCI, USB, and the like.

CPUs (2541), GPUs (2542), FPGAs (2543), and accelerators (2544) can execute certain instructions that, in combination, can make up the aforementioned computer code. That computer code can be stored in ROM (2545) or RAM (2546). Transitional data can also be stored in RAM (2546), whereas permanent data can be stored for example, in the internal mass storage (2547). Fast storage and retrieve to any of the memory devices can be enabled through the use of cache memory, that can be closely associated with one or more CPU (2541), GPU (2542), mass storage (2547), ROM (2545), RAM (2546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As a non-limiting example, the computer system having architecture (2500), and specifically the core (2540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2540) that are of non-transitory nature, such as core-internal mass storage (2547) or ROM (2545). The software implementing various embodiments of the present disclosure can be stored in such devices and executed by core (2540). A computer-readable medium can include one or more memory devices or chips, according to particular needs. The software can cause the core (2540) and specifically the processors therein (including CPU, GPU, FPGA, and the like) to execute particular processes or particular parts of particular processes described herein, including defining data structures stored in RAM (2546) and modifying such data structures according to the processes defined by the software. In addition or as an alternative, the computer system can provide functionality as a result of logic hardwired or otherwise embodied in a circuit (for example: accelerator (2544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
HDR: high dynamic range
SDR: standard dynamic range
JVET: Joint Video Exploration Team
MPM: most probable mode
WAIP: Wide-Angle Intra Prediction
CU: Coding Unit
PU: Prediction Unit
TU: Transform Unit
CTU: Coding Tree Unit
PDPC: Position Dependent Prediction Combination
ISP: Intra Sub-Partitions
SPS: Sequence Parameter Setting
PPS: Picture Parameter Set
APS: Adaptation Parameter Set
VPS: Video Parameter Set
DPS: Decoding Parameter Set
ALF: Adaptive Loop Filter
SAO: Sample Adaptive Offset
CC-ALF: Cross-Component Adaptive Loop Filter
CDEF: Constrained Directional Enhancement Filter
CCSO: Cross-Component Sample Offset
LSO: Local Sample Offset
LR: Loop Restoration Filter
AV1: AOMedia Video 1
AV2: AOMedia Video 2

What is claimed is:

1. A method for in-loop filtering of a video stream, comprising:
obtaining at least one statistical property associated with reconstructed samples of at least a first color component in a current reconstructed data block of the video stream;
selecting a target sample offset filter among a plurality of sample offset filters based on the at least one statistical property, each of the plurality of sample offset filters comprising a plurality of offset values nonlinearly mapped to a plurality of possible combinations of available sample delta measures of a plurality of reference tap positions relative to a filter tap position, the available sample delta measures comprising quantifications of available sample differences between the plurality of reference tap positions and the filter tap position; and
filtering a current reconstructed sample in a second color component of the current reconstructed data block by:
selecting a current sample offset from the plurality of offset values of the target sample offset filter based on a calculated combination of sample delta measures of a filter sample and corresponding reference samples at the plurality of reference tap positions of the filter sample in a third color component of the current reconstructed data block; and applying the selected current sample offset to the current reconstructed sample to generate a filtered reconstructed sample of the current reconstructed sample in the second color component.

2. The method of claim 1, wherein the first color component is a same color component as the third color component.

3. The method of claim 1, wherein first color component is a same color component as the second color component.

4. The method of claim 1, wherein the second color component is a different color component as the third color component.

5. The method of claim 1, wherein the second color component is a same color component as the third color component.

6. The method of claim 1, wherein the at least the first color component comprises one, two, or three color components.

7. The method of claim 1, wherein the at least one statistical property comprises edge information of the current reconstructed data block.

8. The method of claim 7, wherein:
the edge information of the current reconstructed data block comprises an edge direction derived in a Constrained Directional Enhanced Filtering (CDEF) process; and
the plurality of sample offset filters comprise N sample offset filters corresponding to N CDEF edge directions, N being an integer between 1 and 8 inclusive.

9. The method of claim 8, wherein the plurality of sample offset filters are signaled at a frame level in high level syntax (HLS).

10. The method of claim 1, wherein the at least one statistical property comprises a smoothness measure of the current reconstructed data block.

11. The method of claim 10, wherein:
the smoothness measure of the current reconstructed data block is mapped to one of M predefined smoothness levels characterized by M−1 smoothness level thresholds;
the plurality of sample offset filters comprises M sample offset filters corresponding to the M predefined smoothness levels; and
the target sample offset filter is selected from the M sample offset filters according the one of the M predefined smoothness levels mapped to the smoothness measure.

12. The method of claim 1, wherein the at least one statistical property comprises a coding information of the current reconstructed data block.

13. The method of claim 12, wherein
coding information comprises a current prediction mode of the current reconstructed data block;
the plurality of sample offset filters correspond to different prediction modes; and
the target sample offset filter is selected from the plurality of sample offset filters according to the current prediction mode of the current reconstructed data block.

14. The method of claim 13, wherein the different prediction modes comprise at least one of intra DC mode, intra Planar mode, intra PAETH mode, intra SMOOTH mode, intra recursive filtering mode, and inter SKIP mode.

15. The method of claim 1, wherein each of the plurality of sample offset filters is associated with a set of filter coefficients, a number of the plurality of reference tap positions, and the plurality of reference tap positions.

16. The method of claim 1, wherein filtering the current reconstructed sample in the second color component of the current reconstructed data block comprises:
determining a first location of the current reconstructed sample of the second color component;
identifying the filter sample of the third color component at the first location and the reference samples at the plurality of reference tap positions relative to the first location in the third color component;
determining the calculated combination of sample delta measures between the reference samples and the filter sample of the third color component of the current reconstructed data block;
extracting the current sample offset from the plurality of offset values of the target sample offset filter based on the calculated combination of sample delta measures; and
applying the current sample offset to the current reconstructed sample to generate the filtered reconstructed sample of the current reconstructed sample in the second color component.

17. The method of claim 1, wherein:
the plurality of sample offset filters are predetermined;
the plurality of sample offset filters and an index of the selected target sample offset filter among the plurality of sample offset filters are signaled at a sequence level, a picture level, or coding tree unit level.

18. A device for in-loop filtering of a video stream, comprising a processing circuitry configured to:
obtain at least one statistical property associated with reconstructed samples of at least a first color component in a current reconstructed data block of the video stream;
select a target sample offset filter among a plurality of sample offset filters based on the at least one statistical property, each of the plurality of sample offset filters comprising a plurality of offset values nonlinearly mapped to a plurality of possible combinations of available sample delta measures of a plurality of reference tap positions relative to a filter tap position, the available sample delta measures comprising quantifications of available sample differences between the plurality of reference tap positions and the filter tap position; and
filter a current reconstructed sample in a second color component of the current reconstructed data block by:
selecting a current sample offset from the plurality of offset values of the target sample offset filter based on a calculated combination of sample delta measures of a filter sample and corresponding reference samples at the plurality of reference tap positions of the filter sample in a third color component of the current reconstructed data block; and
applying the selected current sample offset to the current reconstructed sample to generate a filtered reconstructed sample of the current reconstructed sample in the second color component.

19. The device of claim 18, wherein the at least one statistical property comprises at least one of edge information, smoothness measure, and coding information of the current reconstructed data block.

20. A non-transitory computer readable medium for storing computer instructions, the computer instructions, when executed by a processor, causes the processor to:

obtain at least one statistical property associated with reconstructed samples of at least a first color component in a current reconstructed data block of a video stream;

select a target sample offset filter among a plurality of sample offset filters based on the at least one statistical property, each of the plurality of sample offset filters comprising a plurality of offset values nonlinearly mapped to a plurality of possible combinations of available sample delta measures of a plurality of reference tap positions relative to a filter tap position, the available sample delta measures comprising quantifications of available sample differences between the plurality of reference tap positions and the filter tap position; and filter a current reconstructed sample in a second color component of the current reconstructed data block by:
  selecting a current sample offset from the plurality of offset values of the target sample offset filter based on a calculated combination of sample delta measures of a filter sample and corresponding reference samples at the plurality of reference tap positions of the filter sample in a third color component of the current reconstructed data block; and
  applying the selected current sample offset to the current reconstructed sample to generate a filtered reconstructed sample of the current reconstructed sample in the second color component.

* * * * *